(12) United States Patent
Kim et al.

(10) Patent No.: US 11,936,115 B2
(45) Date of Patent: Mar. 19, 2024

(54) ANTENNA MODULE AND ELECTRONIC DEVICE COMPRISING SAME

(71) Applicants: SAMSUNG ELECTRONICS CO., LTD., Suwon-si (KR); POSTECH RESEARCH AND BUSINESS DEVELOPMENT FOUNDATION, Pohang-si (KR)

(72) Inventors: Yeonwoo Kim, Suwon-si (KR); Wonbin Hong, Pohang-si (KR); Wonpyo Kwon, Pohang-si (KR); Sehyun Park, Suwon-si (KR); Sumin Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 368 days.

(21) Appl. No.: 17/419,128

(22) PCT Filed: Dec. 27, 2019

(86) PCT No.: PCT/KR2019/018661
§ 371 (c)(1),
(2) Date: Jun. 28, 2021

(87) PCT Pub. No.: WO2020/139045
PCT Pub. Date: Jul. 2, 2020

(65) Prior Publication Data
US 2022/0158361 A1 May 19, 2022

(30) Foreign Application Priority Data
Dec. 28, 2018 (KR) .................. 10-2018-0172995

(51) Int. Cl.
*H01Q 1/24* (2006.01)
*H01Q 9/04* (2006.01)
(Continued)

(52) U.S. Cl.
CPC ............... *H01Q 21/28* (2013.01); *H01Q 1/24* (2013.01); *H01Q 9/0407* (2013.01); *H01Q 21/0006* (2013.01); *H04B 1/40* (2013.01)

(58) Field of Classification Search
CPC ...... H01Q 1/24; H01Q 21/00; H01Q 21/0006; H01Q 21/28; H01Q 9/04; H01Q 9/0407;
(Continued)

(56) References Cited

U.S. PATENT DOCUMENTS 10,411,335 B2 9/2019 Sung et al.
10,623,028 B2 4/2020 Kim et al.
(Continued)

FOREIGN PATENT DOCUMENTS

EP  1 944 829   7/2008
EP  3 800 737   4/2021
(Continued)

OTHER PUBLICATIONS

Korean Office Action dated Jan. 8, 2023 in corresponding Korean Patent Application No. 10-2018-0172995.
(Continued)

*Primary Examiner* — Tho G Phan
(74) *Attorney, Agent, or Firm* — Nixon & Vanderhye P.C.

(57) ABSTRACT

The disclosure provides an electronic device comprising an antenna module and a wireless communication circuit. The antenna module comprises: a printed circuit board comprising a first surface extending in a first direction and a second surface extending in a second direction opposite the first direction; a first area comprising a first antenna array; a second area comprising a second antenna array and at least partially overlapping the first area; a third area comprising a third antenna array and not overlapping the first area; a fourth area comprising a fourth antenna array and at least partially overlapping the third area; and a ground layer. The
(Continued)

wireless communication circuit is electrically connected to the plurality of antenna arrays and transmits and/or receives a signal having a frequency in a range of about 3 GHz to 100 GHz.

15 Claims, 28 Drawing Sheets

(51) Int. Cl.
  *H01Q 21/00* (2006.01)
  *H01Q 21/28* (2006.01)
  *H04B 1/40* (2015.01)
(58) Field of Classification Search
  CPC .......... H01Q 1/241; H01Q 1/38; H01Q 21/08; H01Q 25/00; H01Q 9/06; H01Q 9/065; H04B 1/40; H04M 1/02; H04M 1/0249; H04M 1/0266
  See application file for complete search history.

(56) References Cited

U.S. PATENT DOCUMENTS

| | | | |
|---|---|---|---|
| 10,804,597 B2 | 10/2020 | Xia et al. | |
| 10,992,023 B2 * | 4/2021 | Hong | H01Q 5/48 |
| 11,019,190 B2 * | 5/2021 | Kim | H01Q 1/243 |
| 11,075,445 B2 * | 7/2021 | Im | H01Q 1/38 |
| 11,201,396 B2 * | 12/2021 | Park | H01Q 1/526 |
| 11,283,156 B2 * | 3/2022 | Jeon | H01Q 21/28 |
| 11,502,403 B2 * | 11/2022 | Cheng | H01Q 5/307 |
| 2018/0151952 A1 | 5/2018 | Oh | |
| 2018/0277934 A1 | 9/2018 | Kim et al. | |
| 2018/0366817 A1 | 12/2018 | Sung et al. | |
| 2018/0366831 A1 | 12/2018 | Cai et al. | |
| 2019/0267710 A1 | 8/2019 | Jenwatanavet et al. | |

FOREIGN PATENT DOCUMENTS

| | | |
|---|---|---|
| JP | 2016-82247 | 5/2016 |
| JP | 2018-207478 | 12/2018 |
| KR | 10-2010-0134182 | 12/2010 |
| KR | 10-2013-0054879 | 5/2013 |
| KR | 10-2016-0136025 | 11/2016 |
| KR | 10-2016-0148698 | 12/2016 |
| KR | 10-2018-0092226 | 8/2018 |
| KR | 10-2018-0108147 | 10/2018 |
| KR | 10-2018-0115932 | 10/2018 |
| KR | 10-2018-0137212 | 12/2018 |
| KR | 10-2018-0137993 | 12/2018 |
| KR | 10-2020-0014601 | 2/2020 |

OTHER PUBLICATIONS

International Search Report for PCT/KR2019/018661 dated Apr. 28, 2020, 4 pages.
Written Opinion of the ISA for PCT/KR2019/018661 dated Apr. 28, 2020, 5 pages.
Korean Notice of Patent Grant dated Jul. 24, 2023 in corresponding Korean Patent Application No. KR10-2018-0172995.

* cited by examiner

ANTENNA MODULE AND ELECTRONIC DEVICE COMPRISING SAME

CROSS-REFERENCE TO RELATED APPLICATION

This application is a national stage application of International Application No. PCT/KR2019/018661 designating the United States, filed on Dec. 27, 2019, in the Korean Intellectual Property Receiving Office, and claims priority to KR Patent Application No. 10-2018-0172995, filed on Dec. 28, 2018, the disclosures of which are incorporated by reference herein in their entireties.

BACKGROUND

Field

The disclosure relates to an antenna module and an electronic device including the same.

Description of Related Art

With the growth of digital technologies, electronic devices are being provided in various forms such as a smart phone, a tablet personal computer (tablet PC) or a personal digital assistant (PDA). The electronic devices are being developed even in the form of being wearable on a user to improve portability and user accessibility. With the growth of wireless communication technologies, the electronic devices (e.g., communicating electronic devices) are being commonly used in a daily life, and contents use caused by this is increasing in geometric progression. High-frequency band, high-speed wireless communication technologies are being developed, and to properly operate in a mobility environment that is a wireless communication system such as satellite communication, broadcasting, mobile communication or terrestrial communication, high-directive phase array antennas (e.g., antenna arrays) can be used. The electronic devices can utilize a beamforming system for processing a transmitted or received signal such that energy radiated from the phase array antenna is converged in a specific direction in a space.

A phase array antenna can be implemented in the form of being disposed in a printed circuit board (PCB). The printed circuit board may include a structure of laminating a plurality of conductive layers (or a plurality of conductive pattern layers), and insulating materials can be disposed between the plurality of conductive layers. For example, at least a portion of one conductive layer can be utilized as an antenna element of the phase array antenna, and at least a portion of another conductive layer can be utilized as the ground plane. The printed circuit board can include a first surface extending in a first direction, and a second surface extending in a second direction that is opposite to the first direction. The phase array antenna and the ground plane can be disposed between the first surface and second surface of the printed circuit board, and the ground plane can be disposed between the phase array antenna and the second surface. A beamforming system can include a phase shifter for adjusting a phase of each antenna element of the phase array antenna. Beam steering for a direction and form of a beam can be adjusted through the phase shifter, but because the phase shifter can just shift a phase at several discrete angles, the direction (e.g., main lobe) or form of the beam formed through the phase array antenna disposed in the printed circuit board can be restrictive. For example, the beam formed through the phase array antenna can be substantially formed in a first direction, and can be difficult to be formed in a second direction or a third direction orthogonal to the first direction (or the second direction).

SUMMARY

Embodiments of the disclosure provide an antenna module which is easy to form a beam in various directions, and an electronic device including the same.

According to an example embodiment of the present disclosure, an electronic device can include: a housing including a first plate, a second plate facing away from the first plate, and a side wall or bezel surrounding a space between the first plate and the second plate, the side wall being coupled to the second plate or integrally formed with the second plate, a display visible through at least a portion of the first plate, an antenna structure including at least one antenna disposed within the housing, the antenna structure including: a printed circuit board including a first surface extending in a first direction and a second surface extending in a second direction opposite to the first direction, a first area including a first antenna array including a plurality of first antenna elements formed within the printed circuit board or on the first surface, a second area including a second antenna array including a plurality of second antenna elements formed closer to the second surface of the printed circuit board than the plurality of first antenna elements within the printed circuit board, or on the second surface, wherein when viewed from above the first surface the second area at least partially overlaps the first area, a third area including a third antenna array including a plurality of third antenna elements formed within the printed circuit board or on the first surface, wherein when viewed from above the first surface, the third area does not overlap the first area, a fourth area including a fourth antenna array including a plurality of fourth antenna elements formed closer to the second surface of the printed circuit board than the plurality of third antenna elements within the printed circuit board, or on the second surface, and wherein when viewed from above the first surface, with the fourth area at least partially overlaps the third area, and a ground layer disposed between the first antenna array and the second antenna array within the printed circuit board, and wherein when viewed from above the first surface, the ground layer at least partially overlaps the first area and the second area, and at least one wireless communication circuit electrically connected with the first antenna array, the second antenna array, the third antenna array and the fourth antenna array, and configured to transmit and/or receive a signal having a frequency in a range of about 3 GHz to about 100 GHz.

According to various example embodiments of the present disclosure, an antenna module can form a beam in various directions and expand beam coverage and thus, a signal transmission and/or reception rate can be improved.

Besides this, an effect obtainable or expected from various example embodiments of the present disclosure is directly or suggestively disclosed in the following detailed description. For instance, various effects according to various embodiments of the present disclosure will be disclosed in a detailed description below.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Various embodiments of the disclosure are described in greater detail below with reference to the accompanying drawings.

Figure 1:
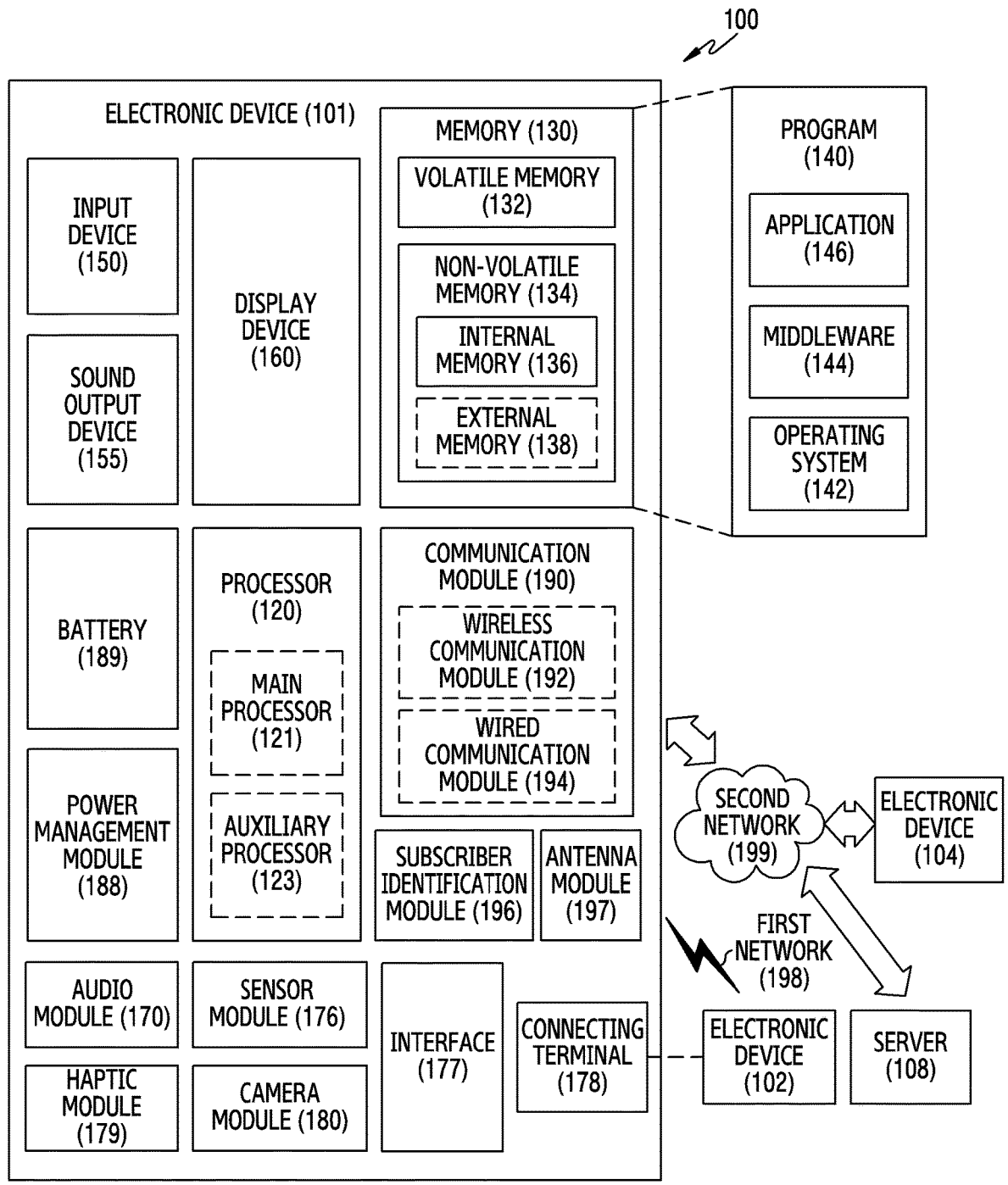
FIG. 1 is a block diagram illustrating an example electronic device within a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
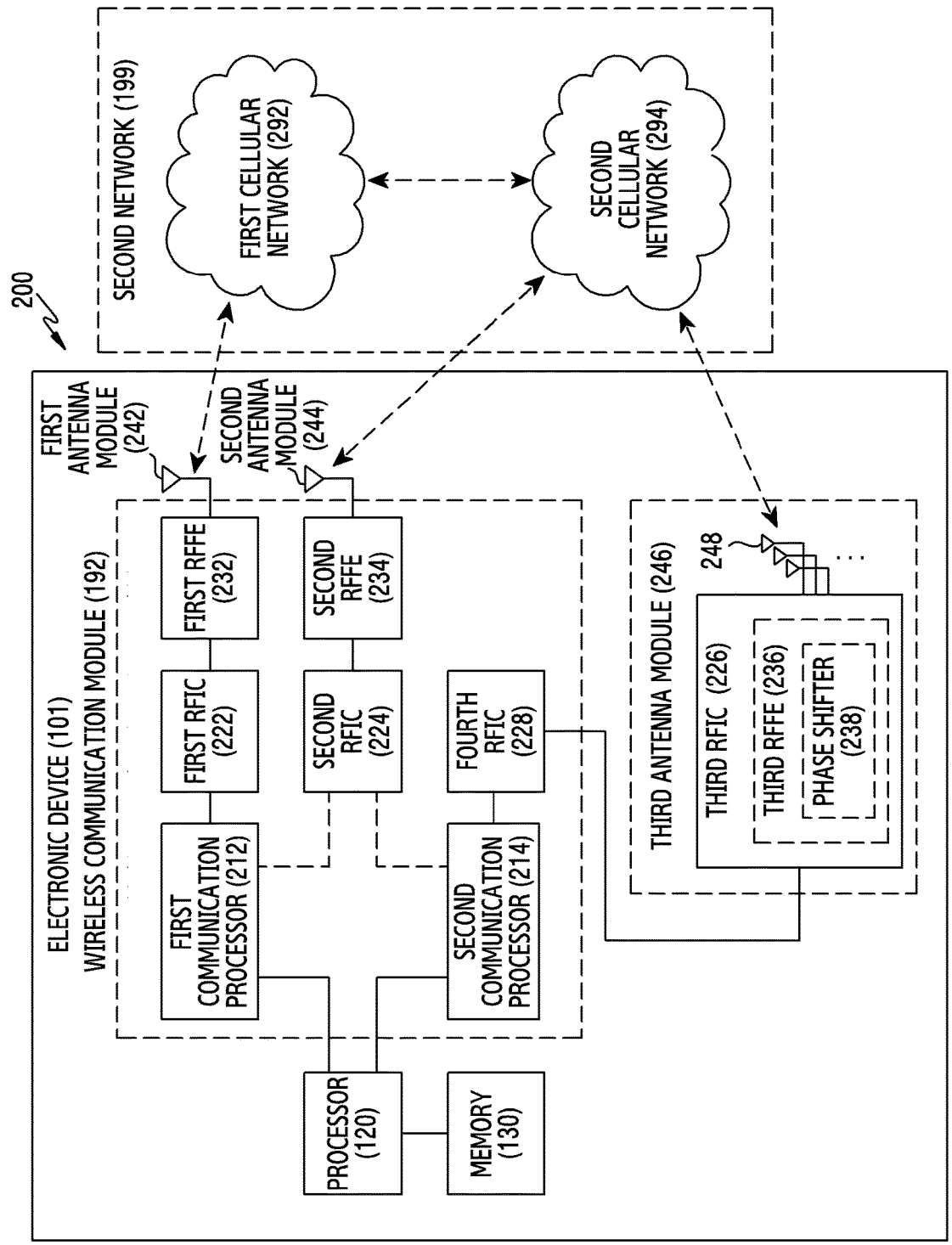
FIG. 2 is a block diagram illustrating an example electronic device in a network environment including a plurality of cellular networks according to various embodiments.

FIG. 2 is a block diagram 200 illustrating an example electronic device 101 in a network environment including a plurality of cellular networks according to various embodiments.

Referring to FIG. 2, an electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor (e.g., including processing circuitry) 120 and a memory 130. The second network 199 may include a first cellular network 292 and a second cellular network 294. According to another embodiment, the electronic device may further include at least one of the parts shown in FIG. 1 and the second network 199 may further include at least one another network. According to an embodiment, the first communication processor 212, the second communication processor 214, the first RFIC 222, the second RFIC 224, the fourth RFIC 228, the first RFFE 232, and the second RFFE 234 may form at least a portion of a wireless communication module 192. According to another embodiment, the fourth RFIC 228 may be omitted or may be included as a portion of the third RFIC 226.

The first communication processor 212 can support establishment of a communication channel with a band to be used for wireless communication with the first cellular network 292 and legacy network communication through the established communication channel. According to various embodiments, the first cellular network may be a legacy network including a 2G, 3G, 4G, or Long-Term Evolution (LTE) network. The second communication processor 214 can support establishment of a communication channel corresponding to a designated band (e.g., about 6 GHz~about 60 GHz) of a band to be used for wireless communication with the second cellular network 294 and 5G network communication through the established communication channel. According to various embodiments, the second cellular network 294 may be a 5G network that is defined in 3GPP. Further, according to an embodiment, the first communication processor 212 or the second communication processor 214 can support establishment of a communication channel corresponding to another designated band (e.g., about 6 GHz or less) of a band to be used for wireless communication with the second cellular network 294 and 5G network communication through the established communication channel. According to an embodiment, the first communication processor 212 and the second communication processor 214 may be implemented in a single chip or a single package. According to various embodiments, the first communication processor 212 or the second communication processor 214 may be disposed in a single chip or a single package together with the processor 120, the auxiliary processor 123, or the communication module 190. According to an embodiment, the first communication processor 212 and the second communication processor 214 is directly or indirectly connected by an interface (not shown), thereby being able to provide or receive data or control signal in one direction or two directions.

The first RFIC 222, in transmission, can convert a baseband signal generated by the first communication processor 212 into a radio frequency (RF) signal of about 700 MHz to about 3 GHz that is used for the first cellular network 292 (e.g., a legacy network). In reception, an RF signal can be obtained from the first cellular network 292 (e.g., a legacy network) through an antenna (e.g., the first antenna module 242) and can be preprocessed through an RFFE (e.g., the first RFFE 232). The first RFIC 222 can covert the preprocessed RF signal into a baseband signal so that the preprocessed RF signal can be processed by the first communication processor 212.

The second RFIC 224 can convert a baseband signal generated by the first communication processor 212 or the second communication processor 214 into an RF signal in a Sub6 band (e.g., about 6 GHz or less) (hereafter, 5G Sub6 RF signal) that is used for the second cellular network 294 (e.g., a 5G network). In reception, a 5G Sub6 RF signal can be obtained from the second cellular network 294 (e.g., a 5G network) through an antenna (e.g., the second antenna module 244) and can be preprocessed through an RFFE (e.g., the second RFFE 234). The second RFIC 224 can convert the processed 5G Sub6 RF signal into a baseband signal so that the processed 5G Sub6 RF signal can be processed by a corresponding communication processor of the first communication processor 212 or the second communication processor 214.

The third RFIC 226 can convert a baseband signal generated by the second communication processor 214 into an RF signal in a 5G Above6 band (e.g., about 6 GHz~about 60 GHz) (hereafter, 5G Above6 RF signal) that is used for the second cellular network 294 (e.g., a 5G network). In reception, a 5G Above6 RF signal can be obtained from the second cellular network 294 (e.g., a 5G network) through an antenna (e.g., the antenna 248) and can be preprocessed through the third RFFE 236. The third RFIC 226 can covert the preprocessed 5G Above6 RF signal into a baseband signal so that the preprocessed 5G Above6 RF signal can be processed by the first communication processor 214. According to an embodiment, the third RFFE 236 may be provided as a portion of the third RFIC 226.

The electronic device 101, according to an embodiment, may include a fourth RFIC 228 separately from or as at least a portion of the third RFIC 226. In this case, the fourth RFIC 228 can convert a baseband signal generated by the second communication processor 214 into an RF signal in an intermediate frequency band (e.g., about 9 GHz~about 11 GHz) (hereafter, IF signal), and then transmit the IF signal to the third RFIC 226. The third RFIC 226 can convert the IF signal into a 5G Above6 RF signal. In reception, a 5G Above6 RF signal can be received from the second cellular network 294 (e.g., a 5G network) through an antenna (e.g., the antenna 248) and can be converted into an IF signal by the third RFIC 226. The fourth RFIC 228 can covert the IF signal into a baseband signal so that IF signal can be processed by the second communication processor 214.

According to an embodiment, the first RFIC 222 and the second RFIC 224 may be implemented as at least a portion of a single chip or a single package. According to an embodiment, the first RFFE 232 and the second RFFE 234 may be implemented as at least a portion of a single chip or a single package. According to an embodiment, at least one of the first antenna module 242 or the second antenna module 244 may be omitted, or may be combined with another antenna module and can process RF signals in a plurality of bands.

According to an embodiment, the third RFIC 226 and the antenna 248 may be disposed on a substrate, thereby being able to form a third antenna module 246. For example, the wireless communication module 192 or the processor 120 may be disposed on a first substrate (e.g., a main PCB). In this case, the third RFIC 226 may be disposed in a partial area (e.g., the bottom) and the antenna 248 may be disposed in another partial area (e.g., the top) of a second substrate (e.g., a sub PCB) that is different from the first substrate, thereby being able to form the third antenna module 246. By disposing the third RFIC 226 and the antenna 248 on the same substrate, it is possible to reduce the length of the transmission line therebetween. Accordingly, it is possible to reduce a loss (e.g., attenuation) of a signal in a high-frequency band (e.g., about 6 GHz~about 60 GHz), for example, which is used for 5G network communication, due to a transmission line. Accordingly, the electronic device 101 can improve the quality and the speed of communication with the second cellular network 294 (e.g., 5G network).

According to an embodiment, the antenna 248 may be an antenna array including a plurality of antenna elements that can be used for beamforming. In this case, the third RFIC 226, for example, as a portion of the third RFFE 236, may include a plurality of phase shifters 238 corresponding to the antenna elements. In transmission, the phase shifters 238 can convert the phase of a 5G Above6 RF signal to be transmitted to the outside of the electronic device 101 (e.g., to a base station of a 5G network) through the respectively corresponding antenna elements. In reception, the phase shifters 238 can convert the phase of a 5G Above6 RF signal received from the outside through the respectively corresponding antenna element into the same or substantially the same phase. This enables transmission or reception through beamforming between the electronic device 101 and the outside.

The second cellular network 294 (e.g., a 5G network) may be operated independently from (e.g., Stand-Along (SA)) or connected and operated with (e.g., Non-StandAlone (NSA)) the first cellular network 292 (e.g., a legacy network). For example, there may be only an access network (e.g., a 5G radio access network (RAN) or a next generation RAN (NG RAN)) and there is no core network (e.g., a next generation core (NGC)) in a 5G network. In this case, the electronic device 101 can access the access network of the 5G network and then can access an external network (e.g., the internet) under control by the core network (e.g., an evolved packed core (EPC)) of the legacy network. Protocol information (e.g., LTE protocol information) for communication with a legacy network or protocol information (e.g., New Radio (NR) protocol information) for communication with a 5G network may be stored in the memory 230 and accessed by another part (e.g., the processor 120, the first communication processor 212, or the second communication processor 214).

Figure 3:
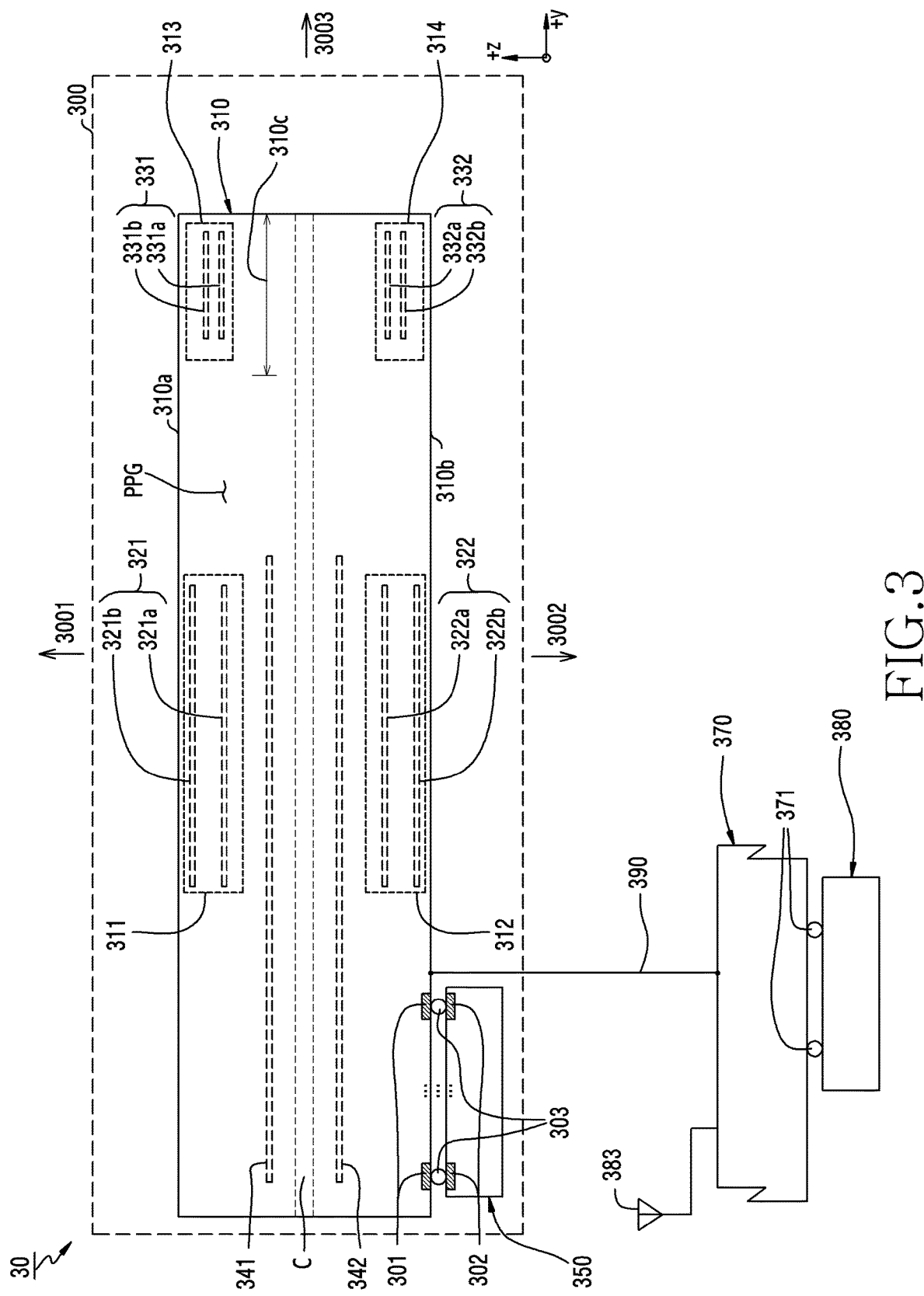
FIG. 3 is a diagram illustrating an electronic device including an antenna module according various embodiments.

FIG. 3 is a diagram illustrating an example configuration of an electronic device including an antenna module according to various embodiments.

Referring to FIG. 3, in an embodiment, the electronic device 30 (e.g., the electronic device 101 of FIG. 1 or 2) can include at least one of an antenna module 300 (e.g., the antenna module 197 of FIG. 1, the second antenna module 244 or third antenna module 246 of FIG. 2) and/or a second printed circuit board 370.

According to an embodiment, the antenna module 300 can include at least one of a first printed circuit board 310, a first wireless communication circuit 350 and/or a conductive bonding member 303.

According to an embodiment, the first printed circuit board 310 may have a first surface 310*a* extending in a first direction 3001 (e.g., a direction of +z axis), and a second surface 310*b* extending in a second direction 3002 (e.g., a direction of −z axis) that is opposite to the first direction 3001. The first printed circuit board 310 can include a plurality of conductive layers disposed between the first surface 310*a* and the second surface 310*b*, and insulating materials (e.g., prepreg (PPG)) disposed between the plurality of conductive layers.

According to an embodiment, the first printed circuit board 310 may include at least one of a first antenna 321, a second antenna 322, a third antenna 331, a fourth antenna 332, a first ground plane (or a first ground layer) 341 or a second ground plane (or a second ground layer) 342. The first antenna 321, the second antenna 322, the third antenna 331, the fourth antenna 332, the first ground plane 341 and/or the second ground plane 342 can include at least some of the plurality of conductive layers (e.g., a plurality of conductive pattern layers or a plurality of circuit layers) included in the first printed circuit board 310.

According to an embodiment, the first printed circuit board 310 can include a first area 311 including the first antenna 321 which is formed within the first printed circuit board 310 or on the first surface 310*a*.

According to an embodiment, the first printed circuit board 310 can include a second area 312 including the second antenna 322 which is formed, closer to the second surface 310*b* than the first antenna 321 within the first printed circuit board 310, or on the second surface 310*b*. The second area 312 may at least partially overlap with the first area 311 when viewed from above the second surface 310*b*.

According to an embodiment, the first printed circuit board 310 can include a third area 313 including the third antenna 331 which is formed within the first printed circuit board 313 or on the first surface 310*a*. The third area 313 may not overlap with the first area 311 when viewed from above the first surface 310*a*.

According to an embodiment, the first printed circuit board 310 can include a fourth area 314 including the fourth antenna 332 which is formed, closer to the second surface 310*b* than the third antenna 331 within the first printed circuit board 310, or on the second surface 310*b*. The fourth area 314 may at least partially overlap with the third area 313 when viewed from above the second surface 310*b*.

According to an embodiment, the first antenna 321 can include at least one of the plurality of first antenna elements 321*a* and 321*b*. For example, the plurality of first antenna elements 321*a* and 321*b* can be disposed in mutually different conductive layers, and may at least partially when viewed from above the first surface 310*a*. For example, one first antenna element 321*b* can be disposed closer to the first surface 310*a* than the other first antenna element 321*a*.

According to an embodiment, one first antenna element 321a can be electrically connected with the first wireless communication circuit 350. According to an embodiment, the other first antenna element 321b can be utilized as a dummy element (e.g., a dummy antenna, a dummy patch or a conductive patch). The dummy element can be physically isolated from other conductive elements and be electrically in a floating state. According to an embodiment, the first antenna element 321a electrically connected with the first wireless communication circuit 350 can operate as a feeding part (or a feeding pattern) for indirectly feeding the other first antenna element 321b. The first antenna element 321b can be electromagnetically coupled with the first antenna element 321a electrically connected with the first wireless communication circuit 350, and operate as an antenna radiator or adjust a radiation characteristic. For example, the first antenna element 321b can move a resonance frequency of the first antenna 321 by a specified frequency or move as much as specified. For example, the first antenna element 321b can extend a bandwidth capable of transmitting or receiving a signal through the first antenna 321 or form mutually different frequency bands (e.g., multi-band). For example, the first antenna element 321b can reduce an electromagnetic noise and improve antenna performance.

According to various embodiments, the plurality of first antenna elements 321a and 321b can be the substantially same shape when viewed from above the first surface 310a. According to various embodiments, the plurality of first antenna elements 321a and 321b can be mutually different shapes when viewed from above the first surface 310a. For example, the first antenna element 321a electrically connected with the first wireless communication circuit 350 can be a different shape from the first antenna element 321b utilized as the dummy element, when viewed from above the first surface 310a.

According to an embodiment, the first antenna element 321b disposed closer to the first surface 310a among the plurality of first antenna elements 321a and 321b can be electrically connected with the first wireless communication circuit 350. For example, the first antenna element 321b can be directly fed from the first wireless communication circuit 350, and can operate as an antenna radiator (e.g., a first patch antenna). According to various embodiments, the first antenna element 321a can be omitted.

According to an embodiment, the second antenna 322 can be disposed to at least partially overlap with the first antenna 321, when viewed from above the second surface 310b. According to an embodiment, the second antenna 322 can include at least one of a plurality of second antenna elements 322a and 322b. For example, the plurality of second antenna elements 322a and 322b can be disposed in mutually different conductive layers, and may at least partially overlap when viewed from above the second surface 310b. For example, the one second antenna element 322b can be disposed closer to the second surface 310b than the other second antenna element 322a.

According to an embodiment, the one second antenna element 322a can be electrically connected with the first wireless communication circuit 350. According to an embodiment, the other second antenna element 322b can be utilized as a dummy element (e.g., a dummy antenna, a dummy patch or a conductive patch). The dummy element can be physically isolated from other conductive elements and be electrically in a floating state. According to an embodiment, the second antenna element 322a electrically connected with the first wireless communication circuit 350 can operate as a feeding part (or a feeding pattern) for indirectly feeding the other second antenna element 322b. The second antenna element 322b can be electromagnetically coupled with the second antenna element 322a electrically connected with the first wireless communication circuit 350, and operate as an antenna radiator or adjust a radiation characteristic. For example, the second antenna element 322b can move a resonance frequency of the second antenna 322 by a specified frequency or move as much as specified. For example, the second antenna element 322b can extend a bandwidth capable of transmitting or receiving a signal through the second antenna 322 or form mutually different frequency bands (e.g., multi-band). For example, the second antenna element 322b can reduce an electromagnetic noise and improve antenna performance.

According to various embodiments, the plurality of second antenna elements 322a and 322b can be the substantially same shape when viewed from above the second surface 310b. According to various embodiments, the plurality of second antenna elements 322a and 322b can be mutually different shapes when viewed from above the second surface 310b. For example, the second antenna element 322a electrically connected with the first wireless communication circuit 350 can be a different shape from the second antenna element 322b utilized as the dummy element, when viewed from above the second surface 310b.

According to an embodiment, the second antenna element 322b disposed closer to the second surface 310b among the plurality of second antenna elements 322a and 322b can be electrically connected with the first wireless communication circuit 350. For example, the second antenna element 322b can be directly fed from the first wireless communication circuit 350, and can operate as an antenna radiator (e.g., a second patch antenna). According to various embodiments, the second antenna element 322a can be omitted.

According to various embodiments, the dummy element (e.g., the first antenna element 321b) included in the first antenna 321, and/or the dummy element (e.g., the second antenna element 322b) included in the second antenna 322, can offer an equivalent thermal expansion coefficient when the first printed circuit board 310 is manufactured, thereby preventing and/or reducing a warping phenomenon of the printed circuit board 310 capable of taking place due to a high-temperature heat.

According to various embodiments, the number of first antenna elements included in the first antenna 321, or the number of second antenna elements included in the second antenna 322, is not limited to FIG. 3 and can be various.

According to an embodiment, the first wireless communication circuit 350 can be formed in a chip form, and can be disposed in or be coupled to the second surface 310b of the first printed circuit board 310 through a conductive bonding member 303 such as, for example, and without limitation, a solder. For example, the first printed circuit board 310 can include a plurality of first terminals (or first connection terminals) 301 (e.g., first lands) which are disposed in the second surface 310b. The first wireless communication circuit 350 can include a plurality of second terminals (e.g., second connection terminals) 302 (e.g., second lands), and the plurality of second terminals 302 can be electrically and mechanically connected with the plurality of first terminals 301 through the conductive bonding member 303 such as the solder.

According to an embodiment, some of the plurality of first terminals 301 formed in the first printed circuit board 310 can be electrically connected with the first antenna 321. For example, an electrical path (not shown) formed by a conductive pattern and/or via included in the first printed circuit board 310 can electrically connect some of the plurality of first terminals 301 and the first antenna 321.

According to an embodiment, some of the plurality of first terminals 301 formed in the first printed circuit board 310 can be electrically connected with the second antenna 322. For example, an electrical path (not shown) formed by a conductive pattern and/or via included in the first printed circuit board 310 can electrically connect some of the plurality of first terminals 301 and the second antenna 322.

According to various embodiments, when viewed from above the second surface 310b, the second antenna 322 can be disposed between the first wireless communication circuit 350 and the fourth antenna 332.

According to an embodiment, the first ground plane 341 can be disposed between the first antenna 321 and the second ground plane 342. According to an embodiment, when viewed from above the first surface 310a, the first ground plane 341 can overlap at least partially with the first antenna 321. According to an embodiment, some of the plurality of first terminals 301 formed in the first printed circuit board 310 can be electrically connected with the first ground plane 341 through the electrical path (not shown) formed by the conductive pattern and/or via included in the first printed circuit board 310. The first wireless communication circuit 350 connected with the first printed circuit board 310 by the conductive bonding member 303 can be electrically connected with the first ground plane 341. According to an embodiment, the first ground plane 341 can be related with a radiation characteristic of the first antenna 321. For example, the radiation characteristic of the first antenna 321 can be determined based on a distance at which the plurality of first antenna elements 321a and 321b are spaced apart from the first ground plane 341. For example, the radiation characteristic of the first antenna 321 can be determined based on a form (e.g., a width, a length and a thickness) of the first ground plane 341. For example, the radiation characteristic of the first antenna 321 can be determined based on insulating materials (e.g., permittivity) between the first antenna elements 321a and 321b and the first ground plane 341.

According to an embodiment, the second ground plane 342 can be disposed between the first ground plane 341 and the second antenna 322. According to an embodiment, when viewed from above the second surface 310b, the second ground plane 342 can overlap at least partially with the second antenna 322. According to an embodiment, some of the plurality of first terminals 301 formed in the first printed circuit board 310 can be electrically connected with the second ground plane 342 through the electrical path (not shown) formed by the conductive pattern and/or via included in the first printed circuit board 310. The first wireless communication circuit 350 connected with the first printed circuit board 310 by the conductive bonding member 303 can be electrically connected with the second ground plane 342. According to an embodiment, the second ground plane 342 can be related with a radiation characteristic of the second antenna 322. For example, the radiation characteristic of the second antenna 322 can be determined based on a distance at which the plurality of second antenna elements 322a and 322b are spaced apart from the second ground plane 342. For example, the radiation characteristic of the second antenna 322 can be determined based on a form (e.g., a width, a length and a thickness) of the second ground plane 342. For example, the radiation characteristic of the second antenna 322 can be determined based on insulating materials (e.g., permittivity) between the second antenna elements 322a and 322b and the second ground plane 342.

According to various embodiments, the first ground plane 341 and/or the second ground plane 342 can shield or reduce an electromagnetic noise of a signal or power flow in the first printed circuit board 310.

According to various embodiments (not shown), as a ground plane related with the radiation characteristic of the antenna module 300, one of the first ground plane 341 and the second ground plane 342 can be omitted.

For example, when the first ground plane 341 is omitted, the second ground plane 342 can participate in not only the radiation characteristic of the second antenna 322 but also the radiation characteristic of the first antenna 321.

For example, when the second ground plane 342 is omitted, the first ground plane 341 can participate in not only the radiation characteristic of the first antenna 321 but also the radiation characteristic of the second antenna 322.

According to various embodiments (not shown), a ground plate replacing the first ground plane 341 and the second ground plane 342 can be disposed at a distance substantially equally spaced apart from the first antenna 321 and the second antenna 322 as well.

According to an embodiment, when viewed from above the first surface 310a, the third antenna 331 can be disposed not to overlap with the first antenna 321 and the second antenna 322. According to an embodiment, the third antenna 331 may include a dipole antenna. For example, the third antenna 331 can include a third antenna element (or a third conductive pattern) 331a and/or a fourth antenna element (or a fourth conductive pattern) 331b. According to an embodiment, the third antenna element 331a and the fourth antenna element 331b can be disposed in mutually different conductive layers of the first printed circuit board 310 and be spaced apart from each other. According to various embodiments (not shown), the third antenna element 331a and the fourth antenna element 331b can be disposed in the same conductive layer of the first printed circuit board 310 and be spaced apart from each other as well.

According to an embodiment, when viewed from above the first surface 310a, the ground plane (e.g., the first ground plane 341 and the second ground plane 342) can be disposed to not overlap with the third antenna 331.

According to an embodiment, the third antenna element 331a can be electrically connected with the first wireless communication circuit 350, and positive (+) feeding to the third antenna element 331a can be accomplished. The fourth antenna element 331b can be electrically connected with the first wireless communication circuit 350, and negative (−) feeding to the fourth antenna element 331b can be accomplished. According to an embodiment, some of the plurality of first terminals 301 formed in the first printed circuit board 310 can be electrically connected with the third antenna element 331a through the electrical path (not shown) formed by the conductive pattern and/or via included in the first printed circuit board 310. Some of the plurality of first terminals 301 formed in the first printed circuit board 310 can be electrically connected with the fourth antenna element 331b through the electrical path (not shown) formed by the conductive pattern and/or via included in the first printed circuit board 310. The first wireless communication circuit 350 connected with the first printed circuit board 310 by the conductive bonding member 303 can be electrically connected with the third antenna element 331a and the fourth antenna element 331b.

According to various embodiments, the third antenna element 331a can be electrically connected with the first wireless communication circuit 350, and the fourth antenna element 331b can be electrically connected with the ground (e.g., the ground plane of the first printed circuit board 310, or the ground of the wireless communication circuit 350). According to various embodiments, the fourth antenna element 331b can be physically isolated from other conductive elements and be electrically in a floating state.

According to an embodiment, when viewed from above the second surface 310b, the fourth antenna 332 can be disposed to not overlap with the first antenna 321 and the second antenna 322. According to an embodiment, when viewed from above the second surface 310b, the fourth antenna 332 can be disposed to at least partially overlap with the third antenna 331. According to an embodiment, the fourth antenna 332 can include a dipole antenna. For example, the fourth antenna 332 can include a fifth antenna element (or a fifth conductive pattern) 332a and/or a sixth antenna element (or a sixth conductive pattern) 332b. According to an embodiment, the fifth antenna element 332a and the sixth antenna element 332b can be disposed in mutually different conductive layers of the first printed circuit board 310 and be spaced apart from each other. According to various embodiments (not shown), the fifth antenna element 332a and the sixth antenna element 332b can be disposed in the same conductive layer of the first printed circuit board 310 and be spaced apart from each other as well.

According to an embodiment, when viewed from above the second surface 310b, a ground plane (e.g., the first ground plane 341 and the second ground plane 342) can be disposed to not overlap with the fourth antenna 332.

According to an embodiment, the fifth antenna element 332a can be electrically connected with the first wireless communication circuit 350, and positive (+) feeding to the fifth antenna element 332a can be accomplished. The sixth antenna element 332b can be electrically connected with the first wireless communication circuit 350, and negative (−) feeding to the sixth antenna element 332b can be accomplished. According to an embodiment, some of the plurality of first terminals 301 formed in the first printed circuit board 310 can be electrically connected with the fifth antenna element 332a through the electrical path (not shown) formed by the conductive pattern and/or via included in the first printed circuit board 310. Some of the plurality of first terminals 301 formed in the first printed circuit board 310 can be electrically connected with the sixth antenna element 332b through the electrical path (not shown) formed by the conductive pattern and/or via included in the first printed circuit board 310. The first wireless communication circuit 350 connected with the first printed circuit board 310 by the conductive bonding member 303 can be electrically connected with the fifth antenna element 332a and the sixth antenna element 332b.

According to various embodiments, the fifth antenna element 332a can be electrically connected with the first wireless communication circuit 350, and the sixth antenna element 332b can be electrically connected with the ground (e.g., the ground plane of the first printed circuit board 310, or the ground of the wireless communication circuit 350). According to various embodiments, the sixth antenna element 332b can be physically isolated from other conductive elements and be electrically in a floating state.

According to an embodiment, the first printed circuit board 310 can have a structure in which conductive layers of the same number are disposed at both sides with a criterion of a center base (C). The center base (C) can include insulating materials such as prepreg and, according to various embodiments, can be denoted as a core. For example, by a manufacturing method carrying out at several times an operation of laminating paired two conductive layers at both sides respectively, the first printed circuit board 310 can be formed in which the conductive layers of the same number are laminated at the both sides with a criterion of the center base (C). This manufacturing method can prevent and/or reduce damage such as warping, or tearing, of the printed circuit board by an environment such as a temperature or pressure applied on its manufacturing.

According to various embodiments, the first antenna 321 and the second antenna 322 can be formed in a symmetric structure with a criterion of the center base (C).

For example, the first antenna element 321a and second antenna element 322a electrically connected with the first wireless communication circuit 350 can be disposed at the same spaced distance from the center base (C). For example, the first antenna element 321a and the second antenna element 322a can be the substantially same shape when viewed from above the first surface 310a.

For example, the first antenna element 321b and second antenna element 322b utilized as a dummy element can be disposed at the same spaced distance from the center base (C). For example, the first antenna element 321b and the second antenna element 322b can be the substantially same shape when viewed from above the first surface 310a.

For example, a gap between the first antenna elements 321a and 321b can be substantially the same as a gap between the second antenna elements 322a and 322b.

According to various embodiments, the first ground plane 341 and the second ground plane 342 can be formed in a symmetric structure with a criterion of the center base (C). For example, the first ground plane 341 and the second ground plane 342 can be disposed at the same spaced distance from the center base (C). For example, the first ground plane 341 and the second ground plane 342 can be the substantially same shape when viewed from above the first surface 310a.

According to various embodiments, the third antenna 331 and the fourth antenna 332 can be formed in a symmetric structure with a criterion of the center base (C). For example, the third antenna element 331a and the fifth antenna element 332a, or the fourth antenna element 331b and the sixth antenna element 332b can be disposed at the same spaced distance from the center base (C). For example, the third antenna element 331a and the fifth antenna element 332a, or the fourth antenna element 331b and the sixth antenna element 332b can be the substantially same shape when viewed from above the first surface 310a.

According to various embodiments, the first printed circuit board 310 can be formed using, for example, a copper laminate plate (e.g., a copper clad laminate (CCL)) (or a disk). The copper clad laminate, for example, can be a composite copper clad laminate made by combining two or more kinds of reinforcement bases. According to an embodiment, the composite copper clad laminate can include a composite type of laminate material bonded with a flame retardant epoxy resin (CEM)-1 or CEM-3. The CEM-1 can include a center base (or core) including a paper impregnating an epoxy resin, an outer base including a woven glass fiber impregnating the epoxy resin, and a copper foil combined with the outer base. The CEM-3 can include a center base including a non-woven glass fiber (e.g., a glass nonwoven) impregnating an epoxy resin, an outer base including a woven glass fiber impregnating the epoxy resin, and a copper foil combined with the outer base. The glass fiber or paper can improve mechanical machinability, heat resistance or dimensional stability. According to various embodiments, the copper clad laminate can be FR-6 which includes a center base including a non-woven glass fiber (e.g., a glass nonwoven) impregnating a polyester resin, an outer base including a glass fiber impregnating a resin, and a copper foil combined with the outer base as well.

According to various embodiments, the CEM-3 can be designed to replace FR-4 or FR-5. Compared to the FR-4 or FR-5, the CEM-3 has a relatively less glass fiber and thus, its mechanical strength can be low relatively. In response to the CEM-3 being designed to replace the FR-4 or FR-5, this mechanical strength can be considered. According to various embodiments, in response to punching processing being needed, the CEM-3 more advantageous for the punching processing can, instead of the FR-4, be applied to the manufacturing of the printed circuit board as well.

According to various embodiments, the copper clad laminate can be a high frequency copper clad laminate made with materials capable of corresponding to high-speed signal transmission. For example, because a propagation speed of a signal is inversely proportional to a permittivity of material in a printed circuit board, in response to using low-permittivity materials, the signal propagation speed can be increased.

According to various embodiments, the copper clad laminate can be a form of disposing a film prepreg of insulating materials in a plate formed of a metal such as aluminum or iron and then combining a copper foil to the film prepreg as well.

According to various embodiments, the first printed circuit board 310 can be manufactured using the same copper clad laminates, or be manufactured using at least partially mutually different plurality of copper clad laminates.

According to various embodiments, the copper clad laminate can include a flexible copper clad laminate (FCCL) for a flexible printed circuit board (FPCB). The flexible copper clad laminate, for example, can be a form of combining a polyester film or polyimide film, etc. having flexibility, and a copper foil, by an adhesive agent (e.g., an acrylic adhesive agent).

According to various embodiments, the first printed circuit board 310 can include a flexible area 310c which is implemented using the flexible copper clad laminate. The third antenna 331 and the fourth antenna 332 can be disposed in the flexible area 310c.

According to an embodiment, the first wireless communication circuit 350 can transmit and/or receive a signal of various frequency bands through at least one antenna element (e.g., the first antenna element 321a, the second antenna element 322a, the third antenna 331, and/or the fourth antenna 332).

According to an embodiment, some of the plurality of conductive layers included in the first printed circuit board 310 can include a transmission line (e.g., an RF line) between the one or more antennas 321, 322, 331 and 332 and the first wireless communication circuit 350. The transmission line may, for example, be a structure for forwarding a frequency signal (e.g., a voltage and/or a current), and can be denoted as a conductor system which uses a wave propagation action by an electrical parameter (e.g., resistance per unit length, inductance, conductance or capacitance). For example, some of the plurality of conductive layers included in the first printed circuit board 310 can be utilized as a conductive path for power related to the antenna module 300 and/or logic (e.g., logic on a network between the first wireless communication circuit 350 and the second wireless communication circuit 380).

According to various embodiments, a structure excepting the first wireless communication circuit 350 in the antenna module 300 may be referred to as an antenna structure. According to various embodiments, the first wireless communication circuit 350 can be electrically connected with the antenna structure through a conductive member such as an FPCB or a cable. For example, the plurality of first terminals 301 can be replaced with a connector electrically connectable with a connector included in the conductive member (e.g., FPCB).

According to an embodiment, the second printed circuit board 370 can be electrically connected with the first printed circuit board 310 through various conductive members 390 such as, for example, and without limitation, a flexible printed circuit board (FPCB), a coaxial cable, or the like.

According to an embodiment, the electronic device 30 can include a second wireless communication circuit 380 (e.g., the wireless communication module 192 of FIG. 1) which is disposed in the second printed circuit board 370 through a conductive bonding member 371 such as, for example, and without limitation, a solder. The second wireless communication circuit 380 can include a first wireless communication module (not shown) or a second wireless communication module (not shown). The first wireless communication module, for example, can support wireless communication on a first network (e.g., the first cellular network 292 of FIG. 2) by utilizing at least one antenna 383 (e.g., the first antenna module 242 of FIG. 2). The second wireless communication module, for example, can support wireless communication on a second network (e.g., the second cellular network 294 of FIG. 2) which utilizes the antenna module 300 (e.g., the second antenna module 244 or third antenna module 246 of FIG. 2). The second wireless communication circuit 380 can exchange a signal of a corresponding frequency band with the first wireless communication circuit 350 of the antenna module 300.

According to an embodiment, the first wireless communication circuit 350 or the second wireless communication circuit 380 can include a beamforming system for processing a transmitted or received signal wherein energy radiated from the first antenna 321, second antenna 322, third antenna 331 or fourth antenna 332 is converged in a specific direction in a space. The beamforming system can allow receiving a signal of a greater intensity in a desired direction or forward a signal in a desired direction, or allow to not receive a signal coming from an undesired direction. The beamforming system can adjust an amplitude or phase of a carrier signal in an RF band, and adjust a form and direction of a beam.

According to an embodiment, the first wireless communication circuit 350 or the second wireless communication circuit 380 can control a phase of each of the first antenna 321, the second antenna 322, the third antenna 331 and the fourth antenna 332. For example, the first wireless communication circuit 350 or the second wireless communication circuit 380 can include a first electrical path electrically connected with a first point on the first antenna element 321a, a second electrical path electrically connected with a second point on the second antenna element 322a, a third electrical path electrically connected with a third point on the third antenna 331, and a fourth electrical path electrically connected with a fourth point on the fourth antenna 332. The processor (e.g., the processor 120 of FIG. 1), the first wireless communication circuit 350 or the second wireless communication circuit 380 can adjust phases of a first signal at the first point, a second signal at the second point, a third signal at the third point, and a fourth signal at the fourth point.

For example, through phase adjustment, a direction (e.g., main lobe) of a beam formed in the first antenna 321 can be a first direction 3001 (e.g., a direction of +z axis), or a third direction 3003 (e.g., a direction of +y axis) orthogonal to the first direction 3001. For example, through the phase adjustment, a direction of a beam formed in the second antenna 322 can be a second direction 3002 (e.g., a direction of −z axis), or the third direction 3003. For example, through the phase adjustment, a direction of a beam formed in the third antenna 331 or fourth antenna 332 can be the first direction 3001 or the third direction 3003.

According to an embodiment (not shown), the first printed circuit board 310 can be implemented to include a first antenna array that may, for example, be a structure arranging the first antenna 321 in the plural or a structure arranging at predetermined intervals. The first printed circuit board 310 can be implemented to include a second antenna array that is a structure arranging the second antenna 322 in the plural or a structure arranging at predetermined intervals. The first printed circuit board 310 can be implemented to include a third antenna array that is a structure arranging the third antenna 331 in the plural or a structure arranging at predetermined intervals. The first printed circuit board 310 can be implemented to include a fourth antenna array that is a structure arranging the fourth antenna 332 in the plural or a structure arranging at predetermined intervals.

Figure 4:
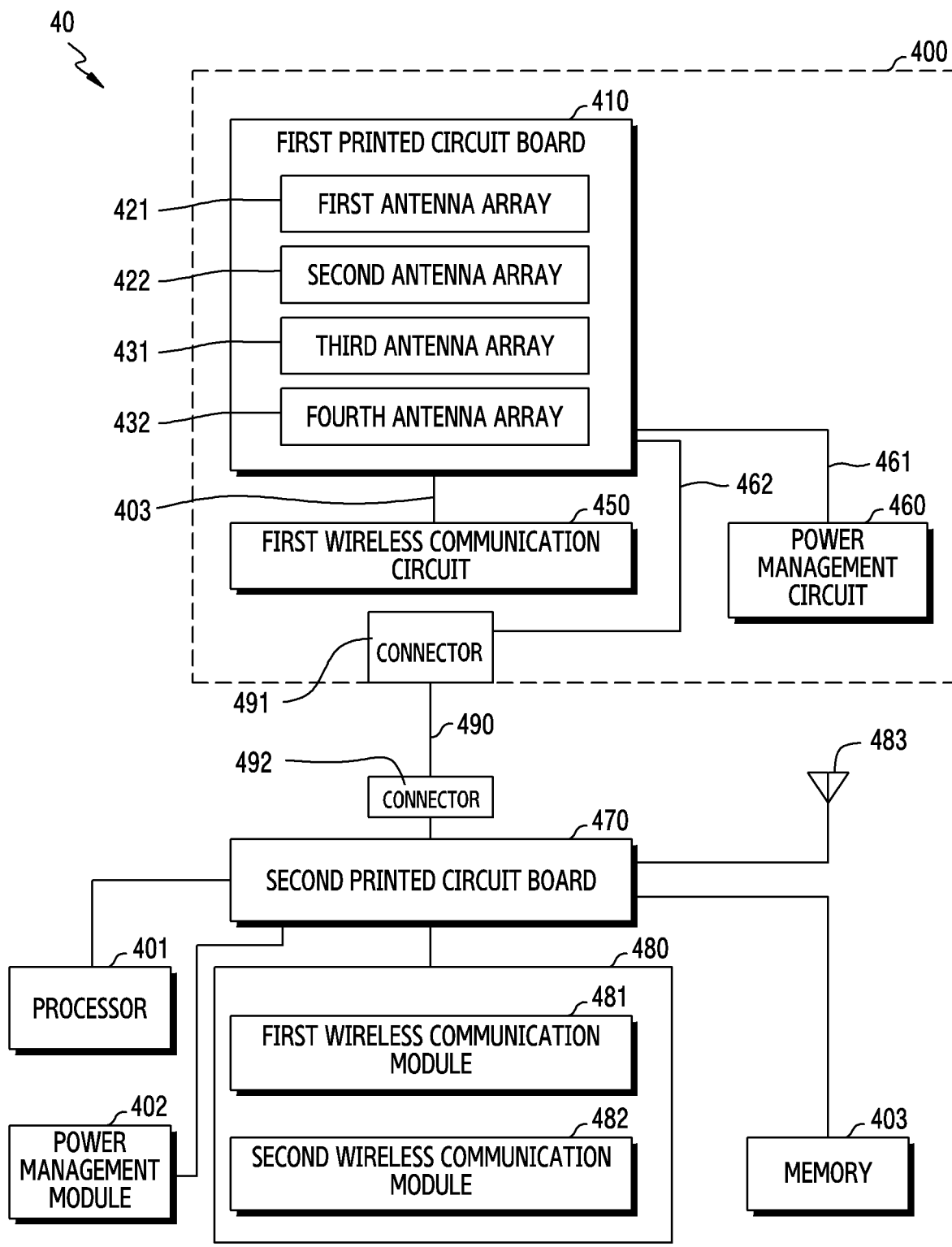
FIG. 4 is a block diagram illustrating an example configuration of an electronic device including an antenna module according to various embodiments.

FIG. 4 is a block diagram illustrating an example configuration of an electronic device including an antenna module according to various embodiments.

Referring to FIG. 4, in an embodiment, the electronic device 40 (e.g., the electronic device 101 of FIG. 1 or 2, or the electronic device 30 of FIG. 3) can include at least one of at least one antenna module 400 (e.g., the antenna module 197 of FIG. 1, the second antenna module 244 or third antenna module 246 of FIG. 2, or the antenna module 300 of FIG. 3), a second printed circuit board 470, a processor (e.g., including processing circuitry) 401 (e.g., the processor 120 of FIG. 1 or 2), a second wireless communication circuit 480 (e.g., the wireless communication module 192 of FIG. 1 or 2, or the second wireless communication circuit 380 of FIG. 3), a power management module (e.g., including power management circuitry) 402 (e.g., the power management module 188 of FIG. 1), at least one antenna 483 (e.g., the antenna module 197 of FIG. 1, the first antenna module 242 of FIG. 2, or the at least one antenna 383 of FIG. 3), and/or a memory 403 (e.g., the memory 130 of FIG. 1 or 2).

According to an embodiment, the antenna module 400 can include at least one of a first printed circuit board 410 (e.g., the first printed circuit board 310 of FIG. 3), a first wireless communication circuit 450 (e.g., the first wireless communication circuit 350 of FIG. 3), a power management circuit 460, and/or a first connector 491.

According to an embodiment, the first printed circuit board 410 can include a plurality of antenna arrays 421, 422, 431 and 432. For example, the plurality of antenna arrays 421, 422, 431 and 432 can be formed in at least some of a plurality of conductive layers (e.g., a plurality of conductive pattern layers or a plurality of circuit layers) included in the first printed circuit board 410.

According to an embodiment, the plurality of antenna arrays 421, 422, 431 and 432 can include at least one of a first antenna array 421, a second antenna array 422, a third antenna array 431 and/or a fourth antenna array 432. For example, the first antenna array 421 can include a structure arranging a first antenna (e.g., the first antenna 321 of FIG. 3) of the generally same form in the plural or a structure arranging at predetermined intervals. For example, the second antenna array 422 can include a structure arranging a second antenna (e.g., the second antenna 322 of FIG. 3) of the generally same form in the plural or a structure arranging at predetermined intervals. For example, the third antenna array 431 can include a structure arranging a third antenna (e.g., the third antenna 331 of FIG. 3) of the generally same form in the plural or a structure arranging at predetermined intervals. For example, the fourth antenna array 432 can include a structure arranging a fourth antenna (e.g., the fourth antenna 332 of FIG. 3) of the generally same form in the plural or a structure arranging at predetermined intervals.

According to an embodiment, the first wireless communication circuit 450 can be disposed in or be coupled to the first printed circuit board 410 through a conductive bonding member 403 (e.g., the conductive bonding member 303 of FIG. 3) such as, for example, and without limitation, a solder, and can be electrically connected with the first printed circuit board 410. For example, the first wireless communication circuit 450 can include a circuit element (e.g., an RFIC) which is mountable in the first printed circuit board 410 using the conductive bonding member such as the solder.

According to an embodiment, the first wireless communication circuit 450 can transmit and/or receive a second signal of at least a partial frequency band (e.g., a frequency band between about 24 GHz and about 100 GHz, a frequency band between about 24 GHz and about 30 GHz, or a frequency band between about 37 GHz and about 40 GHz) among a range of about 3 GHz to about 100 GHz through the first antenna array 421, second antenna array 422, third antenna array 431 and/or fourth antenna array 432 of the first printed circuit board 410. According to an embodiment, the first wireless communication circuit 450 can up-convert or down-convert a frequency of a signal transmitted and/or received in wireless communication. For example, the first wireless communication circuit 450 can receive an IF signal from the second wireless communication module 482 disposed in the second printed circuit board 470, and up-convert the received IF signal into a radio frequency (RF) signal. For example, the first wireless communication circuit 450 can down-convert an RF signal (e.g., a millimeter wave) received through the first antenna array 421, the second antenna array 422, the third antenna array 431 or the fourth antenna array 432, into an IF signal. The IF signal can be offered to the second wireless communication module 482 disposed in the second printed circuit board 470.

According to an embodiment, the first connector 491 can be disposed in or be coupled to a second surface (e.g., the second surface 310b of FIG. 3) of the first printed circuit board 410 through a conductive bonding member 462 such as, for example, and without limitation, a solder, and can be electrically connected with the first printed circuit board 410. At least some of the plurality of conductive layers included in the first printed circuit board 410 can include a conductive path electrically connecting the first connector 491 and the first wireless communication circuit 450.

According to an embodiment, a second connector 492 can be disposed in or be coupled to the second printed circuit board 470 through a conductive bonding member such as, for example, and without limitation, a solder, and can be electrically connected with the second printed circuit board 470. According to an embodiment, the electronic device 40 can include a conductive member 490 (e.g., the conductive member 390 of FIG. 3) electrically connecting the first connector 491 and the second connector 492. The conductive member 490 can electrically connect the antenna module 400 and the second printed circuit board 470. For example, the conductive member 490 can include, for example, and without limitation, a flexible printed circuit board, a coaxial cable, or the like. According to various embodiments, the second connector 492 can include a slot, and a portion of the first printed circuit board 410 can include, in place of the first connector 491, terminals inserted into the slot and electrically connected with the second connector 492.

According to an embodiment, the processor 401, the second wireless communication circuit 480, the power management module 402, the memory 403 or at least one antenna 483 can be electrically connected with the second printed circuit board 470. The processor 401, the second wireless communication circuit 480, the power management module 402 or the memory 403 can be disposed in or be coupled to the second printed circuit board 470 through a conductive bonding member such as, for example, and without limitation, a solder. According to an embodiment, the at least one antenna 483 can be isolated from the second printed circuit board 470, and can be electrically connected with the second printed circuit board 470 through a conductive member (e.g., an FPCB, a cable or a connector). According to various embodiments, the at least one antenna 483 can be disposed in the second printed circuit board 470, or be implemented as a conductive pattern included in the second printed circuit board 470 as well. According to various embodiments, the at least one antenna 483 can be disposed in a housing (not shown) forming an appearance of the electronic device 40, or include at least a portion (e.g., at least a portion of a member forming a side surface) of the housing.

According to an embodiment, the processor 401 may include various processing circuitry and can execute software and control at least one component (e.g., a hardware or software component) of the electronic device 40 electrically connected to the processor 401, and can perform various data processing or operations. According to an embodiment, the processor 401 can process a command or data stored in the memory 403. For example, the processor 401 can transmit and/or receive a signal through the second wireless communication circuit 480. The processor 401 can write data in the memory 403, or read. The processor 401 can perform functions of a protocol stack required in the communication standard. A portion of the second wireless communication circuit 480, and/or the processor 401, may, for example, be denoted as a communication processor (CP).

According to an embodiment, the second wireless communication circuit 480 can perform functions for transmitting and/or receiving a signal through a wireless channel. For example, the second wireless communication circuit 480 can perform a function of conversion between a baseband signal and/or a bit stream in compliance with the physical layer standard of a system. For example, at data transmission, the second wireless communication circuit 480 can provide complex symbols by encoding and modulating a transmission bit stream. At data reception, the second wireless communication circuit 480 can demodulate and decode a baseband signal and restore a reception bit stream. The second wireless communication circuit 480 can up-convert an RF signal and then transmit through at least one antenna, and down-convert an RF signal received through the at least one antenna into a baseband signal. For example, the second wireless communication circuit 480 can include elements such as, for example, and without limitation, a transmission filter, a reception filter, an amplifier, a mixer, an oscillator, a digital to analog converter (DAC), an analog to digital converter (ADC), etc.

According to various embodiments, the second wireless communication circuit 480 can include a plurality of wireless communication modules in order to process signals of mutually different frequency bands. For example, the second wireless communication circuit 480 can include a plurality of wireless communication modules in order to support mutually different many wireless access technologies. For example, the mutually different wireless access technologies can include, for example, and without limitation, Bluetooth low energy (BLE), wireless fidelity (WiFi), WiFi gigabyte (WiGig), a cellular network (e.g., long term evolution (LTE)), or the like. Also, the mutually different frequency bands can include a super high frequency (SHF) (e.g., about 2.5 GHz or about 5 GHz) band, a millimeter wave (e.g., about 60 GHz) band, etc.

According to an embodiment, the second wireless communication circuit 480 can be electrically connected with the antenna module 400 through the conductive member 490. For example, the second wireless communication circuit 480 can include a baseband processor, or at least one communication circuit (e.g., an intermediate frequency integrated circuit (IFIC) or a radio frequency integrated circuit (RFIC)). The second wireless communication circuit 480, for example, can include a baseband processor separate from the processor 401 (e.g., an application processor (AP)).

According to an embodiment, the second wireless communication circuit 480 can include at least one of the first wireless communication module (e.g., including communication circuitry) 481 and/or the second wireless communication module (e.g., including communication circuitry) 482. The electronic device 40 can further include one or more interfaces for supporting inter chip communication between the second wireless communication circuit 480 and the processor 401. The processor 401 and the first wireless communication module 481 or second wireless communication module 482 can transmit and/or receive data (or signal) using the inter chip interface (e.g., an inter processor communication channel).

According to an embodiment, the first wireless communication module 481 and/or the second wireless communication module 482 may include various communication circuitry and offer an interface for performing communication with other entities. The first wireless communication module 481, for example, can support wireless communication for a first network (e.g., the first cellular network 292 of FIG. 2) which utilizes the at least one antenna 483. The second wireless communication module 482, for example, can support wireless communication for a second network (e.g., the second cellular network 294 of FIG. 2) which utilizes the at least one antenna module 400. According to an embodiment, the first network can include a 4th generation (4G) network, and the second network can include a 5th generation (5G) network. The 4G network, for example, can support a long term evolution (LTE) protocol which is stipulated by 3GPP. The 5G network, for example, can support a new radio (NR) protocol which is stipulated by 3GPP. According to various embodiments, the first network can be related with wireless fidelity (WiFi) or global positioning system (GPS) as well.

According to an embodiment, the first wireless communication module 481 can receive a high frequency signal (below, a radio frequency (RF) signal) for a first network (e.g., a 4G network) through the at least one antenna 483, and modulate (e.g., down-convert) the received RF signal into a low frequency signal (below, a baseband signal) and transmit to the processor 401. The first wireless communication module 481 can receive a baseband signal for the first network from the processor 401, and modulate (e.g., up-convert) the received baseband signal into an RF signal, and transmit to the external through the at least one antenna 483. According to an embodiment, the first wireless communication module 481 can include an RFIC. According to various embodiments, when the RF signal is modulated into the baseband signal or the baseband signal is modulated into the RF signal, an input of a local oscillator (LO) can be utilized.

According to an embodiment, the second wireless communication module 482 can receive a baseband signal for the second network from the processor 401. By utilizing the input (below, an LO signal) of the local oscillator (LO), the second wireless communication module 482 can up-convert a baseband signal into an IF signal, and transmit the IF signal to the antenna module 400 through a conductive member 490. The antenna module 400 can receive an IF signal from the second wireless communication module 482 through the conductive member 490. By utilizing the LO signal, the antenna module 400 can up-convert an IF signal into an RF signal, and transmit the RF signal to the external through the one or more antenna arrays 421, 422, 431 and 432 included in the antenna module 400.

According to an embodiment, the antenna module 400 can receive an RF signal through the one or more antenna arrays 421, 422, 431 and 432. Using an LO signal, the antenna module 400 can down-convert the RF signal into an IF signal, and transmit the IF signal to the second wireless communication module 482 through the conductive member 490. The second wireless communication module 482 can receive an IF signal from the antenna module 400 through the conductive member 490. Using an LO signal, the second wireless communication module 482 can down-convert the IF signal into a baseband signal, and transmit the baseband signal to the processor 401. According to an embodiment, the second wireless communication module 482 can include an IFIC. The second wireless communication module 482, for example, can transmit and/or receive a first signal of a frequency band between about 5 GHz to about 15 GHz. According to an embodiment, the antenna module 400 can include an RFIC.

According to an embodiment, the second wireless communication module 482 and/or the first wireless communication circuit 450 can include many transmission and/or reception paths. For example, the second wireless communication module 482 or the first wireless communication circuit 450 can include a beamforming system for processing a transmitted or received signal wherein energy radiated from antenna elements of the first antenna array 421, second antenna array 422, third antenna array 431 or fourth antenna array 432 is converged in a specific direction in a space. According to an embodiment, the first wireless communication circuit 450 or the second wireless communication circuit 480 can adjust a phase of a current supplied to each first antenna (e.g., the first antenna 321 of FIG. 3) included in the first antenna array 421, a current supplied to each second antenna (e.g., the second antenna 322 of FIG. 3) included in the second antenna array 422, a current supplied to each third antenna (e.g., the third antenna 331 of FIG. 3) included in the third antenna array 431, or a current supplied to each fourth antenna (e.g., the fourth antenna 332 of FIG. 3) included in the fourth antenna array 432. For example, the second wireless communication module 482 or the first wireless communication circuit 450 can include a first electrical path electrically connected with a first point on one antenna, and a second electrical path electrically connected with a second point on the other antenna. The processor 401, the second wireless communication module 482 or the first wireless communication circuit 450 can offer a phase difference between a first signal at the first point and a second signal at the second point. According to various embodiments (not shown), the electronic device 40 can include one or more phase shifters which are disposed in the first printed circuit board 410 or the second printed circuit board 470. The one or more phase shifters can adjust phases of a plurality of antennas which are included in the first antenna array 421, the second antenna array 422, the third antenna array 431 or the fourth antenna array 432.

According to an embodiment, the memory 403 can store codebook information on beamforming. Based on the codebook information, the processor 401, the second wireless communication module 482 or the first wireless communication circuit 450 efficiently control (e.g., allocate or dispose) many beams through the plurality of antennas included in the first antenna array 421, the second antenna array 422, the third antenna array 431 or the fourth antenna array 432.

According to various embodiments, the first wireless communication module 481 and/or the second wireless communication module 482 can form one module with the processor 401. For example, the first wireless communication module 481 and/or the second wireless communication module 482 can be integrally formed with the processor 401. According to various embodiments, the first wireless communication module 481 and/or the second wireless communication module 482 can be disposed within one chip, or be formed in an independent chip form.

According to an embodiment, the processor 401 and one wireless communication module (e.g., the first wireless communication module 481) can be integrally formed within one chip (SoC chip), and the other wireless communication module (e.g., the second wireless communication module 482) can be formed in an independent chip form.

According to an embodiment, at least some of the plurality of layers included in the first printed circuit board 410 can include a conductive path which is utilized to exchange a signal related with various logics (e.g., a logic related to the second cellular network 294 of FIG. 2) between the first wireless communication circuit 450 and the second wireless communication module 482.

According to an embodiment, the power management module 402 (e.g., the power management module 188 of FIG. 1) may include various power management circuitry and manage power supplied to the electronic device 40 using, for example, power of a battery (e.g., the battery 189 of FIG. 1) electrically connected to the second printed circuit board 470.

According to an embodiment, the power management circuit 460 can be disposed in or be coupled to a second surface (e.g., the second surface 310b of FIG. 3) of the first printed circuit board 410 through a conductive bonding member 461 such as a solder, and can be electrically connected with the first printed circuit board 410. The power management circuit 460 can receive power from the power management module 402 through the conductive member 490, and manage power supplied to the antenna module 400 using the received power. According to an embodiment, the power management circuit 460, for example, can be implemented as at least a portion of a power management integrated circuit (PMIC).

According to various embodiments, the power management circuit 460 can be omitted in the antenna module 400 as well. The power management module 402 can manage power supplied to the antenna module 400.

According to an embodiment, at least some of the plurality of layers included in the first printed circuit board 410 can include a conductive path electrically connecting the first connector 491 and the power management circuit 460

According to an embodiment, at least some of the plurality of layers included in the first printed circuit board 410 can include a conductive path for offering power to load elements between the power management circuit 460 and the load elements (e.g., the first wireless communication circuit 450).

According to various embodiments (not shown), the electronic device 40 can further include a frequency adjusting circuit which is disposed in the first printed circuit board 410. Radiation characteristics, and impedance, of the one or more antenna arrays 421, 422, 431 and 432 can be related to antenna performance, and be various according to a shape and size of an antenna element, and materials of the antenna element. A radiation characteristic of the antenna element can include an antenna radiation pattern (or an antenna pattern) that is a directional function indicating a relative distribution of power radiated from the antenna element, and a polarization state (or antenna polarization) of an electronic wave radiated from the antenna element. The impedance of the antenna element can be related to power forwarding from a transmitter to the antenna element or power forwarding from the antenna element to a receiver. To minimize and/or reduce reflection at a connection part between a transmission line and the antenna element, the impedance of the antenna element can be designed to match with impedance of the transmission line, and due to this, maximal power forwarding (or power loss minimization) through the antenna element or efficient signal forwarding can be possible. The impedance matching can lead to an efficient signal flow at a specific frequency (or resonance frequency). Impedance mismatching can cause a power loss or a decrease a transceiving signal and deteriorate communication performance. According to an embodiment, the frequency adjusting circuit (e.g., a tuner or a passive element) disposed in the first printed circuit board 410 can solve this impedance mismatching. According to an embodiment, the frequency adjusting circuit can shift a resonance frequency of the antenna by a specified frequency, or move as much as specified.

According to an embodiment, at least some of the plurality of layers included in the first printed circuit board 410 can include a conductive path for electrically connecting the frequency adjusting circuit (e.g., the passive element) with the first wireless communication circuit 450 or the one or more antenna arrays 421, 422, 431 and 432.

Figure 5A:
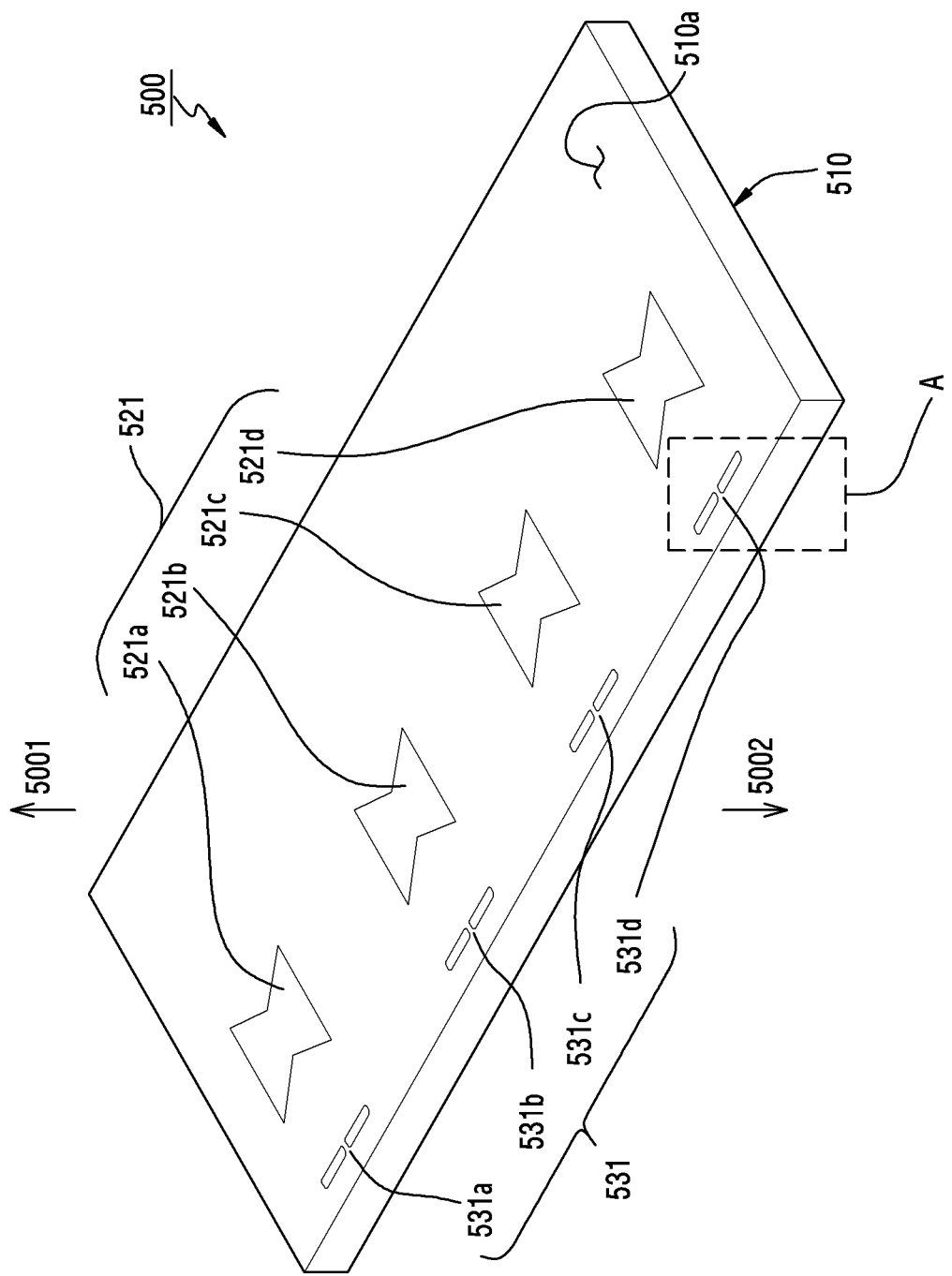
FIG. 5A is a front perspective view of an antenna module according to various embodiments.
Figure 5B:
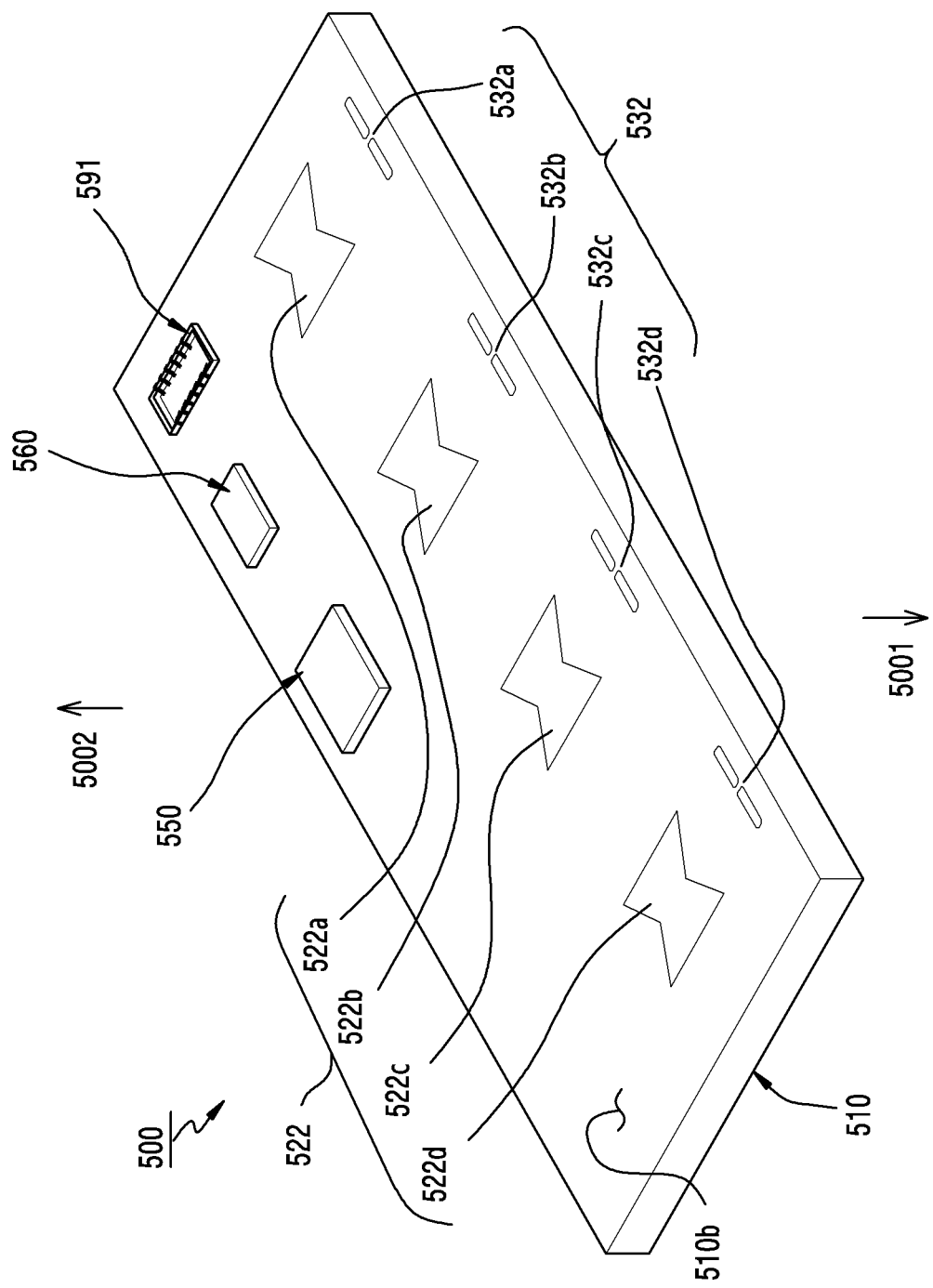
FIG. 5B is a rear perspective view of an antenna module according to various embodiments'
Figure 5C:
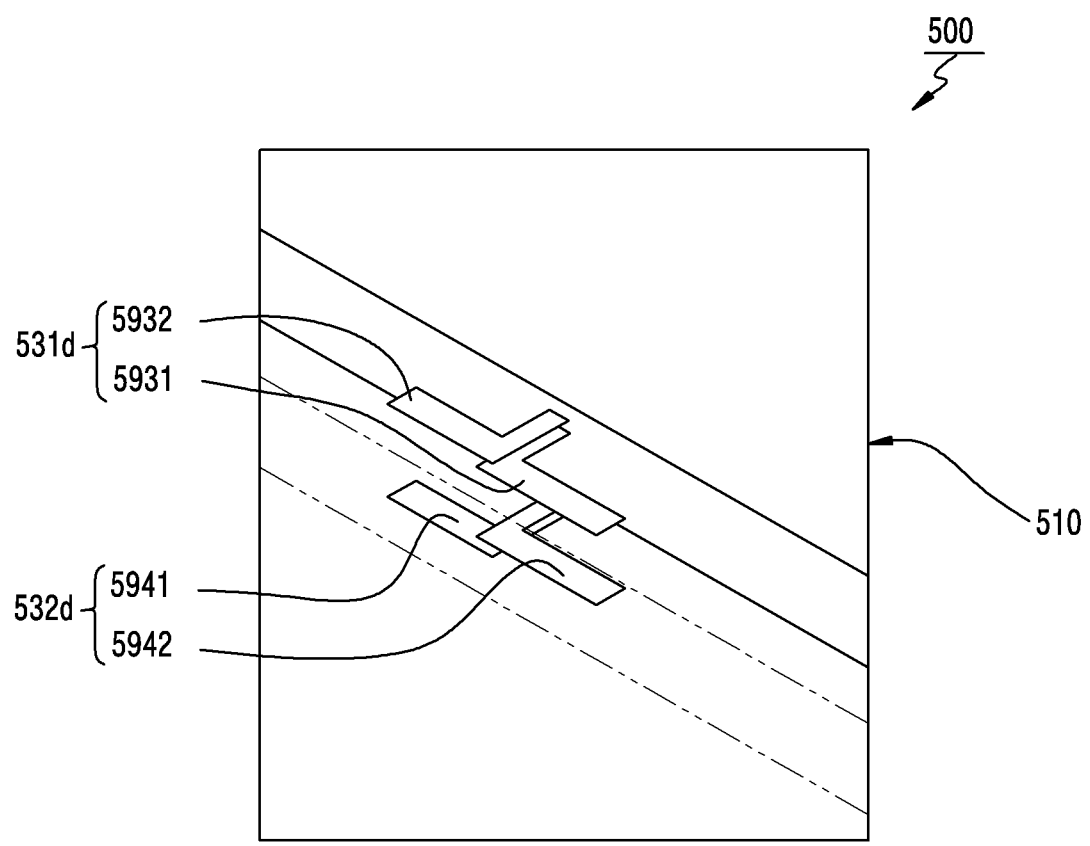
FIG. 5C is a diagram illustrating a portion 'A' of FIG. 5A according to various embodiments.

FIG. 5A is a front perspective view of an antenna module according to various embodiments. FIG. 5B is a rear perspective view of the antenna module according to various embodiments. FIG. 5C is a diagram illustrating a structure of a portion 'A' of FIG. 5A according to various embodiments.

Referring to FIGS. 5A and 5B, in an embodiment, the antenna module 500 (e.g., the antenna module 300 of FIG. 3, or the antenna module 400 of FIG. 4) can include at least one of a printed circuit board 510 (e.g., the first printed circuit board 310 of FIG. 3, or the first printed circuit board 410 of FIG. 4), a communication circuit 550 (e.g., the first wireless communication circuit 350 of FIG. 3, or the first wireless communication circuit 450 of FIG. 4), a power management circuit 560 (e.g., the power management circuit 460 of FIG. 4), and/or a connector 591 (e.g., the first connector 491 of FIG. 4).

According to an embodiment, the printed circuit board 510 can include at least one of a first antenna array 521 (e.g., the first antenna array 421 of FIG. 4), a second antenna array 522 (e.g., the second antenna array 422 of FIG. 4), a third antenna array 531 (e.g., the third antenna array 431 of FIG. 4), and/or a fourth antenna array 532 (e.g., the fourth antenna array 432 of FIG. 4).

For example, the first antenna array 521 can include a plurality of first antennas 521*a*, 521*b*, 521*c* or 521*d* which are implemented as at least some of a plurality of conductive layers of the printed circuit board 510. According to an embodiment, the first antenna 521*a*, 521*b*, 521*c* or 521*d* may, for example, include the first antenna 321 of FIG. 3.

For example, the second antenna array 522 can include a plurality of second antennas 522*a*, 522*b*, 522*c* or 522*d* which are implemented as at least some of the plurality of conductive layers of the printed circuit board 510. According to an embodiment, the second antenna 522*a*, 522*b*, 522*c* or 522*d* may, for example, include the second antenna 322 of FIG. 3.

For example, the third antenna array 531 can include a plurality of third antennas 531*a*, 531*b*, 531*c* or 531*d* which are implemented as at least some of the plurality of conductive layers of the printed circuit board 510. According to an embodiment, the third antenna 531*a*, 531*b*, 531*c* or 531*d* may, for example, include the third antenna 331 of FIG. 3.

For example, the fourth antenna array 532 can include a plurality of fourth antennas 532*a*, 532*b*, 532*c* or 532*d* which are implemented as at least some of the plurality of conductive layers of the printed circuit board 510. According to an embodiment, the fourth antenna 532*a*, 532*b*, 532*c* or 532*d* may, for example, include the fourth antenna 332 of FIG. 3. According to various embodiments, the number of antennas included in the first antenna array 521, the second antenna array 522, the third antenna array 531 or the fourth antenna array 532 is not limited to FIG. 5A or 5B and be various.

The printed circuit board 510, for example, can include a first surface 510*a* (e.g., the first surface 310*a* of FIG. 3) extending in a first direction 5001, and a second surface 510*b* (e.g., the second surface 310*b* of FIG. 3) extending in a second direction 5002. According to an embodiment, the first antenna array 521 and the second antenna array 522 can be disposed between the first surface 510*a* and the second surface 510*b* and, when viewed from above the first surface 510*a*, the first antennas 521*a*, 521*b*, 521*c* and 521*d* can overlap mutually at least partially with the second antennas 522*a*, 522*b*, 522*c* and 522*d*. According to an embodiment, the third antenna array 531 and the fourth antenna array 532 can be disposed between the first surface 510*a* and the second surface 510*b* and, when viewed from above the first surface 510*a*, the third antennas 531*a*, 531*b*, 531*c* and 531*d* can overlap mutually at least partially with the fourth antennas 532*a*, 532*b*, 532*c* and 532*d*.

According to an example embodiment, the electronic device (e.g., the electronic device 101 of FIG. 1, the electronic device 30 of FIG. 3, or the electronic device 40 of FIG. 4) disposing the antenna module 500 can include a housing which includes a front surface, a rear surface, and a side surface surrounding a space between the front surface and the rear surface, and a display which is disposed in the housing and is exposed through the front surface. According to an embodiment, the antenna module 500 can be disposed substantially in parallel with a printed circuit board (e.g., the second printed circuit board 370 of FIG. 3, or the second printed circuit board 470 of FIG. 4) between the front surface and rear surface of the electronic device. Through phase adjustment, at least some of the plurality of antennas 521*a*, 521*b*, 521*c* and 521*d* included in the first antenna array 521 can form a beam which relatively radiates more energy towards the front surface or side surface of the electronic device. Through the phase adjustment, at least some of the plurality of antennas 522*a*, 522*b*, 522*c* and 522*d* included in the second antenna array 522 can form a beam which relatively radiates more energy towards the rear surface or side surface of the electronic device. Through the phase adjustment, at least some of the plurality of antennas 531*a*, 531*b*, 531*c* and 531*d* included in the third antenna array 531 can form a beam which relatively radiates more energy towards the front surface or side surface of the electronic device. Through the phase adjustment, at least some of the plurality of antennas 532*a*, 532*b*, 532*c* and 532*d* included in the fourth antenna array 532 can form a beam which relatively radiates more energy towards the rear surface or side surface of the electronic device.

According to an embodiment, when viewed from above the first surface 510*a*, the first antennas 521*a*, 521*b*, 521*c* and 521*d* of the first antenna array 521 can be formed in a bow-tie appearance. The antenna of the bow-tie appearance, for example, can include an antenna which is formed in a concave shape in which a one-side portion or both-side portion of a conductive plate is dug and sunken.

According to various embodiments, when viewed from above the second surface 510*b*, the second antennas 522*a*, 522*b*, 522*c* and 522*d* of the second antenna array 522 can be formed in the bow-tie appearance.

Referring to FIG. 5C, in an embodiment, the third antenna 531*d* of the third antenna array 531 can include a third antenna element 5931 (e.g., the third antenna element 331*a* of FIG. 3) and/or a fourth antenna element 5932 (e.g., the fourth antenna element 331*b* of FIG. 3). The fourth antenna 532*d* of the fourth antenna array 532 can include a fifth antenna element 5941 (e.g., the fifth antenna element 332*a* of FIG. 3) and/or a sixth antenna element 5942 (e.g., the sixth antenna element 332*b* of FIG. 3). According to an embodiment, the third antenna 531*d* and the fourth antenna 532*d* can be implemented as a dipole antenna.

For example, the third antenna element 5931 and the fourth antenna element 5932 can be connected with the communication circuit 550 of FIG. 5B. For another example, the third antenna element 5931 can be electrically connected with the communication circuit 550 of FIG. 5B, and the fourth antenna element 5932 can be electrically connected with the ground plane (or the ground layer) of the printed circuit board 510 or the ground of the communication circuit 550.

For example, the fifth antenna element 5941 and the sixth antenna element 5942 can be electrically connected with the communication circuit 550 of FIG. 5B. For another example, the fifth antenna element 5941 can be electrically connected with the communication circuit 550 of FIG. 5B, and the sixth antenna element 5942 can be electrically connected with the ground plane of the printed circuit board 510 or the ground of the communication circuit 550.

According to various embodiments, like the third antenna 531*d* shown in FIG. 5C, the remaining third antennas 531*a*, 531*b* and 531*c* of the third antenna array 531 each can be implemented as a structure including a third antenna element and/or a fourth antenna element, and operate as a dipole antenna. Like the fourth antenna 532*d* shown in FIG. 5C, the remaining fourth antennas 532*a*, 532*b* and 532*c* of the fourth antenna array 532 each can be implemented as a structure including a fifth antenna element and/or a sixth antenna element, and operate as a dipole antenna.

Referring to FIG. 5B, in an embodiment, the communication circuit 550 can be disposed in or be coupled to the second surface 510*b* of the first printed circuit board 510 through a conductive bonding member (e.g., the conductive bonding member 303 of FIG. 3, or the conductive bonding member 403 of FIG. 4) such as, for example, and without limitation, a solder, and can be electrically connected with the first printed circuit board 510. The communication circuit 550 can be electrically connected with the first antenna array 521, the second antenna array 522, the third antenna array 531 and the fourth antenna array 532.

According to an embodiment, the power management circuit 560 can be disposed in or be coupled to the second surface 510*b* of the first printed circuit board 510 through a conductive bonding member (e.g., the conductive bonding member 461 of FIG. 4) such as, for example, and without limitation, the solder, and can be electrically connected with the printed circuit board 510. The power management circuit 560 can be electrically connected with the communication circuit 550, the connector 591 or various other elements (e.g., a passive element) disposed in the printed circuit board 510, through at least one conductive layer included in the printed circuit board 510.

According to an embodiment, the connector 591 can be disposed in or be coupled to the second surface 510*b* of the first printed circuit board 510 through a conductive bonding member (e.g., the conductive bonding member 462 of FIG. 4) such as a solder, and can be electrically connected with the printed circuit board 510. The connector 591 can be electrically connected with the communication circuit 550, the power management circuit 560 or various other elements disposed in the printed circuit board 510, through at least one conductive layer included in the printed circuit board 510.

Figure 6:
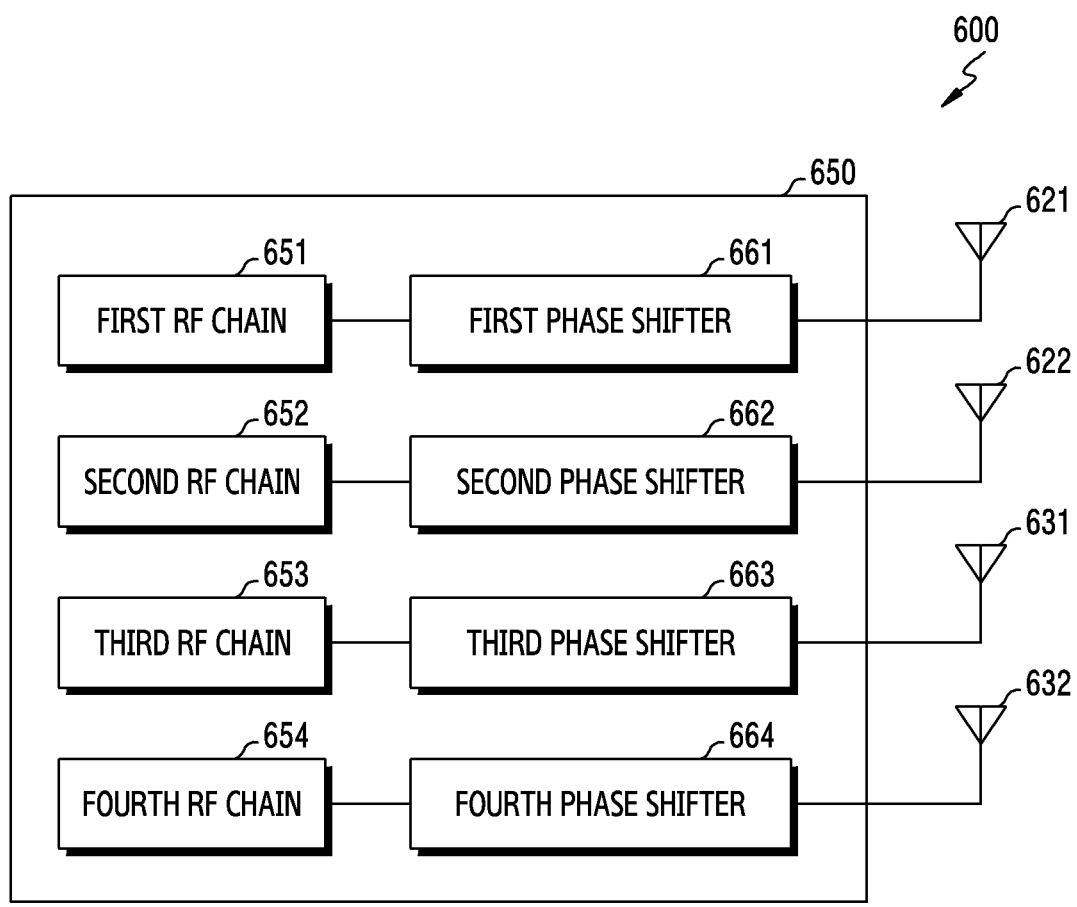
FIG. 6 is a block diagram illustrating an example configuration of an antenna module according to various embodiments.

FIG. 6 is a block diagram illustrating an example configuration of an antenna module according to various embodiments.

Referring to FIG. 6, in an embodiment, the antenna module 600 (e.g., the antenna module 300 of FIG. 3, the antenna module 400 of FIG. 4 or the antenna module 500 of FIG. 5A) can include at least one of a communication circuit 650 (e.g., the first wireless communication circuit 350 of FIG. 3, the first wireless communication circuit 450 of FIG. 4 or the communication circuit 550 of FIG. 5B), a first antenna element 621, a second antenna element 622, a third antenna element 631 and/or a fourth antenna element 632.

According to an embodiment, the first antenna element 621, the second antenna element 622, the third antenna element 631 and/or the fourth antenna element 632 can be formed in at least some of a plurality of conductive layers included in a printed circuit board (e.g., the first printed circuit board 310 of FIG. 3, the first printed circuit board 410 of FIG. 4 or the printed circuit board 510 of FIG. 5A).

According to an embodiment, the first antenna element 621 can include the first antenna element 321*a* or 321*b* included in the first antenna 321 of FIG. 3. According to various embodiments, the first antenna element 621 can include the antenna element included in the antenna of the first antenna array 421 of FIG. 4. According to various embodiments, the first antenna element 621 can include the antenna element included in the first antenna 521*a*, 521*b*, 521*c* or 521*d* of FIG. 5A.

According to an embodiment, the second antenna element 622 can include the second antenna element 322*a* or 322*b* included in the second antenna 322 of FIG. 3. According to various embodiments, the second antenna element 622 can include the antenna element included in the antenna of the second antenna array 422 of FIG. 4. According to various embodiments, the second antenna element 622 can include the antenna element included in the second antenna 522a, 522b, 522c or 522d of FIG. 5B.

According to an embodiment, the third antenna element 631 can include the third antenna element 331a or fourth antenna element 331b included in the third antenna 331 of FIG. 3. According to various embodiments, the third antenna element 631 can include the antenna element included in the antenna of the third antenna array 431 of FIG. 4. According to various embodiments, the third antenna element 631 can include the antenna element included in the third antenna 531a, 531b, 531c or 531d of FIG. 5A.

According to an embodiment, the fourth antenna element 632 can include the fifth antenna element 332a or sixth antenna element 332b included in the fourth antenna 332 of FIG. 3. According to various embodiments, the fourth antenna element 632 can include the antenna element included in the antenna of the fourth antenna array 432 of FIG. 4. According to various embodiments, the fourth antenna element 632 can include the antenna element included in the fourth antenna 532a, 532b, 532c or 532d of FIG. 5B.

According to an embodiment, the first antenna element 621 can be electrically connected with a first RF chain 651 (e.g., a first transmission line) in a single feeding scheme. The second antenna element 622 can be electrically connected with a second RF chain 652 (e.g., a second transmission line) in the single feeding scheme. The third antenna element 631 can be electrically connected with a third RF chain 653 (e.g., a third transmission line) in the single feeding scheme. The fourth antenna element 632 can be electrically connected with a fourth RF chain 654 (e.g., a fourth transmission line) in the single feeding scheme.

According to an embodiment, the antenna module 600 can include a first phase shifter 661 electrically connected with the first RF chain 651 and for determining a phase of the first antenna element 621. The antenna module 600 can include a second phase shifter 662 electrically connected with the second RF chain 652 and for determining a phase of the second antenna element 622. The antenna module 600 can include a third phase shifter 663 electrically connected with the third RF chain 653 and for determining a phase of the third antenna element 631. The antenna module 600 can include a fourth phase shifter 664 electrically connected with the fourth RF chain 654 and for determining a phase of the fourth antenna element 632.

For example, by the first phase shifter 661, the first antenna element 621 can be fed to have a specified phase through the first RF chain 651. By the second phase shifter 662, the second antenna element 622 can be fed to have a specified phase through the second RF chain 652. By the third phase shifter 663, the third antenna element 631 can be fed to have a specified phase through the third RF chain 653. By the fourth phase shifter 664, the fourth antenna element 632 can be fed to have a specified phase through the fourth RF chain 654. By determining the phases of the antenna elements 621, 622, 631 and 632, a set beamforming utilizing the antenna module 600 can be implemented.

In accordance with an embodiment, referring to Table 1 below, the electronic device (e.g., the electronic device 101 of FIG. 1, the electronic device 30 of FIG. 3 or the electronic device 40 of FIG. 4) utilizing the antenna module 600 can offer various communication modes such as a first communication mode on beamforming, a second communication mode and a third communication mode. For example, the electronic device can determine a phase of a current (or a signal) supplied to the first antenna element 621, the second antenna element 622, the third antenna element 631 or the fourth antenna element 632 according to the communication mode, based on codebook information about beamforming stored in a memory (e.g., the memory 130 of FIG. 1 or the memory 403 of FIG. 4).

Referring to Table 1, for example, in the first communication mode, the communication circuit 650 can control the first phase shifter 661 and the second phase shifter 662 wherein a phase difference between the current (or a radiation current) supplied to the first antenna element 621 and the current supplied to the second antenna element 622 becomes 0° substantially. For example, in the first communication mode, the communication circuit 650 can control the third phase shifter 663 and the fourth phase shifter 664 wherein a phase difference between a current supplied to the third antenna element 631 and a current supplied to the fourth antenna element 632 becomes 180° substantially.

Referring to Table 1, for example, in the second communication mode, the communication circuit 650 can control the first phase shifter 661 and the second phase shifter 662 wherein the phase difference between the current supplied to the first antenna element 621 and the current supplied to the second antenna element 622 becomes 180° substantially. For example, in the second communication mode, the communication circuit 650 can control the third phase shifter 663 and the fourth phase shifter 664 wherein the phase difference between the current supplied to the third antenna element 631 and the current supplied to the fourth antenna element 632 becomes 0° substantially.

Referring to Table 1, for example, in the third communication mode, the communication circuit 650 can control the first phase shifter 661 and the second phase shifter 662 wherein the phase difference between the current supplied to the first antenna element 621 and the current supplied to the second antenna element 622 becomes 0° substantially. For example, in the third communication mode, the communication circuit 650 can control the third phase shifter 663 and the fourth phase shifter 664 wherein the phase difference between the current supplied to the third antenna element 631 and the current supplied to the fourth antenna element 632 becomes 0° substantially.

TABLE 1

|  | First antenna element 621 | Second antenna element 622 | Third antenna element 631 | Fourth antenna element 632 |
|---|---|---|---|---|
| Phase difference in first communication mode | 0° | | 180° | |
| Phase difference in second communication mode | | 180° | | 0° |

TABLE 1-continued

|  | First antenna element 621 | Second antenna element 622 | Third antenna element 631 | Fourth antenna element 632 |
|---|---|---|---|---|
| Phase difference in third communication mode | | 0° | | 0° |

According to various embodiments, the communication circuit 650 can control the first phase shifter 661 and the second phase shifter 662 wherein the phase difference between the current supplied to the first antenna element 621 and the current supplied to the second antenna element 622 is formed different from 0° or 180° in various other communication modes as well.

According to various embodiments, the communication circuit 650 can control the third phase shifter 663 and the fourth phase shifter 664 wherein the phase difference between the current supplied to the third antenna element 631 and the current supplied to the fourth antenna element 632 is formed different from 0° or 180° in various other communication modes as well.

According to an embodiment, the first phase shifter 661, the second phase shifter 662, the third phase shifter 663 or the fourth phase shifter 664 can be integrally formed in the communication circuit 650. According to various embodiments, at least one of the first phase shifter 661, the second phase shifter 662, the third phase shifter 663 or the fourth phase shifter 664 can be implemented as an element separate from the communication circuit 650.

Figure 7A:
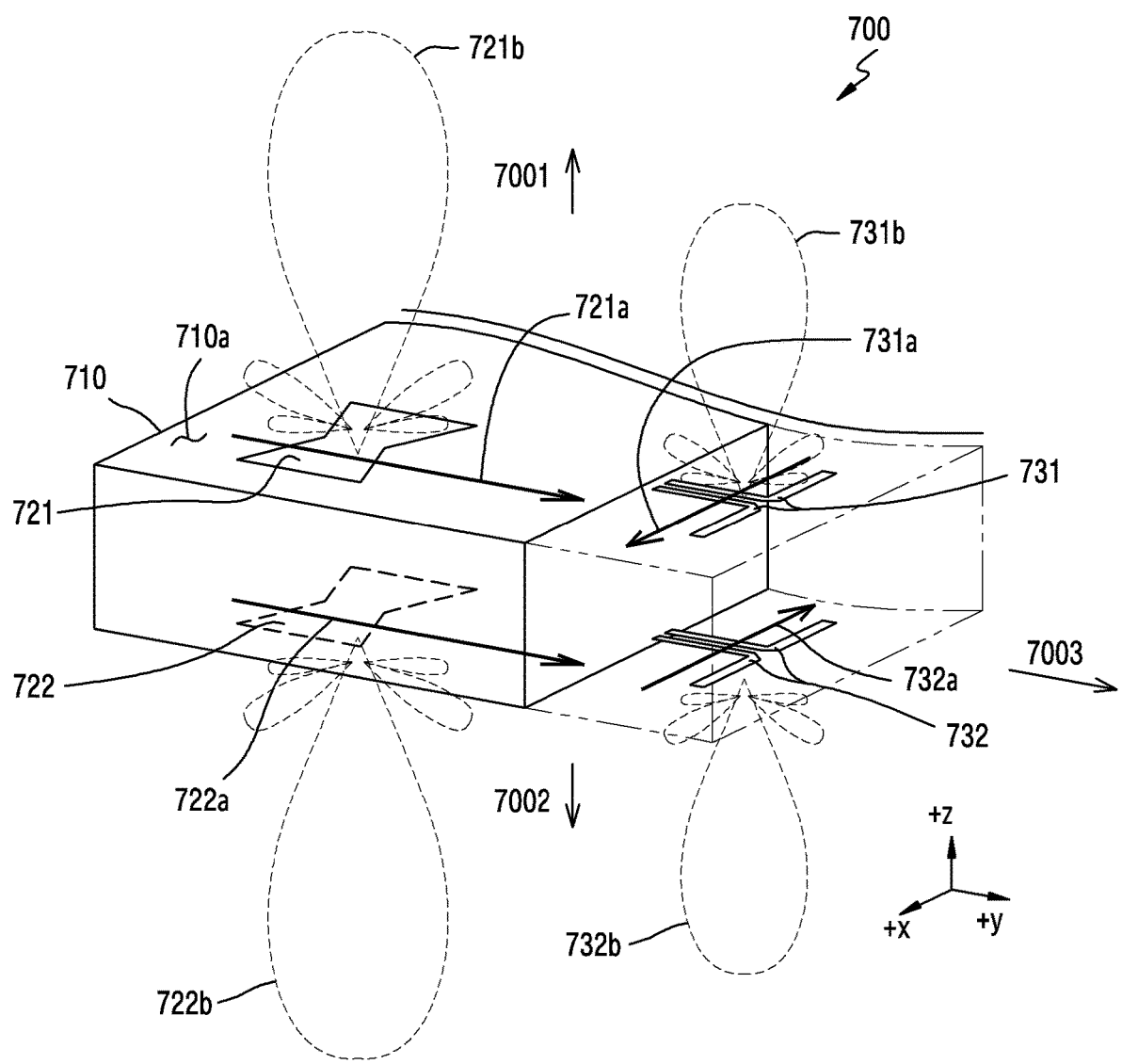
FIG. 7A is a diagram illustrating an antenna module and a beam formed by the antenna module according to various embodiments.
Figure 7B:
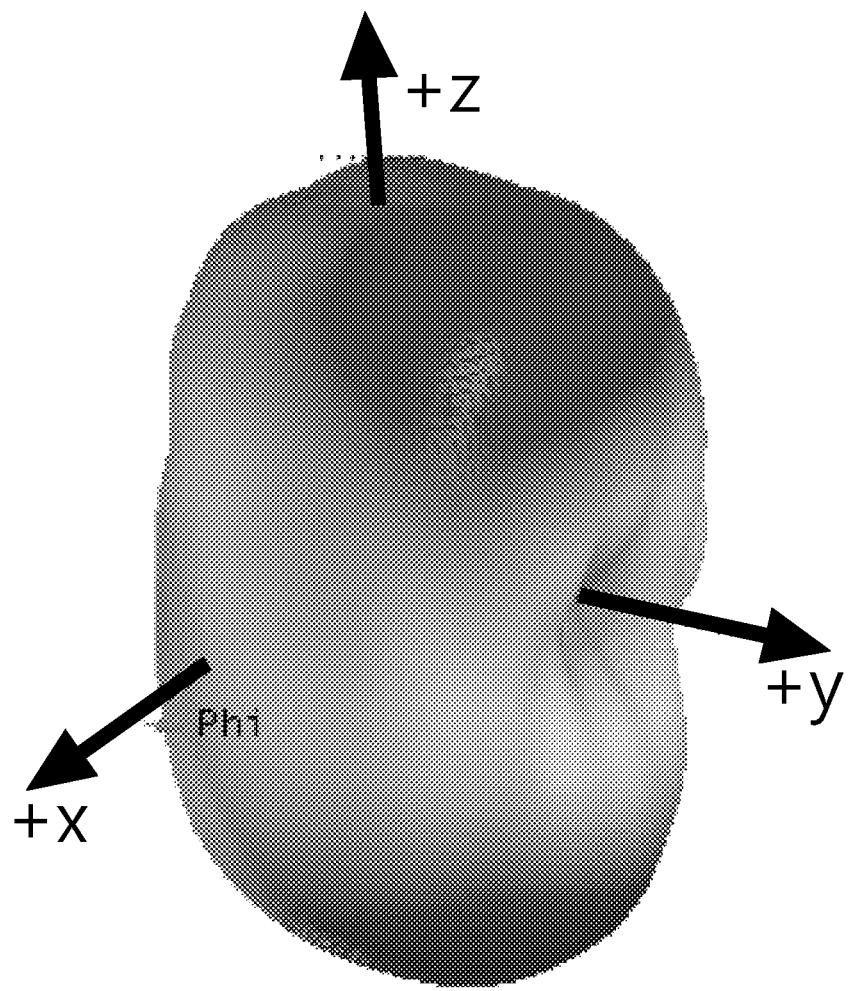
FIG. 7B is a diagram illustrating an example beam formed through a first patch antenna and a second patch antenna in relation with FIG. 7A according to various embodiments.
Figure 7C:
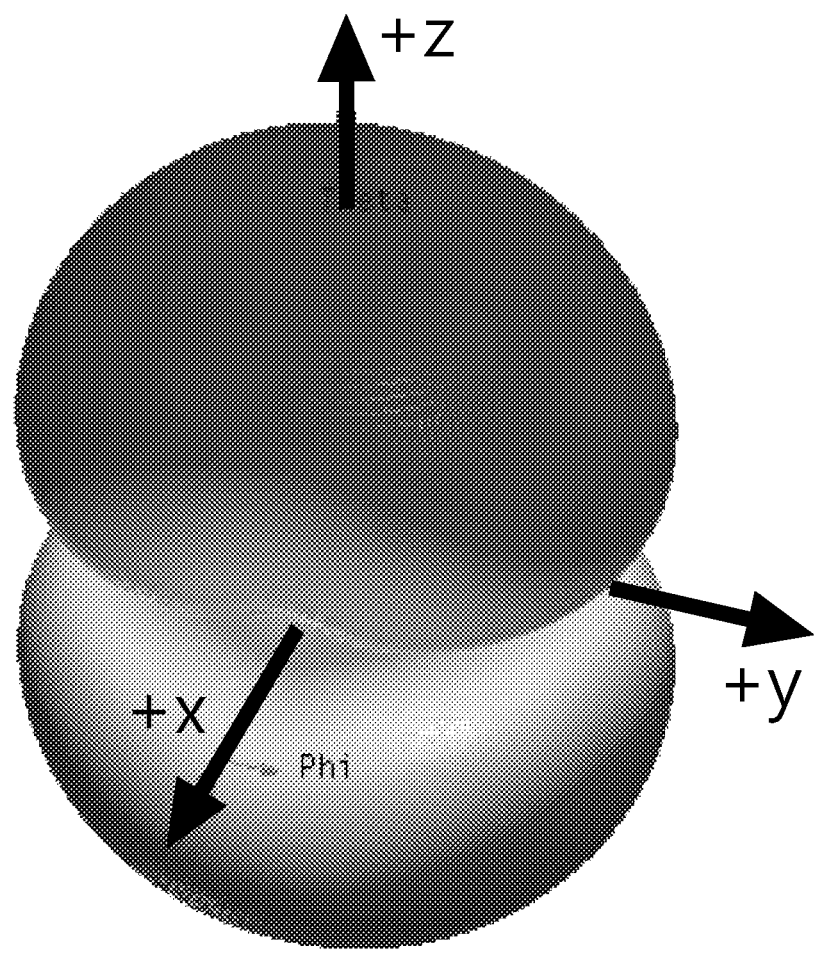
FIG. 7C is a diagram illustrating an example beam formed through a first dipole antenna and a second dipole antenna in relation with FIG. 7A according to various embodiments.

FIG. 7A is a diagram illustrating an antenna module and a beam formed through the antenna module according to various embodiments. FIG. 7B is a diagram illustrating an example beam formed through a first patch antenna and a second patch antenna in relation with FIG. 7A according to various embodiments. FIG. 7C is a diagram illustrating an example beam formed through a first dipole antenna and a second dipole antenna in relation with FIG. 7A according to various embodiments.

Referring to FIG. 7A, in an embodiment, the antenna module 700 can include at least one of a first patch antenna 721 (e.g., the first antenna 321 of FIG. 3) formed in a printed circuit board 710 (e.g., the first printed circuit board 310 of FIG. 3), a second patch antenna 722 (e.g., the second antenna 322 of FIG. 3), a first dipole antenna 731 (e.g., the third antenna 331 of FIG. 3) and/or a second dipole antenna 732 (e.g., the fourth antenna 332 of FIG. 3).

According to an embodiment, the printed circuit board 710 can include a first surface 710a (e.g., the first surface 310a of FIG. 3) extending in a first direction 7001, and a second surface (e.g., the second surface 310b of FIG. 3) extending in a second direction 7002. The first patch antenna 721 and the second patch antenna 722 can be disposed between the first surface 710a and the second surface and, when viewed from above the first surface 710a, the first patch antenna 721 can at least partially overlap the second patch antenna 722. According to an embodiment, the first dipole antenna 731 and the second dipole antenna 732 can be disposed between the first surface 710a and the second surface and, when viewed from above the first surface 710a, the first dipole antenna 731 can at least partially overlap the second dipole antenna 732.

According to an embodiment, a communication circuit (e.g., the first wireless communication circuit 350 of FIG. 3) electrically connected with the printed circuit board 710 can be set wherein a radiation current supplied to the first patch antenna 721 and a radiation current supplied to the second patch antenna 722 have substantially a phase difference of 0° (e.g., setting an in-phase). Referring to FIGS. 7A and 7B, in response to the phase difference between the radiation current supplied to the first patch antenna 721 and the radiation current supplied to the second patch antenna 722 being 0°, a direction 721a in which the radiation current flows in the first patch antenna 721 and a direction 722a in which the radiation current flows in the second patch antenna 722 can be substantially the same. According to an embodiment, the directions 721a and 722a can be substantially a direction of +y axis (e.g., a third direction 7003 orthogonal with the first direction 7001). By this, a beam 721b relatively radiating more energy substantially in a direction of +z axis (e.g., the first direction 7001) through the first patch antenna 721 and a beam 722b relatively radiating more energy substantially in a direction of −z axis (e.g., the second direction 7002) through the second patch antenna 722 can be formed.

According to an embodiment, the communication circuit (e.g., the first wireless communication circuit 350 of FIG. 3) can be set wherein a radiation current supplied to the first dipole antenna 731 and a radiation current supplied to the second dipole antenna 732 have substantially a phase difference of 180° (e.g., setting an out-of-phase). Referring to FIGS. 7A and 7C, in response to the phase difference between the radiation current supplied to the first dipole antenna 731 and the radiation current supplied to the second dipole antenna 732 being 180°, a direction 731a in which the radiation current flows in the first dipole antenna 731 and a direction 732a in which the radiation current flows in the second dipole antenna 732 can be substantially opposite. According to an embodiment, the direction 731a in which the radiation current flows in the first dipole antenna 731 can be substantially a direction of +x axis, and the direction 732a in which the radiation current flows in the second dipole antenna 732 can be substantially a direction of −x axis. By this, a beam 731b relatively radiating more energy substantially in a direction of +z axis (e.g., the first direction 7001) through the first dipole antenna 731 and a beam 732b relatively radiating more energy substantially in a direction of −z axis (e.g., the second direction 7002) through the second dipole antenna 732 can be formed.

Figure 8A:
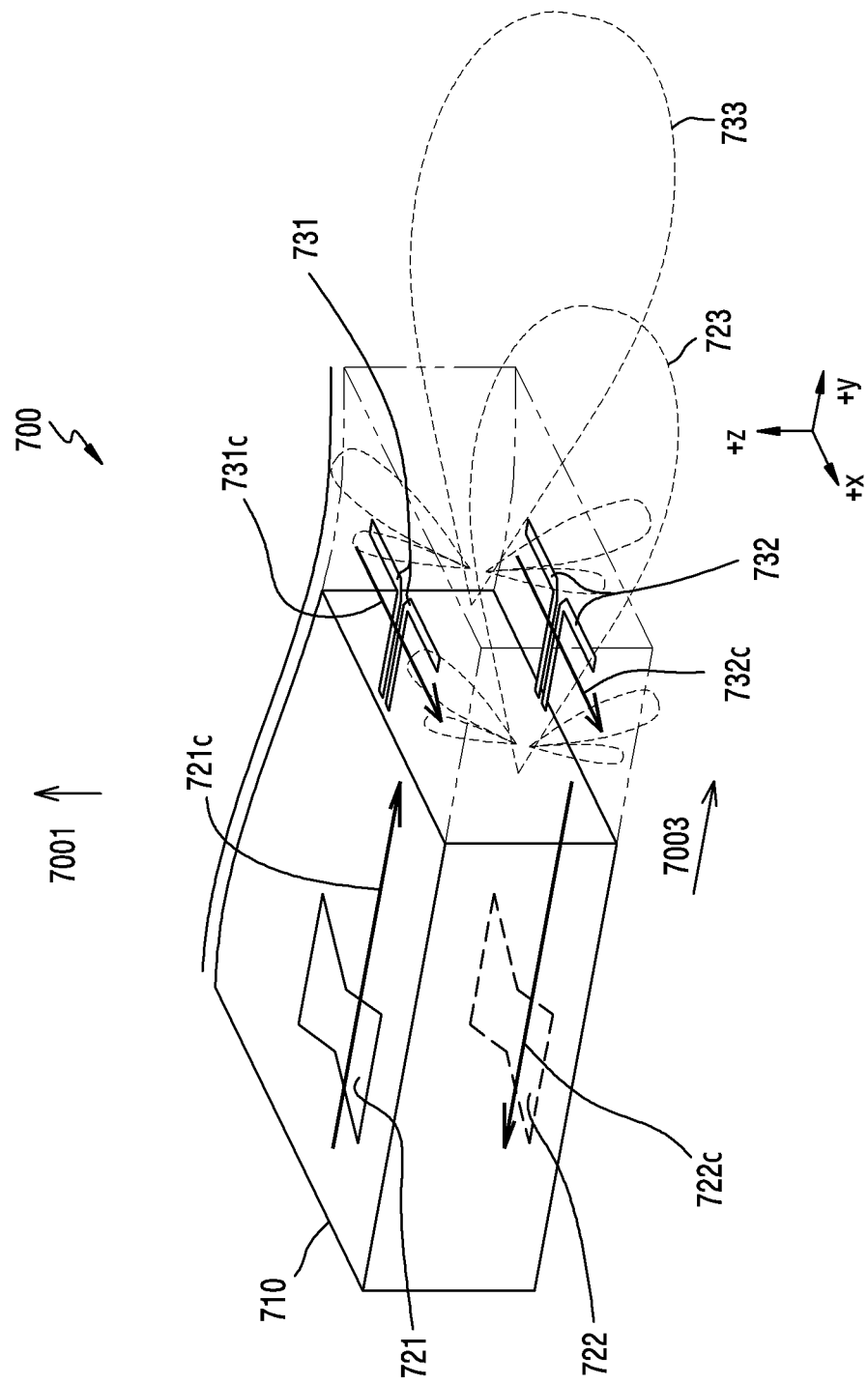
FIG. 8A is a diagram illustrating an example configuration of an antenna module and a beam formed through the antenna module according to various embodiments.
Figure 8B:
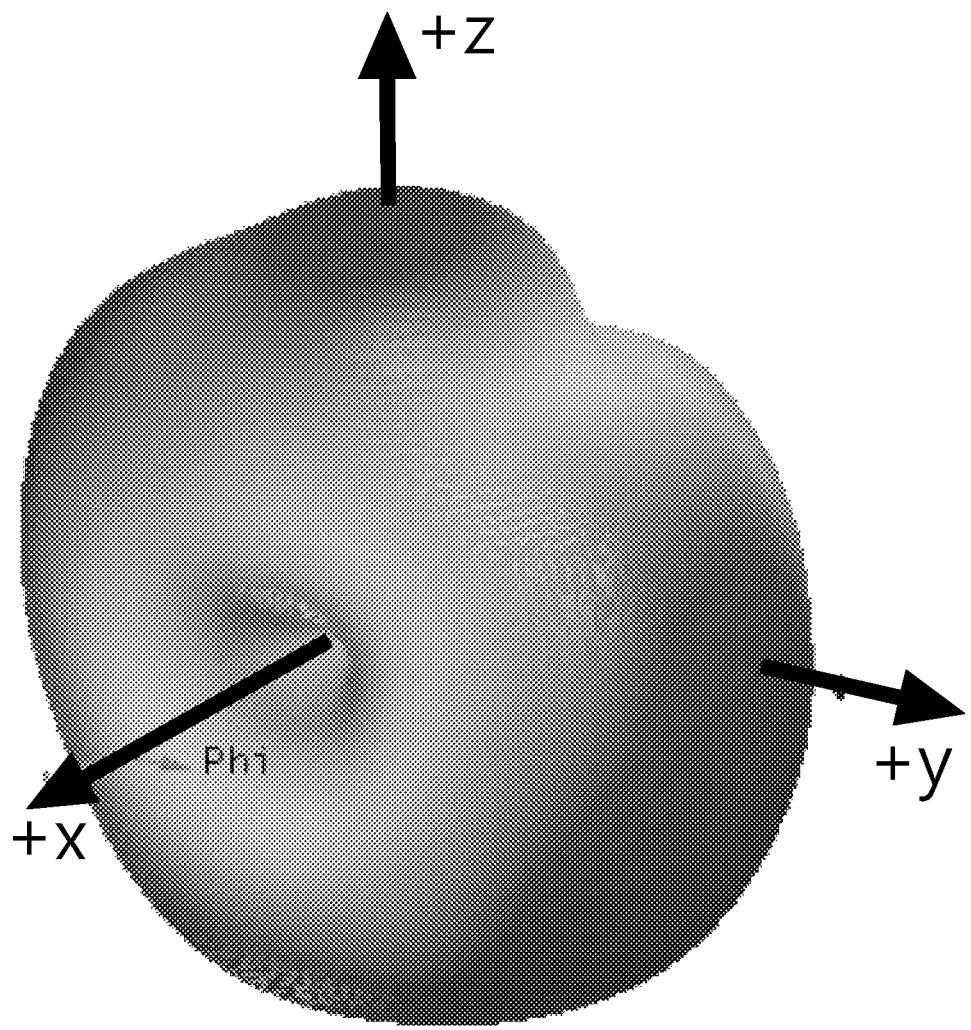
FIG. 8B is a diagram illustrating an example beam formed through a first patch antenna and a second patch antenna in relation with FIG. 8A according to various embodiments.
Figure 8C:
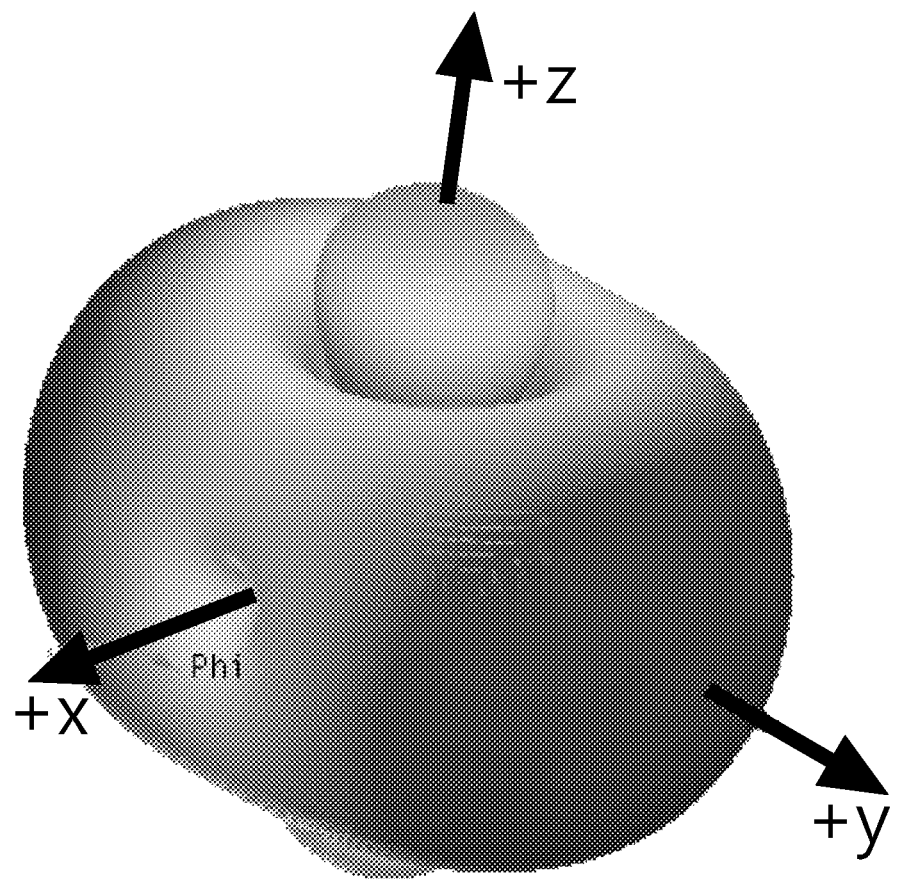
FIG. 8C is a diagram illustrating an example beam formed through a first dipole antenna and a second dipole antenna in relation with FIG. 8A according to various embodiments.

FIG. 8A is a diagram illustrating the antenna module 700 and a beam formed through the antenna module according to various embodiments. FIG. 8B illustrates a beam formed through a first patch antenna and a second patch antenna in relation with FIG. 8A according to various embodiments. FIG. 8C illustrates a beam formed through a first dipole antenna and a second dipole antenna in relation with FIG. 8A according to various embodiments.

According to an embodiment, a communication circuit (e.g., the first wireless communication circuit 350 of FIG. 3) electrically connected with the printed circuit board 710 can be set wherein a radiation current supplied to the first patch antenna 721 and a radiation current supplied to the second patch antenna 722 have substantially a phase difference of 180° (e.g., setting an out-of-phase). Referring to FIGS. 8A and 8B, in response to the phase difference between the radiation current supplied to the first patch antenna 721 and the radiation current supplied to the second patch antenna 722 being 180°, a direction 721c in which the radiation current flows in the first patch antenna 721 and a direction 722c in which the radiation current flows in the second patch antenna 722 can be substantially opposite. According to an embodiment, the direction 721c in which the radiation current flows in the first patch antenna 721 can be substantially a direction of +y axis, and the direction 722c in which the radiation current flows in the second patch antenna 722 can be substantially a direction of −y axis. By this, beams relatively radiating more energy substantially in the direction of −y axis and the direction of +y axis through the first patch antenna 721 and the second patch antenna 722 can be formed (referring to FIG. 8B). According to an embodiment, due to the ground plane (or the ground layer) included in the printed circuit board 710, a beam 723 relatively radiating more energy substantially in the direction of +y axis through the first patch antenna 721 and the second patch antenna 722 can be formed (referring to FIG. 8A).

According to an embodiment, the communication circuit (e.g., the first wireless communication circuit 350 of FIG. 3) can be set wherein a radiation current supplied to the first dipole antenna 731 and a radiation current supplied to the second dipole antenna 732 have substantially a phase difference of 0° (e.g., setting an in-phase). Referring to FIGS. 8A and 8C, in response to the phase difference between the radiation current supplied to the first dipole antenna 731 and the radiation current supplied to the second dipole antenna 732 being 0°, a direction 731c in which the radiation current flows in the first dipole antenna 731 and a direction 732c in which the radiation current flows in the second dipole antenna 732 can be substantially the same. According to an embodiment, the directions 731c and 732c can be substantially a direction of +x axis. By this, a beam relatively radiating more energy substantially in a direction of +y axis through the first dipole antenna 731 and the second dipole antenna 732 can be formed (referring to FIG. 8C). According to an embodiment, due to the ground plane (or the ground layer) included in the printed circuit board 710, a beam 733 relatively radiating more energy substantially in the direction of +y axis through the first dipole antenna 731 and the second dipole antenna 732 can be formed (referring to FIG. 8A).

Figure 9:
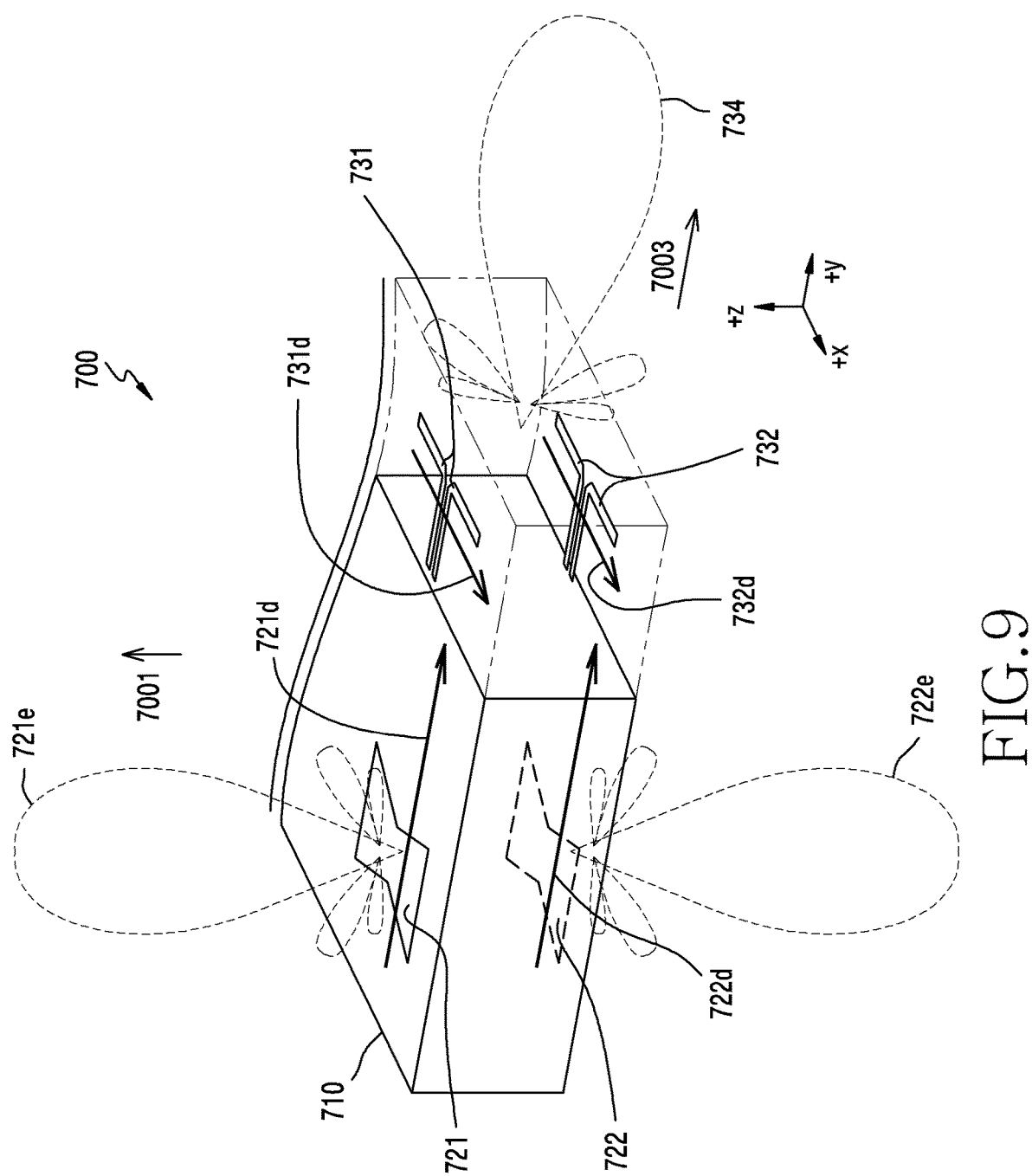
FIG. 9 is a diagram illustrating an example configuration of an antenna module and a beam formed through the antenna module according to various embodiments.

FIG. 9 is a diagram illustrating the antenna module 700 and a beam formed through the antenna module according to various embodiments.

Referring to FIG. 9, in an embodiment, a communication circuit (e.g., the first wireless communication circuit 350 of FIG. 3) electrically connected with the printed circuit board 710 can be set wherein a radiation current supplied to the first patch antenna 721 and a radiation current supplied to the second patch antenna 722 have substantially a phase difference of 0° (e.g., setting an in-phase). In response to the phase difference between the radiation current supplied to the first patch antenna 721 and the radiation current supplied to the second patch antenna 722 being 0°, a direction 721d in which the radiation current flows in the first patch antenna 721 and a direction 722d in which the radiation current flows in the second patch antenna 722 can be substantially the same. According to an embodiment, the directions 721d and 722d can be substantially a direction of +y axis (e.g., the third direction 7003). By this, a beam 721e relatively radiating more energy substantially in a direction of +z axis (e.g., the first direction 7001) through the first patch antenna 721 and a beam 722e relatively radiating more energy substantially in a direction of −z axis (e.g., the second direction 7002) through the second patch antenna 722 can be formed.

According to an embodiment, the communication circuit (e.g., the first wireless communication circuit 350 of FIG. 3) can set wherein a radiation current supplied to the first dipole antenna 731 and a radiation current supplied to the second dipole antenna 732 have substantially a phase difference of 0° (e.g., setting an in-phase). Referring to FIGS. 8A and 8C, in response to the phase difference between the radiation current supplied to the first dipole antenna 731 and the radiation current supplied to the second dipole antenna 732 being 0°, a direction 731d in which the radiation current flows in the first dipole antenna 731 and a direction 732d in which the radiation current flows in the second dipole antenna 732 can be substantially the same. According to an embodiment, the directions 731d and 732d can be substantially a direction of +x axis. By this, a beam relatively radiating more energy substantially in a direction of +y axis through the first dipole antenna 731 and the second dipole antenna 732 can be formed (e.g., referring to FIG. 8C). According to an embodiment, due to the ground plane (or the ground layer) included in the printed circuit board 710, a beam 734 relatively radiating more energy substantially in the direction of +y axis through the first dipole antenna 731 and the second dipole antenna 732 can be formed.

Figure 10:
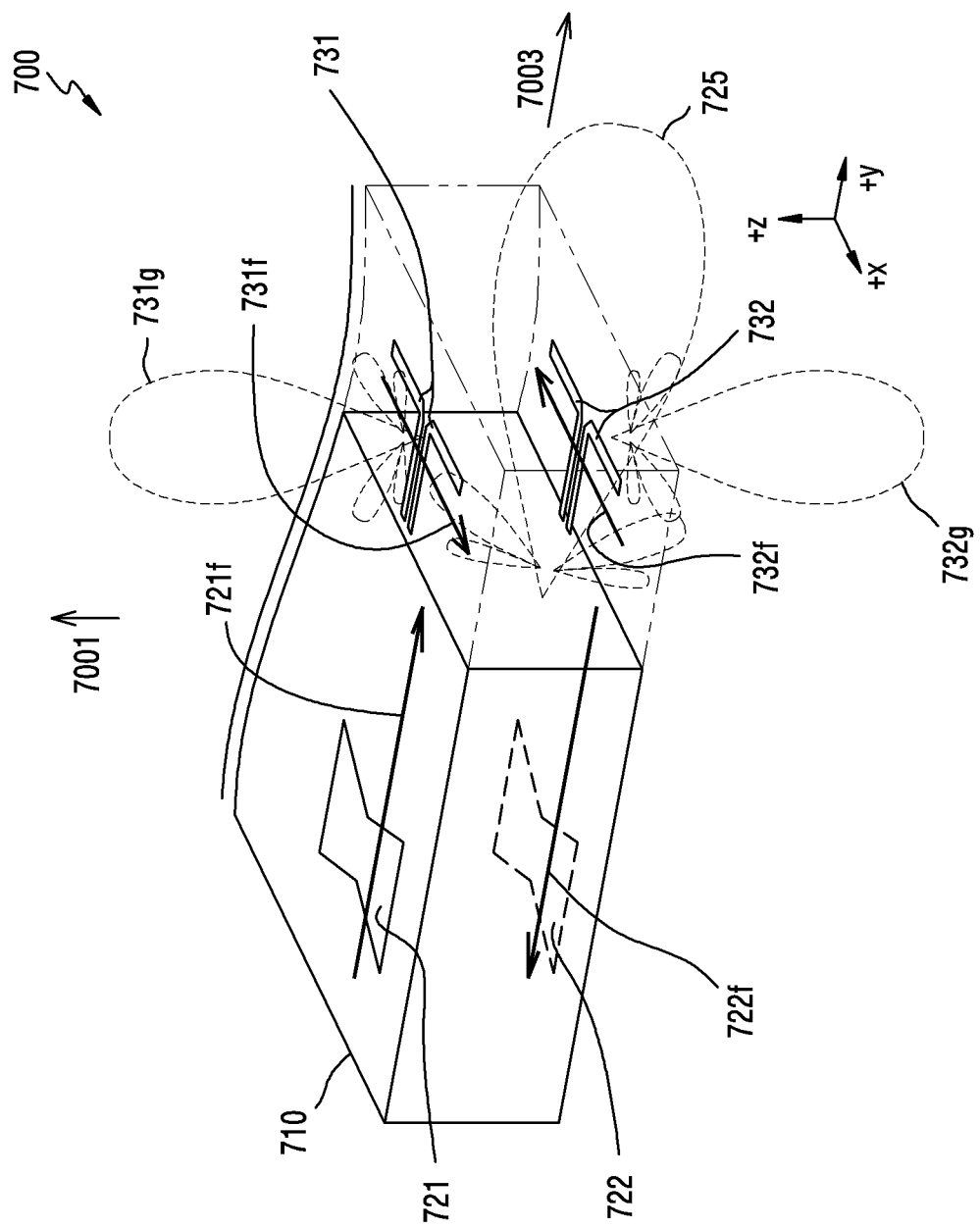
FIG. 10 is a diagram illustrating an example configuration of an antenna module and a beam formed through the antenna module according to various embodiments.

FIG. 10 is a diagram illustrating the antenna module 700 and a beam formed through the antenna module according to various embodiments.

Referring to FIG. 10, in an embodiment, a communication circuit (e.g., the first wireless communication circuit 350 of FIG. 3) electrically connected with the printed circuit board 710 can be set wherein a radiation current supplied to the first patch antenna 721 and a radiation current supplied to the second patch antenna 722 have substantially a phase difference of 180° (e.g., setting an out-of-phase). In response to the phase difference between the radiation current supplied to the first patch antenna 721 and the radiation current supplied to the second patch antenna 722 being 180°, a direction 721f in which the radiation current flows in the first patch antenna 721 and a direction 722f in which the radiation current flows in the second patch antenna 722 can be substantially opposite. According to an embodiment, the direction 721f in which the radiation current flows in the first patch antenna 721 can be substantially a direction of +y axis, and the direction 722f in which the radiation current flows in the second patch antenna 722 can be substantially a direction of −y axis. By this, beams relatively radiating more energy substantially in the direction of −y axis and the direction of +y axis through the first patch antenna 721 and the second patch antenna 722 can be formed (e.g., referring to FIG. 8B). According to an embodiment, due to the ground plane (or the ground layer) included in the printed circuit board 710, a beam 725 relatively radiating more energy substantially in the direction of +y axis through the first patch antenna 721 and the second patch antenna 722 can be formed.

According to an embodiment, the communication circuit (e.g., the first wireless communication circuit 350 of FIG. 3) can be set wherein a radiation current supplied to the first dipole antenna 731 and a radiation current supplied to the second dipole antenna 732 have substantially a phase difference of 180° (e.g., setting an out-of-phase). In response to the phase difference between the radiation current supplied to the first dipole antenna 731 and the radiation current supplied to the second dipole antenna 732 being 180°, a direction 731*f* in which the radiation current flows in the first dipole antenna 731 and a direction 732*f* in which the radiation current flows in the second dipole antenna 732 can be substantially opposite. According to an embodiment, the direction 731*f* in which the radiation current flows in the first dipole antenna 731 can be substantially a direction of +x axis, and the direction 732*f* in which the radiation current flows in the second dipole antenna 732 can be substantially a direction of −x axis. By this, a beam 731*g* relatively radiating more energy substantially in a direction of +z axis (e.g., the first direction 7001) through the first dipole antenna 731 and a beam 732*g* relatively radiating more energy substantially in a direction of −z axis (e.g., the second direction 7002) through the second dipole antenna 732 can be formed.

Figure 11:
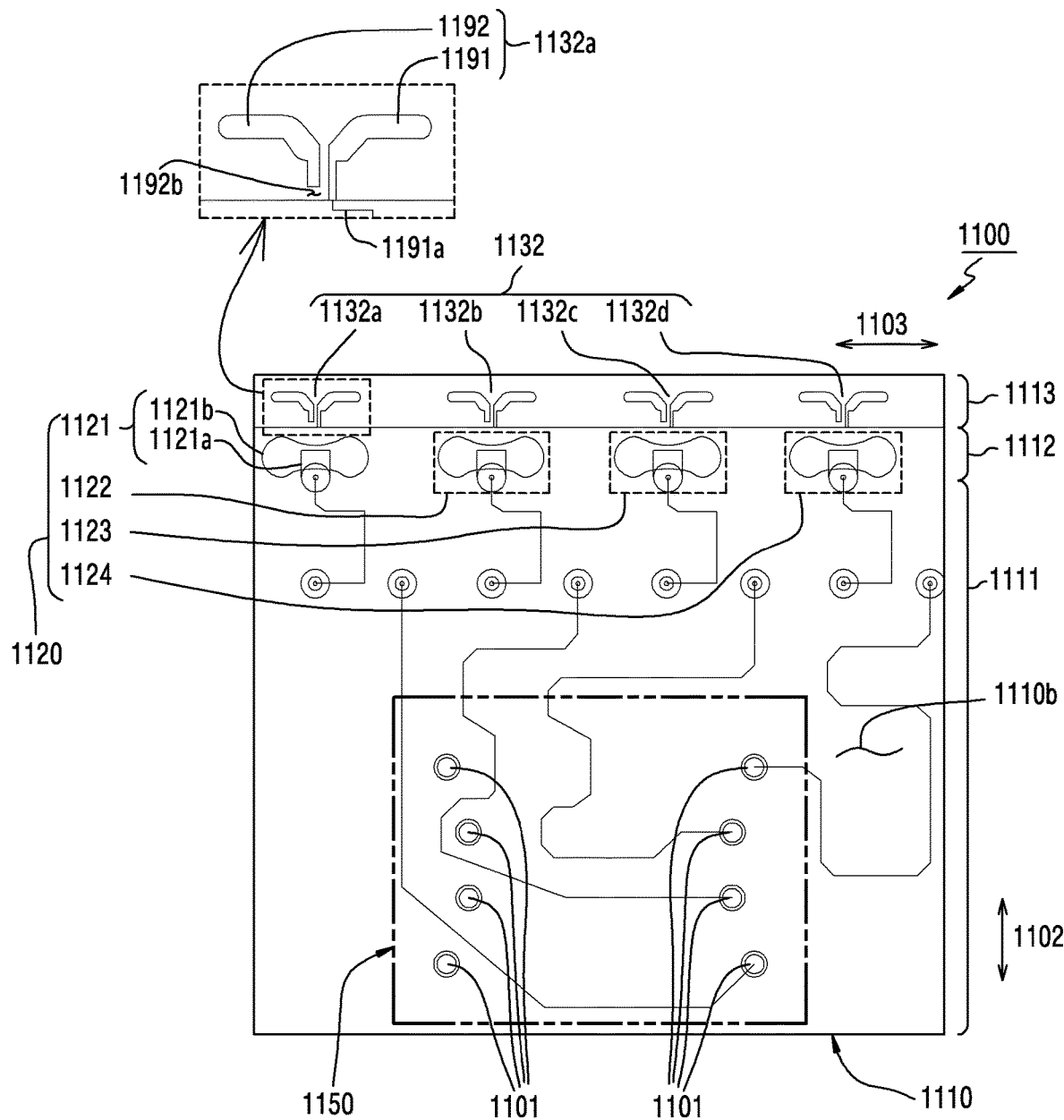
FIG. 11 is a diagram illustrating an example antenna module according to various embodiments.

FIG. 11 is a diagram illustrating an antenna module according to various embodiments.

Referring to FIG. 11, according to an embodiment, the antenna module 1100 can include a printed circuit board 1110 (e.g., the first printed circuit board 310 of FIG. 3, the first printed circuit board 410 of FIG. 4 or the printed circuit board 510 of FIG. 5) including many antennas, and a communication circuit 1150 (e.g., the first wireless communication circuit 350 of FIG. 3, the first wireless communication circuit 450 of FIG. 4 or the communication circuit 550 of FIG. 5B) disposed in the printed circuit board 1110.

According to an embodiment, the printed circuit board 1110 can include a first surface (e.g., the first surface 310*a* of FIG. 3) and a second surface 1110*b* (e.g., the second surface 310*b* of FIG. 3) which extend in opposite directions. The communication circuit 1150 can be electrically connected to terminals 1101 (e.g., the first terminals 301 of FIG. 3) formed in the second surface 1110*b*, through a conductive bonding member (e.g., the conductive bonding member 303 of FIG. 3) such as, for example, and without limitation, a solder.

According to an embodiment, the printed circuit board 1110 can include a first area 1111 including the terminals 1101, a second area 1112 including a second antenna array 1120 (e.g., the second antenna array 522 of FIG. 5B), and/or a third area 1113 including a fourth antenna array 1132 (e.g., the fourth antenna array 532 of FIG. 5B). According to an embodiment, the second area 1112 can be disposed between the first area 1111 and the third area 1113.

According to an embodiment, the second antenna array 1120 (e.g., the second antenna array 522 of FIG. 5B) can include a plurality of second antennas 1121, 1122, 1123 and 1124. The plurality of second antennas 1121, 1122, 1123 and 1124 can be arranged in a direction 1103 orthogonal to a direction 1102 of arranging the first area 1111, the second area 1112 and the third area 1113.

According to an embodiment, the second antenna 1121 can include a plurality of second antenna elements 1121*a* and 1121*b*. For example, the plurality of second antenna elements 1121*a* and 1121*b* can be disposed in mutually different conductive layers, and can at least partially overlap when viewed from above the second surface 1110*b*. For example, one second antenna element 1121*b* (e.g., the second antenna element 322*b* of FIG. 3) can be disposed closer to the second surface 1110*b* (e.g., the second surface 310*b* of FIG. 3) than the other second antenna element 1121*a* (e.g., the second antenna element 322*a* of FIG. 3). According to an embodiment, one second antenna element 1121*a* can be electrically connected with the communication circuit 1150. According to an embodiment, the other second antenna element 1121*b* can be utilized as a dummy element (e.g., a dummy antenna, a dummy patch or a conductive patch). The dummy element can be physically isolated from other conductive elements and be electrically in a floating state. According to an embodiment, the second antenna element 1121*a* electrically connected with the communication circuit 1150 can operate as a feeding part (or a feeding pattern) for indirectly feeding the other second antenna element 1121*b*. The second antenna element 1121*b* can be electromagnetically coupled with the second antenna element 1121*a* electrically connected with the communication circuit 1150 and operate as an antenna radiator or adjust a radiation characteristic.

According to an embodiment, the second antenna element 1121*b* disposed closer to the second surface 1110*b* among the plurality of second antenna elements 1121*a* and 1121*b* can be electrically connected with the communication circuit 1150. For example, the second antenna element 1121*b* can be directly fed from the communication circuit 1150, and can operate as an antenna radiator (e.g., the second patch antenna). According to various embodiments, the second antenna element 1121*a* can be omitted.

According to various embodiments, the disclosure is not limited to a structure of indirectly feeding the second antenna element 1121*b* or a structure of directly feeding the second antenna element 1121*b*, and various other feeding structures for the second antenna 1121 can be formed.

According to an embodiment, the second antenna element 1121*b* can be formed in a bow-tie appearance, when viewed from above the second surface 1110*b*. According to an embodiment, the plurality of second antenna elements 1121*a* and 1121*b* can be mutually different shapes, when viewed from above the second surface 1110*b*. According to various embodiments (not shown), when viewed from above the second surface 1110*b*, the plurality of second antenna elements 1121*a* and 1121*b* can be implemented in the substantially same shape as well.

According to various embodiments, the remaining second antennas 1122, 1123 and 1124 can be formed in the substantially same or similar structure as in the second antenna 1121 shown in FIG. 11.

According to an embodiment, the fourth antenna array 1132 (e.g., the fourth antenna array 532 of FIG. 5B) can include a plurality of fourth antennas 1132*a*, 1132*b*, 1132*c* and 1132*d* (e.g., second dipole antennas). The plurality of fourth antennas 1132*a*, 1132*b*, 1132*c* and 1132*d* can be arranged in the direction 1103. According to an embodiment, the plurality of fourth antennas 1132*a*, 1132*b*, 1132*c* and 1132*d* can be electrically connected with the communication circuit 1150 through a wire (e.g., a conductive path or a conductive pattern) (not shown) formed in the printed circuit board 1100.

According to an embodiment, the fourth antenna 1132*a* can include a fifth antenna element 1191 (e.g., the fifth antenna element 332*a* of FIG. 3 or the fifth antenna element 5941 of FIG. 5C) and a sixth antenna element 1192 (e.g., the sixth antenna element 332*b* of FIG. 3 or the sixth antenna element 5942 of FIG. 5C). The fifth antenna element 1191 can be electrically connected with the communication circuit 1150 through a wire 1191*a*. According to an embodiment, the sixth antenna element 1192 can be physically isolated from other conductive elements and be electrically in a floating state. For example, in comparison with the fifth antenna element 1191, the sixth antenna element 1192 can be formed in a form of cutting away its portion 1192*b* in order to break off electrical connection with a conductive element. According to an embodiment, the sixth antenna element 1192 can be utilized for impedance matching for a transmission line of the fourth antenna 1132*a*. By the impedance matching, maximal power forwarding (or power loss minimization) through the fourth antenna 1132*a* or efficient signal forwarding can be possible. According to various embodiments, the remaining fourth antennas 1132*b*, 1132*c* and 1132*d* each can be formed in the substantially same structure as the fourth antenna 1132*a* shown in FIG. 11.

According to various embodiments, although not illustrated, when viewed from above the second surface 1110*b*, the printed circuit board 1110 can include a first antenna array (e.g., the first antenna array 521 of FIG. 5A) including a plurality of first antennas (e.g., the first antennas 521*a*, 521*b*, 521*c* and 521*d* of FIG. 5A) which are spaced apart and disposed in alignment with the plurality of second antennas 1121, 1122, 1123 and 1124.

According to various embodiments, although not illustrated, when viewed from above the second surface 1110*b*, the printed circuit board 1110 can include a third antenna array (e.g., the third antenna array 531 of FIG. 5A) including a plurality of third antennas (e.g., the third antennas 531*a*, 531*b*, 531*c* and 531*d* of FIG. 5A) which are spaced apart and disposed in alignment with the plurality of fourth antennas 1132*a*, 1132*b*, 1132*c* and 1132*d* respectively. According to an embodiment, the third antenna can include a third antenna element (e.g., the third antenna element 331*a* of FIG. 3 or the third antenna element 5931 of FIG. 5C) and a fourth antenna element (e.g., the fourth antenna element 331*b* of FIG. 3 or the fourth antenna element 5932 of FIG. 5C). According to an embodiment, the third antenna element can be electrically connected with the communication circuit 1150 through a wire, and the fourth antenna element can be physically isolated from other conductive elements as in the sixth antenna element 1192 and be electrically in a floating state.

Figure 12:
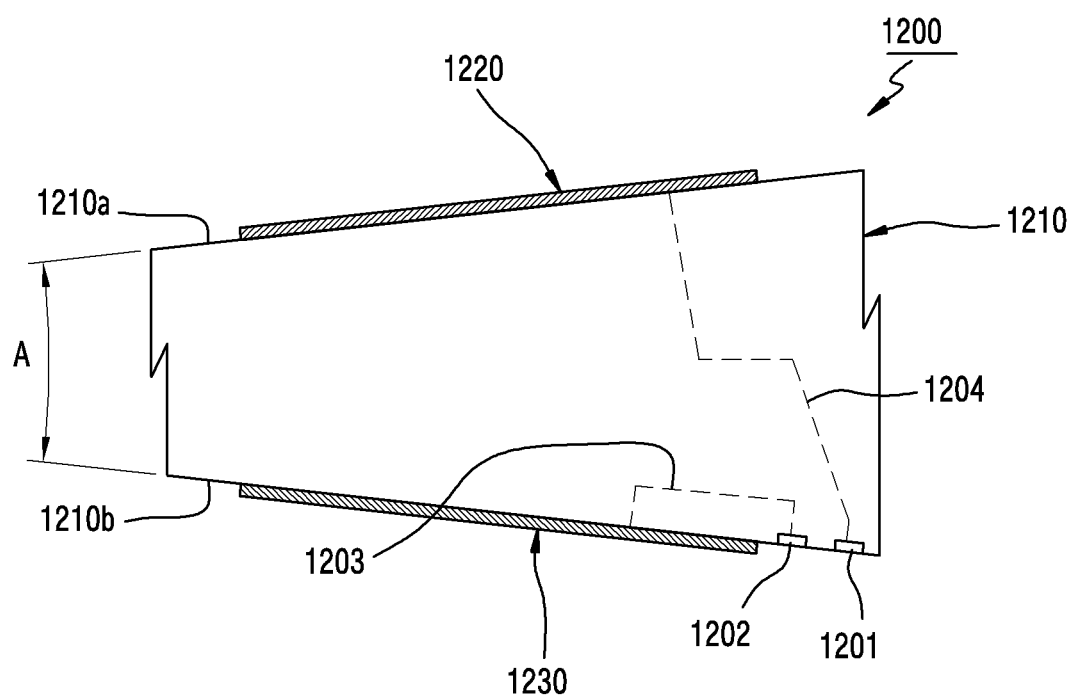
FIG. 12 is a cross section of an antenna structure according to various embodiments.

FIG. 12 is a cross section illustrating an antenna structure according to various embodiments.

Referring to FIG. 12, in an embodiment, the antenna structure 1200 can include at least one of a support member (e.g., a support) 1210, a first antenna 1220 and/or a second antenna 1230.

According to an embodiment, the support member 1210 may include a support and include insulating materials such as, for example, and without limitation, a polymer, and when viewed from the cross section, can include a first surface 1210*a* and a second surface 1210*b* which form an acute angle (A) (e.g., about 10° or less).

According to an embodiment, the first antenna 1220 can be disposed in the first surface 1210*a*, and the second antenna 1230 can be disposed in the second surface 1210*b*.

According to various embodiments (not shown), the first antenna 1220 can be disposed in a recess formed in the first surface 1210*a*. According to various embodiments (not shown), the second antenna 1230 can be disposed in a recess formed in the second surface 1210*b*.

According to various embodiments (not shown), the first antenna 1220 can be disposed within the support member 1210 substantially in parallel with the first surface 1210*a*. According to various embodiments (not shown), the second antenna 1230 can be disposed within the support member 1210 substantially in parallel with the second surface 1210*b*.

According to an embodiment, when viewed from the cross section, the first antenna 1220 and the second antenna 1230 can form an acute angle (A).

According to an embodiment, the first antenna 1220 and/or the second antenna 1230 can be electrically connected with a communication circuit (e.g., the first wireless communication circuit 450 of FIG. 4), and the communication circuit can transmit or receive a signal at various frequency bands through the first antenna 1220 and/or the second antenna 1230.

According to various embodiments (not shown), the communication circuit (e.g., the first wireless communication circuit 450 of FIG. 4) can be disposed in the first surface 1210*a* or second surface 1210*b* of the support member 1210. For example, the antenna structure 1200 can include one or more terminals 1201 and 1202 exposed to the second surface 1210*b* of the support member 1210. The communication circuit (e.g., an RFIC) can be electrically connected with the one or more terminals 1201 and 1202 through a conductive bonding member such as a solder. According to various embodiments, a module including the antenna structure 1200 and the communication circuit disposed therein can be denoted as an antenna module (e.g., the antenna module 400 of FIG. 4). According to various embodiments, the antenna structure 1200 can include a first conductive path (e.g., a wire) 1204 electrically connecting the terminal 1201 and the first antenna 1220, or a second conductive path 1203 electrically connecting the terminal 1202 and the second antenna 1230. According to an embodiment, the first conductive path 1204 or the second conductive path 1203 can be disposed within the support member 1210. According to various embodiments (not shown), the first conductive path 1204 or the second conductive path 1203 can be disposed in/on a surface of the support member 1210 as well.

According to various embodiments, the communication circuit (e.g., the RFIC) can be electrically connected with the antenna structure 1200 through a conductive member such as an FPCB or a cable. For example, the one or more terminals 1201 and 1202 can be replaced with a connector electrically connectable with a connector included in the conductive member (e.g., an FPCB).

According to various embodiments, the first antenna 1220 can include at least one first antenna included in the first antenna array 421 of FIG. 4, and the second antenna 1230 can include at least one second antenna included in the second antenna array 422 of FIG. 4.

According to various embodiments, the first antenna 1220 can include at least one third antenna included in the third antenna array 431 of FIG. 4, and the second antenna 1230 can include at least one fourth antenna included in the fourth antenna array 432 of FIG. 4.

According to various embodiments (not shown), the antenna structure 1200 can include at least one ground plane (or ground layer) (e.g., the first ground plane 341 or second ground plane 342 of FIG. 3) disposed between the first surface 1210*a* and the second surface 1210*b*. For example, the at least one ground plane can be at least partially disposed within the support member 1210, and can be physically isolated from the first antenna 1220 or the second antenna 1230.

According to various embodiments (not shown), the first surface 1210*a* can include a curved surface, and the first antenna 1220 can be formed in a curved shape corresponding to the curved surface. According to various embodiments (not shown), the second surface 1210*b* can include a curved surface, and the second antenna 1230 can be formed in a curved shape corresponding to the curved surface.

Figure 13:
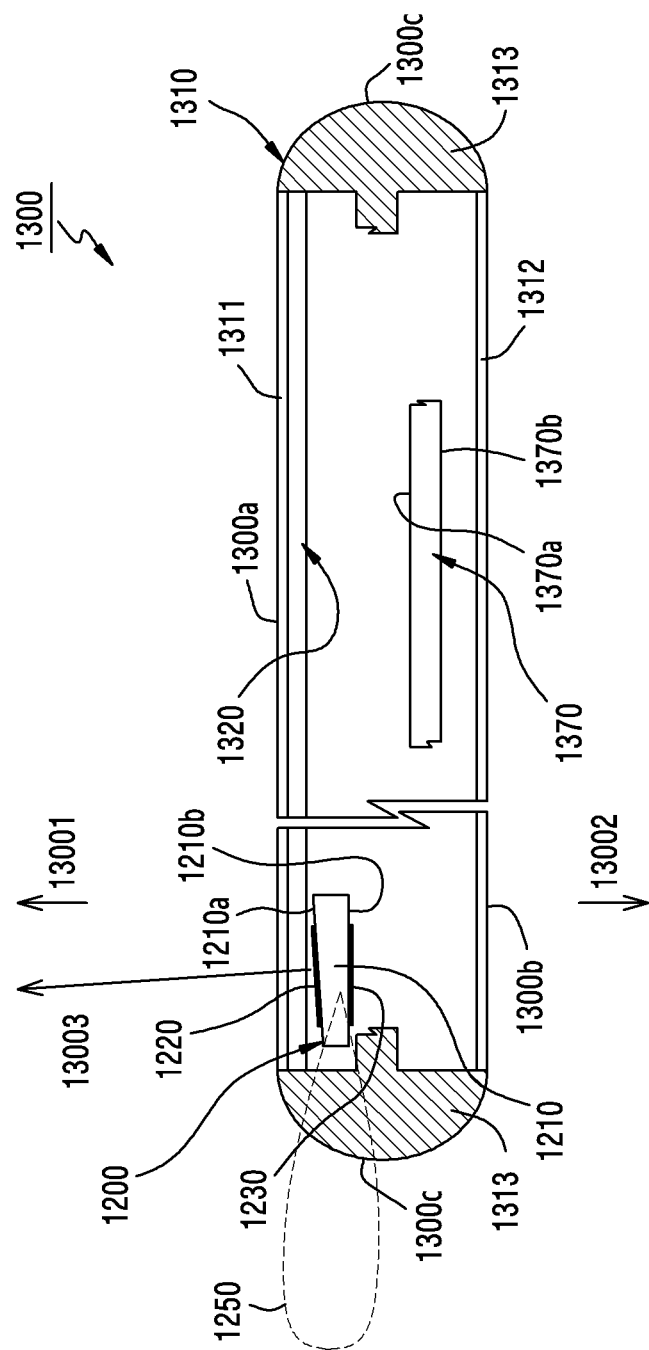
FIG. 13 is a cross section of an electronic device including the antenna structure of FIG. 12 according to various embodiments.
Figure 14:
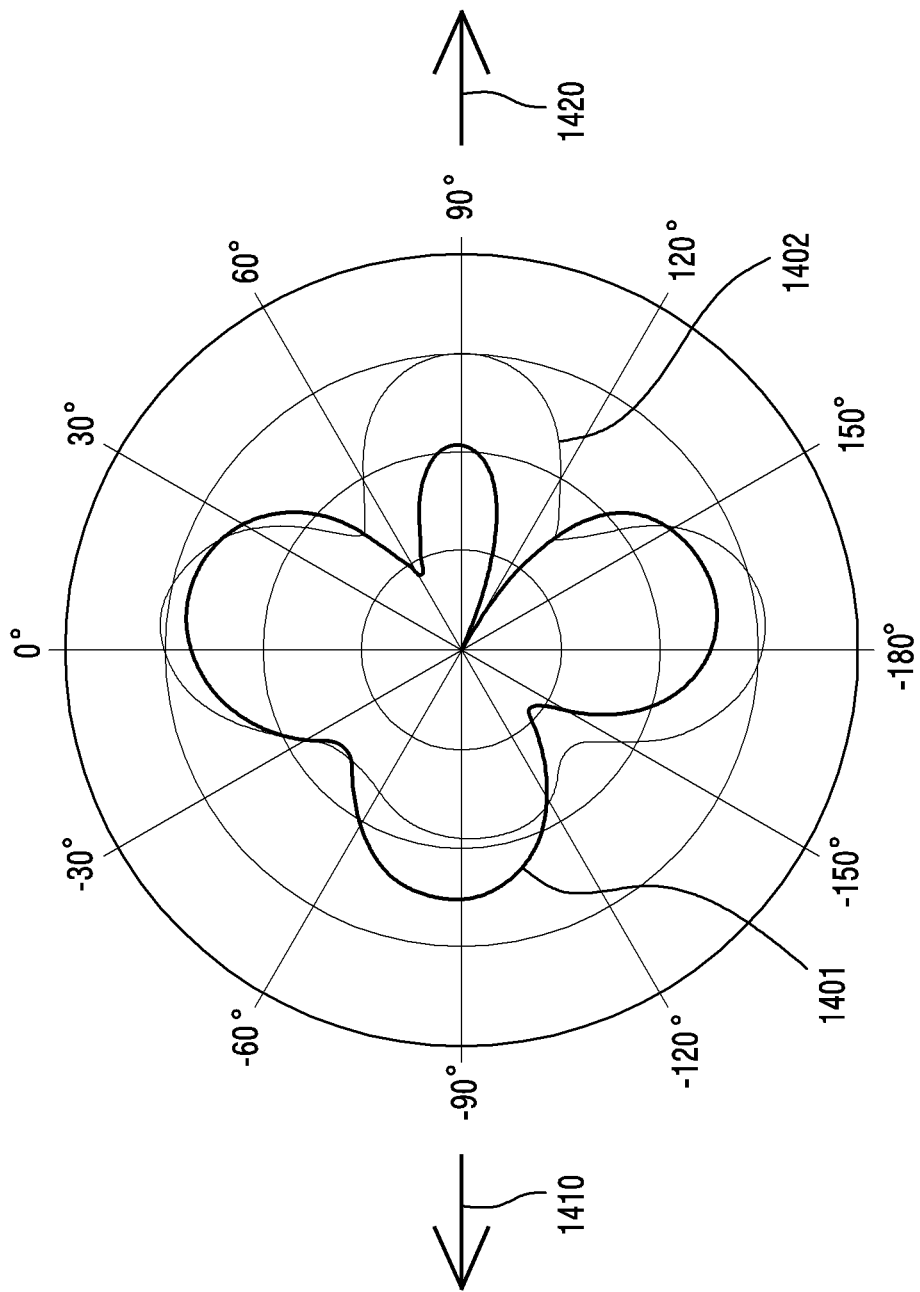
FIG. 14 is a diagram illustrating a radiation pattern of an electronic device including the antenna structure of FIG. 12 according to various embodiments.

FIG. 13 is a cross section illustrating an electronic device disposing the antenna structure 1200 of FIG. 12 according to various embodiments. FIG. 14 is a diagram illustrating an example radiation pattern of the electronic device disposing the antenna structure 1200 of FIG. 12 according to various embodiments.

Referring to FIG. 13, in an embodiment, the electronic device 1300 (e.g., the electronic device 101 of FIG. 1) can include a housing 1310 which forms a front surface 1300a extending in a first direction 13001, a rear surface 1300b extending in a second direction 13002 that is opposite to the first direction 13001, and a side surface 1300c at least partially surrounding a space between the front surface 1300a and the rear surface 1300b. For example, the housing 1310 can include a first plate (or front plate) 1311 forming the front surface 1300a, a second plate (or rear plate) 1312 forming the rear surface 1300b, and a side member (e.g., side wall or bezel) 1313 forming the side surface 1300c. According to various embodiments, the second plate 1312 and the side member 1313 can be integrally formed and can include the same materials. According to an embodiment, the electronic device 1300 can include a display 1320 disposed between the first plate 1311 and the second plate 1312, and the display 1320 can be exposed through the first plate 1311. According to various embodiments, the display 1320 can be coupled with the first plate 1311, or be implemented to include the first plate 1311.

According to an embodiment, the electronic device 1300 can include a printed circuit board 1370 (e.g., the second printed circuit board 370 of FIG. 3 or the second printed circuit board 470 of FIG. 4) disposed between the display 1320 and the second plate 1312.

According to an embodiment, the antenna structure 1200 can be disposed between the display 1320 and the printed circuit board 1370. For example, the antenna structure 1200 can be disposed wherein the second surface 1210b of the support member 1210 faces the printed circuit board 1370. According to an embodiment, the printed circuit board 1370 can include a third surface 1370a extending in the first direction 13001, and a fourth surface 1370b extending in the second direction 13002. According to an embodiment, the second surface 1210b of the support member 1210 can face, substantially in parallel to, the third surface 1370a of the printed circuit board 1370. According to an embodiment, the second surface 1210b disposing the second antenna 1230 can extend in the second direction 13002, and the first surface 1210a disposing the first antenna 1220 can extend in a third direction 13003 making an acute angle with the first direction 13001.

According to an embodiment, the electronic device 1300 can determine a phase of a current supplied to the first antenna 1220 and/or a phase of a current supplied to the second antenna 1230 based on a communication mode on beamforming. For example, based on a phase difference between the current supplied to the first antenna 1220 and the current supplied to the second antenna 1230, the antenna structure 1200 can form a beam 1250 substantially in a direction of extending to the side surface 1300c. According to an embodiment, a structure disposed to make an acute angle between the first antenna 1220 and the second antenna 1230 can contribute to forming a direction (e.g., a main lobe) of this beam 1250.

Referring to FIG. 14, 1401 can represent a radiation pattern of the electronic device 1300 of FIG. 13. 1402 represents a radiation pattern of an electronic device disposing an antenna structure (not shown) disposing a first antenna and a second antenna in parallel. Referring to 1401 and 1402, in comparison with the electronic device disposing the antenna structure disposing the first antenna and the second antenna in parallel, the electronic device 1300 of FIG. 13 can reduce radiation 1420 extending to the rear surface 1300b while increasing radiation 1410 extending to the side surface 1300c.

Referring again to FIG. 13, in various embodiments (not shown), the antenna structure 1200 can be disposed between the printed circuit board 1370 and the second plate 1312 as well. For example, the antenna structure 1200 can be disposed wherein the first surface 1210a of the support member 1210 faces the third surface 1370a of the printed circuit board 1370. According to an embodiment, the first surface 1210a of the support member 1210 can face, substantially in parallel to, the fourth surface 1370b of the printed circuit board 1370.

According to various embodiments, the antenna module 300 of FIG. 3, the antenna module 400 of FIG. 4, the antenna module 500 of FIG. 5A or the antenna module 600 of FIG. 6 can, in place of the antenna structure 1200 of FIG. 12, be disposed in the housing 1310 of the electronic device 1300 of FIG. 13 and be electrically connected with the printed circuit board 1370.

Figure 15A:
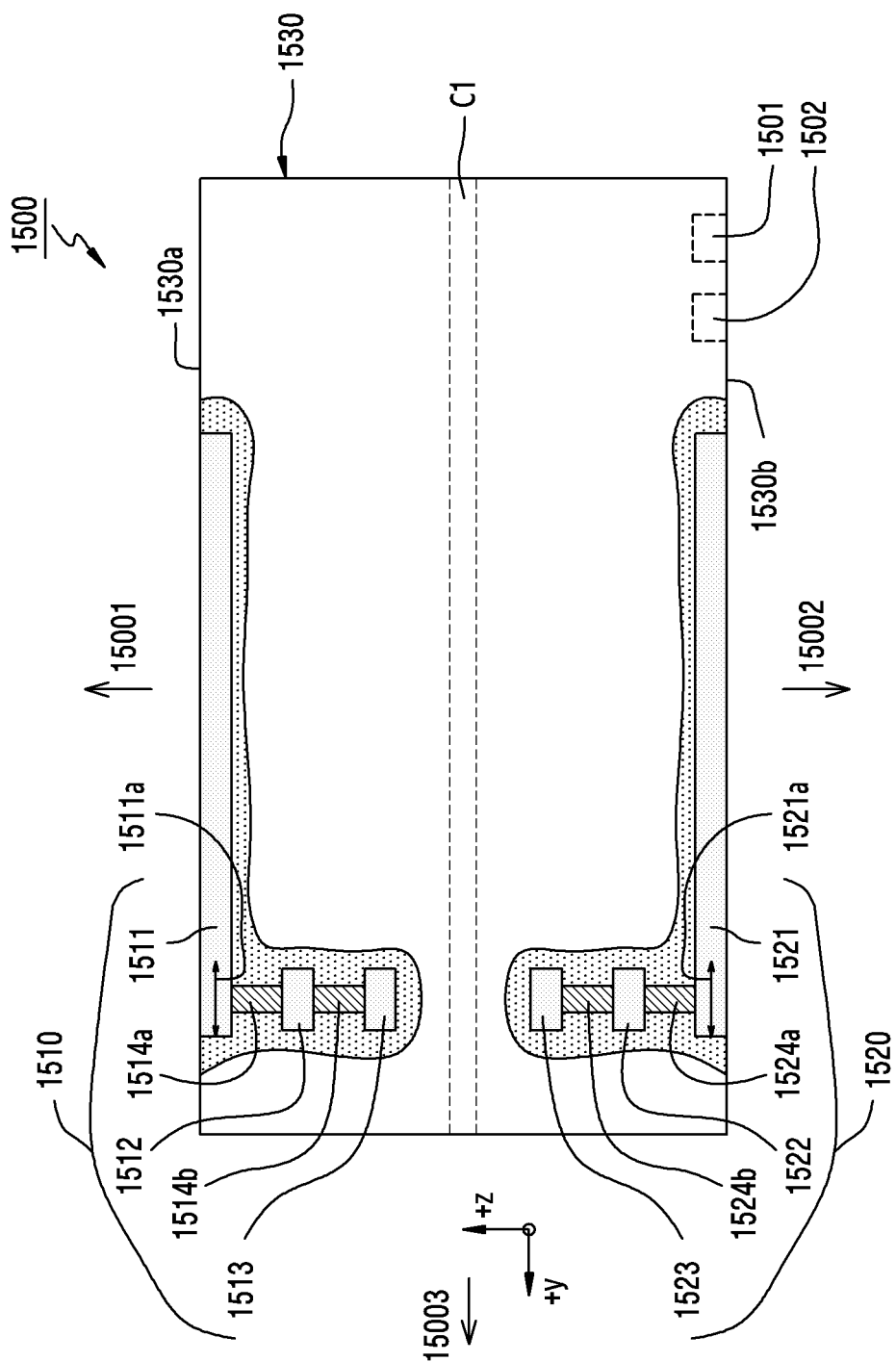
FIG. 15A is a cutaway view of an antenna structure according to various embodiments.
Figure 15B:
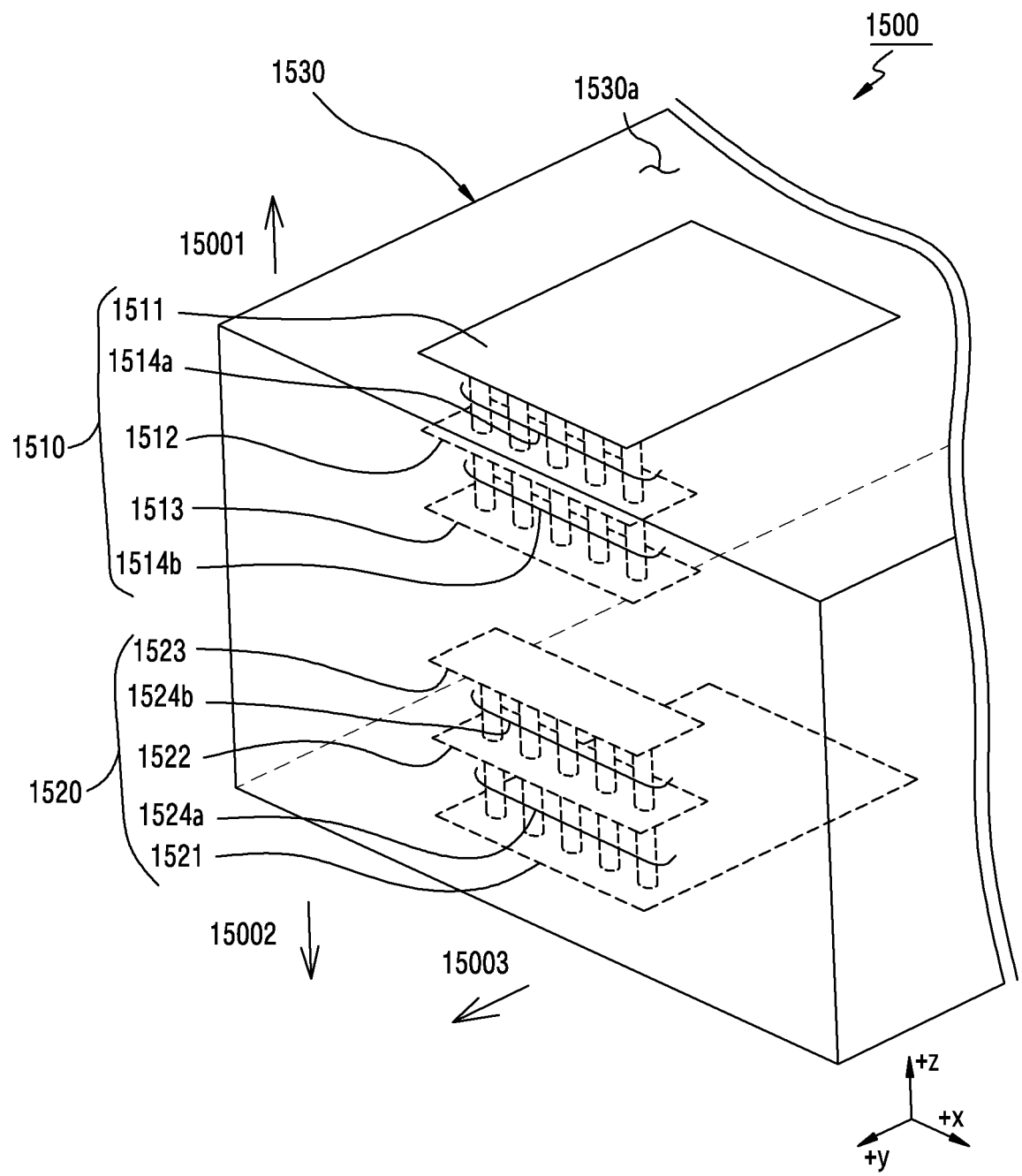
FIG. 15B is a perspective view of an antenna structure according to various embodiments.
Figure 15C:
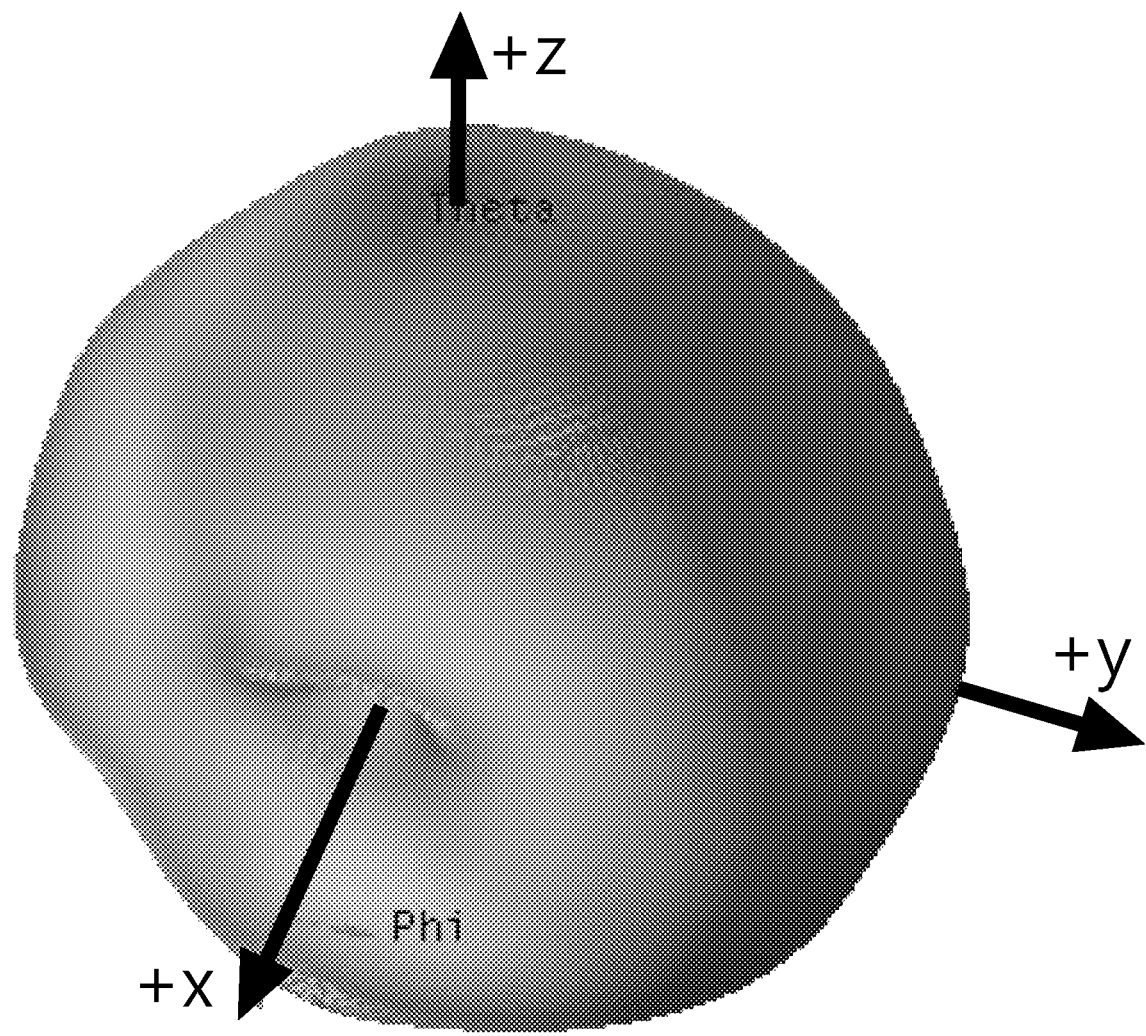
FIG. 15C is a diagram illustrating an example beam formed through the antenna structure of FIG. 15A according to various embodiments.
Figure 15D:
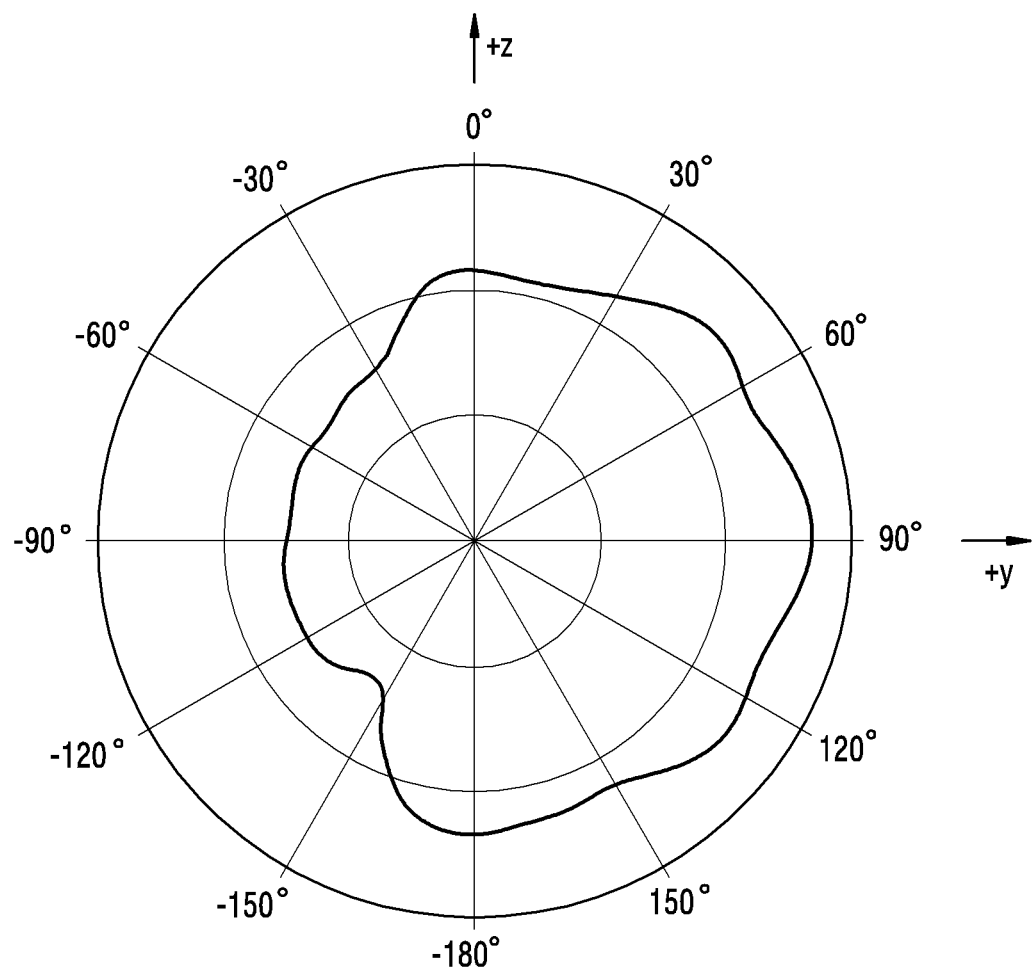
FIG. 15D is a diagram illustrating a radiation pattern of a beam formed through the antenna structure of FIG. 15A according to various embodiments.

FIG. 15A is a cutaway view of an antenna structure according to various embodiments. FIG. 15B is a perspective view of the antenna structure according to various embodiments. FIG. 15C is a diagram illustrating an example beam formed through the antenna structure of FIG. 15A according to various embodiments. FIG. 15D is a diagram illustrating a radiation pattern of a beam formed through the antenna structure of FIG. 15A according to various embodiments.

Referring to FIGS. 15A and 15B, in an embodiment, the antenna structure 1500 can include a printed circuit board 1530 which includes a first antenna 1510 and a second antenna 1520. The printed circuit board 1530 can include a first surface 1530a extending in a first direction 15001 (e.g., a direction of +z axis), and a second surface 1530b extending in a second direction 15002 (e.g., a direction of −z axis) that is opposite to the first direction 15001. The printed circuit board 1530 can include a plurality of conductive layers disposed between the first surface 1530a and the second surface 1530b, insulating materials (e.g., prepreg) disposed between the plurality of conductive layers, and a plurality of conductive vias having a connection wire for electrically connecting the conductive layers disposed in mutually different layers. According to an embodiment, the first antenna 1510 and the second antenna 1520 can be formed by at least one conductive layer and/or at least one conductive via.

According to an embodiment, the first antenna 1510 can include a first conductive plane 1511, and a first conductive side wall 1512, 1513, 1514a and 1514b substantially vertical with the first conductive plane 1511. When viewed from above the first surface 1530a, the first conductive side wall 1512, 1513, 1514a and 1514b can include a plurality of conductive planes 1512 and 1513 having a size at least overlapping with one sided area 1511a of the first conductive plane 1511, and conductive vias 1514a and 1514b having a connection wire for electrically connecting between the plurality of conductive planes 1511, 1512 and 1513 disposed in mutually different layers. The plurality of conductive planes 1512 and 1513 can be arranged in the second direction 15002 from the first conductive plane 1511.

According to an embodiment, the second antenna 1520 can include a second conductive plane 1521, and a second conductive side wall 1522, 1523, 1524a and 1524b substantially vertical with the second conductive plane 1521. When viewed from above the second surface 1530b, the second conductive side wall 1522, 1523, 1524a and 1524b can include a plurality of conductive planes 1522 and 1523 having a size at least overlapping with one sided area 1521a of the second conductive plane 1521, and conductive vias 1524*a* and 1524*b* having a connection wire for electrically connecting between the plurality of conductive planes 1521, 1522 and 1523 disposed in mutually different layers. The plurality of conductive planes 1522 and 1523 can be arranged in the first direction 15001 from the second conductive plane 1521.

According to various embodiments, the first antenna 1510 and the second antenna 1520 can be formed in a symmetric structure with a criterion of a center base (C1) of the printed circuit board 1530. For example, when viewed from above the first surface 1530*a*, the first conductive plane 1511 is substantially the same as the second conductive plane 1521 and can overlap with the second conductive plane 1521

According to various embodiments, the first side wall 1512, 1513, 1514*a* and 1514*b* or the second side wall 1522, 1523, 1524*a* and 1524*b* is not limited to FIG. 15A, and can be formed by conductive layers of various different numbers and conductive vias electrically connecting them.

According to an embodiment, the first antenna 1510 and/or the second antenna 1520 can be electrically connected with a communication circuit (e.g., the first wireless communication circuit 450 of FIG. 4), and the communication circuit can transmit or receive a signal at various frequency bands through the first antenna 1510 and/or the second antenna 1520.

According to various embodiments (not shown), the communication circuit (e.g., the first wireless communication circuit 450 of FIG. 4) can be disposed in the first surface 1530*a* or second surface 1530*b* of the printed circuit board 1530. For example, the antenna structure 1500 can include one or more terminals 1501 and 1502 exposed through the second surface 1530*b* of the printed circuit board 1530. The communication circuit (e.g., an RFIC) can be electrically connected with the one or more terminals 1501 and 1502 through a conductive bonding member such as, for example, and without limitation, a solder. According to various embodiments, a module including the antenna structure 1500 and the communication circuit disposed therein can be denoted as an antenna module (e.g., the antenna module 400 of FIG. 4). According to various embodiments, the printed circuit board 1530 can include a first conductive path (not shown) electrically connecting the terminal 1501 and the first antenna 1510, or a second conductive path (not shown) electrically connecting the terminal 1502 and the second antenna 1520. The first conductive path or the second conductive path can be formed through a plurality of conductive layers included in the printed circuit board 1530 and conductive vias electrically connecting therebetween.

According to various embodiments, the communication circuit (e.g., the RFIC) can be electrically connected with the antenna structure 1500 through a conductive member such as an FPCB or a cable as well. For example, the one or more terminals 1501 and 1502 can be replaced with a connector electrically connectable with a connector included in the conductive member (e.g., FPCB).

According to various embodiments, the first antenna 1510 can include at least one first antenna included in the first antenna array 421 of FIG. 4. The second antenna 1520 can include at least one second antenna included in the second antenna array 422 of FIG. 4.

According to various embodiments, the first antenna 1510 can include at least one third antenna included in the third antenna array 431 of FIG. 4. The second antenna 1520 can include at least one fourth antenna included in the fourth antenna array 432 of FIG. 4.

According to various embodiments (not shown), the printed circuit board 1530 can include at least one ground plane (or ground layer) (e.g., the first ground plane 341 or second ground plane 342 of FIG. 3) disposed between the first surface 1530*a* and the second surface 1530*b*. The at least one ground plane can be physically isolated from the first antenna 1510 or the second antenna 1520.

According to an embodiment, the communication circuit (e.g., the first wireless communication circuit 450 of FIG. 4) electrically connected with the antenna structure 1500 can adjust a phase of a current supplied to the first antenna 1510 and/or a phase of a current supplied to the second antenna 1520, in wireless communication. For example, referring to FIGS. 15A, 15C and 15D, based on a phase difference between the current supplied to the first antenna 1510 and the current supplied to the second antenna 1520, the antenna structure 1500 can form a beam substantially in a third direction 15003 (e.g., a direction of +y axis). According to an embodiment, the first side wall 1512, 1513, 1514*a* and 1514*b* of the first antenna 1510 or the second side wall 1522, 1523, 1524*a* and 1524*b* of the second antenna 1520 can contribute to forming a direction (e.g., a main lobe) of this beam.

According to various embodiments, one of the first side wall 1512, 1513, 1514*a* and 1514*b* and the second side wall 1522, 1523, 1524*a* and 1524*b* can be omitted as well.

Figure 16:
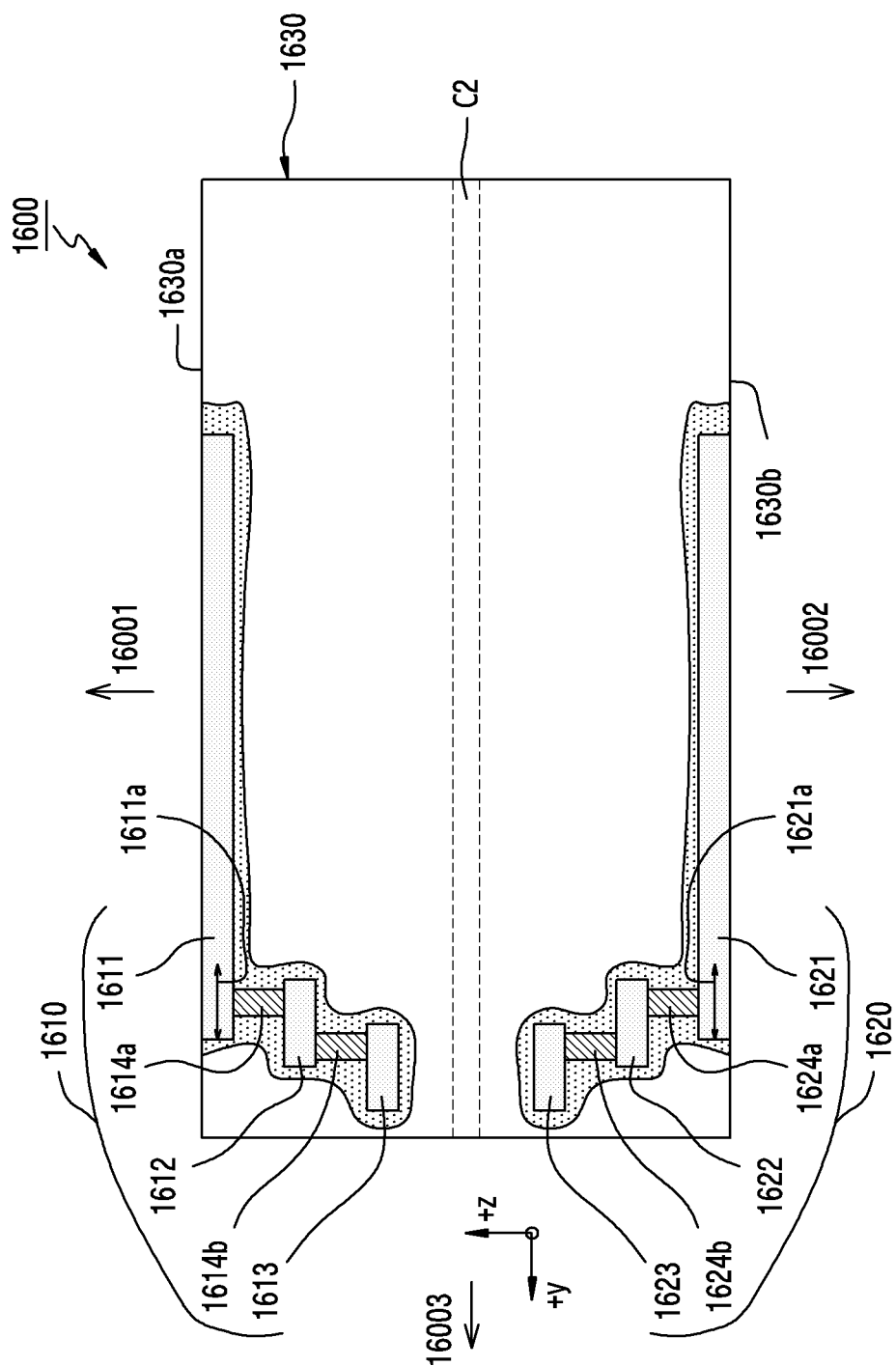
FIG. 16 is a cutaway view of an antenna structure according to various embodiments.

FIG. 16 is a cutaway view of an antenna structure according to various embodiments.

Referring to FIG. 16, in an embodiment, the antenna structure 1600 can include a printed circuit board 1630 which includes a first antenna 1610 and a second antenna 1620. The printed circuit board 1630 can include a first surface 1630*a* extending in a first direction 16001 (e.g., a direction of +z axis), and a second surface 1630*b* extending in a second direction 16002 (e.g., a direction of −z axis) that is opposite to the first direction 16001.

According to an embodiment, when viewed from a cross section, the first antenna 1610 can include a first conductive plane 1611, and a first conductive side wall 1612, 1613, 1614*a* and 1614*b* substantially forming an obtuse angle with the first conductive plane 1611. When viewed from the cross section, the first conductive side wall 1612, 1613, 1614*a* and 1614*b* can include a plurality of conductive planes 1612 and 1613 arranged stepwise from one sided area 1611*a* of the first conductive plane 1611, and conductive vias 1614*a* and 1614*b* having a connection wire for electrically connecting between the plurality of conductive planes 1611, 1612 and 1613 disposed in mutually different layers.

According to an embodiment, when viewed from the cross section, the second antenna 1620 can include a second conductive plane 1621, and a second conductive side wall 1622, 1623, 1624*a* and 1624*b* substantially forming an obtuse angle with the second conductive plane 1621. When viewed from the cross section, the second conductive side wall 1622, 1623, 1624*a* and 1624*b* can include a plurality of conductive planes 1622 and 1623 arranged stepwise from one sided area 1621*a* of the second conductive plane 1621, and conductive vias 1624*a* and 1624*b* having a connection wire for electrically connecting between the plurality of conductive planes 1621, 1622 and 1623 disposed in mutually different layers.

According to various embodiments, the first antenna 1610 and the second antenna 1620 can be formed in a symmetric structure with a criterion of a center base (C2) of the printed circuit board 1630.

According to various embodiments, the first side wall 1612, 1613, 1614*a* and 1614*b* or the second side wall 1622, 1623, 1624*a* and 1624*b* is not limited to FIG. 16, and can be formed by conductive layers of various different numbers and conductive vias electrically connecting them.

According to an embodiment, the first antenna 1610 and/or the second antenna 1620 can be electrically connected with a communication circuit (e.g., the first wireless communication circuit 450 of FIG. 4), and the communication circuit can transmit or receive a signal at various frequency bands through the first antenna 1610 and/or the second antenna 1620. According to an embodiment, the communication circuit can be electrically connected with the printed circuit board 1630 through a conductive bonding member such as a solder, or be electrically connected with the printed circuit board 1630 through a conductive member such as an FPCB or a cable.

According to various embodiments, the first antenna 1610 can include at least one first antenna included in the first antenna array 421 of FIG. 4. The second antenna 1620 can include at least one second antenna included in the second antenna array 422 of FIG. 4.

According to various embodiments, the first antenna 1610 can include at least one third antenna included in the third antenna array 431 of FIG. 4. The second antenna 1620 can include at least one fourth antenna included in the fourth antenna array 432 of FIG. 4.

According to various embodiments (not shown), the printed circuit board 1630 can include at least one ground plane (or ground layer) (e.g., the first ground plane 341 or second ground plane 342 of FIG. 3) disposed between the first surface 1630*a* and the second surface 1630*b*. The at least one ground plane can be physically isolated from the first antenna 1610 or the second antenna 1620.

According to an embodiment, the communication circuit (e.g., the first wireless communication circuit 450 of FIG. 4) electrically connected with the antenna structure 1600 can determine a phase of a current supplied to the first antenna 1610 and/or a phase of a current supplied to the second antenna 1620, based on a communication mode on beamforming. For example, based on a phase difference between the current supplied to the first antenna 1610 and the current supplied to the second antenna 1620, the antenna structure 1600 can form a beam relatively much radiating energy substantially in a third direction 16003 (e.g., a direction of +y axis). According to an embodiment, the first side wall 1612, 1613, 1614*a* and 1614*b* of the first antenna 1610 or the second side wall 1622, 1623, 1624*a* and 1624*b* of the second antenna 1620 can contribute to forming a direction (e.g., main lobe) of this beam.

According to various embodiments, one of the first side wall 1612, 1613, 1614*a* and 1614*b* and the second side wall 1622, 1623, 1624*a* and 1624*b* can be omitted as well.

Figure 17A:
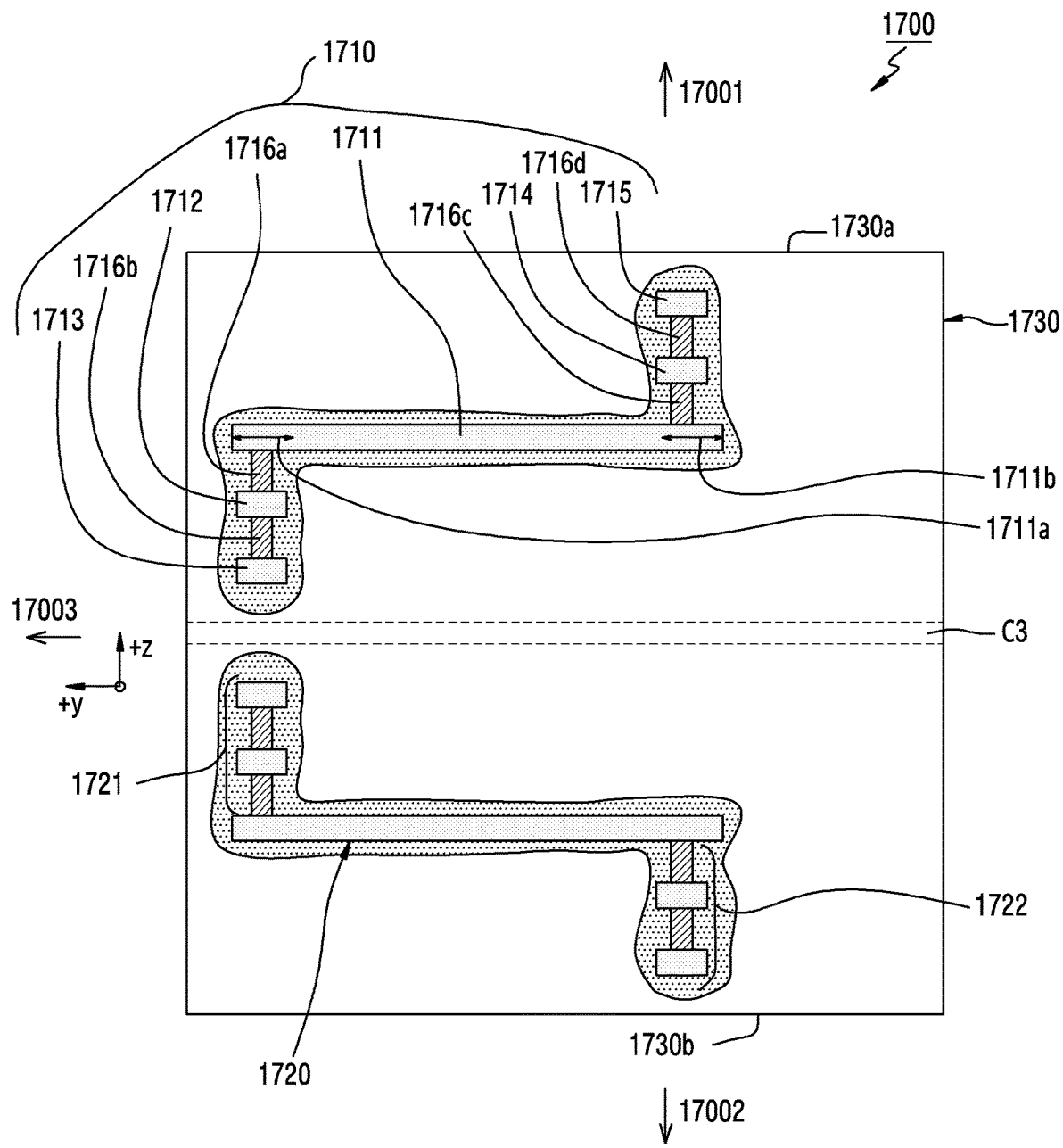
FIG. 17A is a cutaway view of an antenna structure according to various embodiments.
Figure 17B:
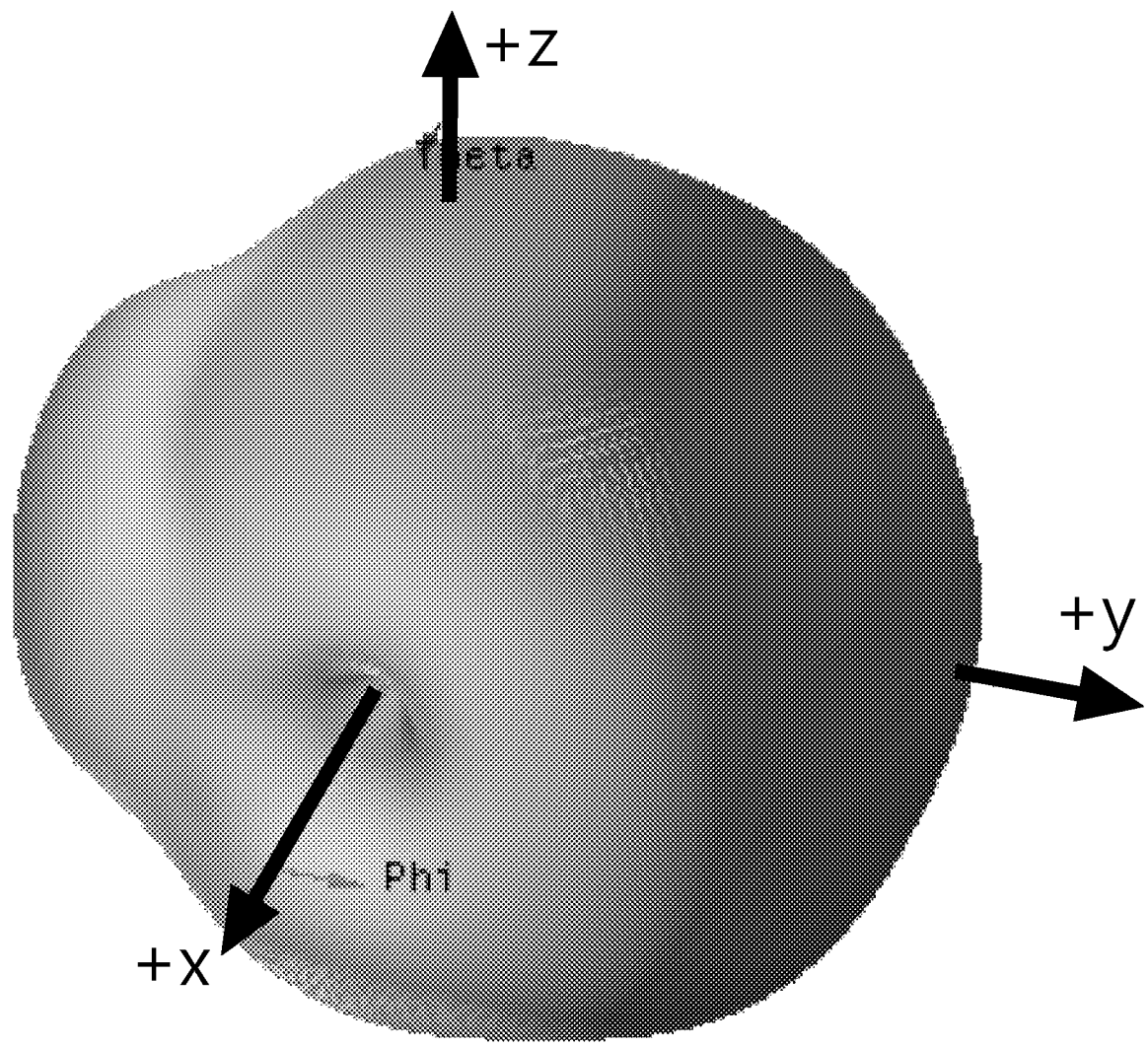
FIG. 17B is a diagram illustrating an example beam formed through the antenna structure of FIG. 17A according to various embodiments.
Figure 17C:
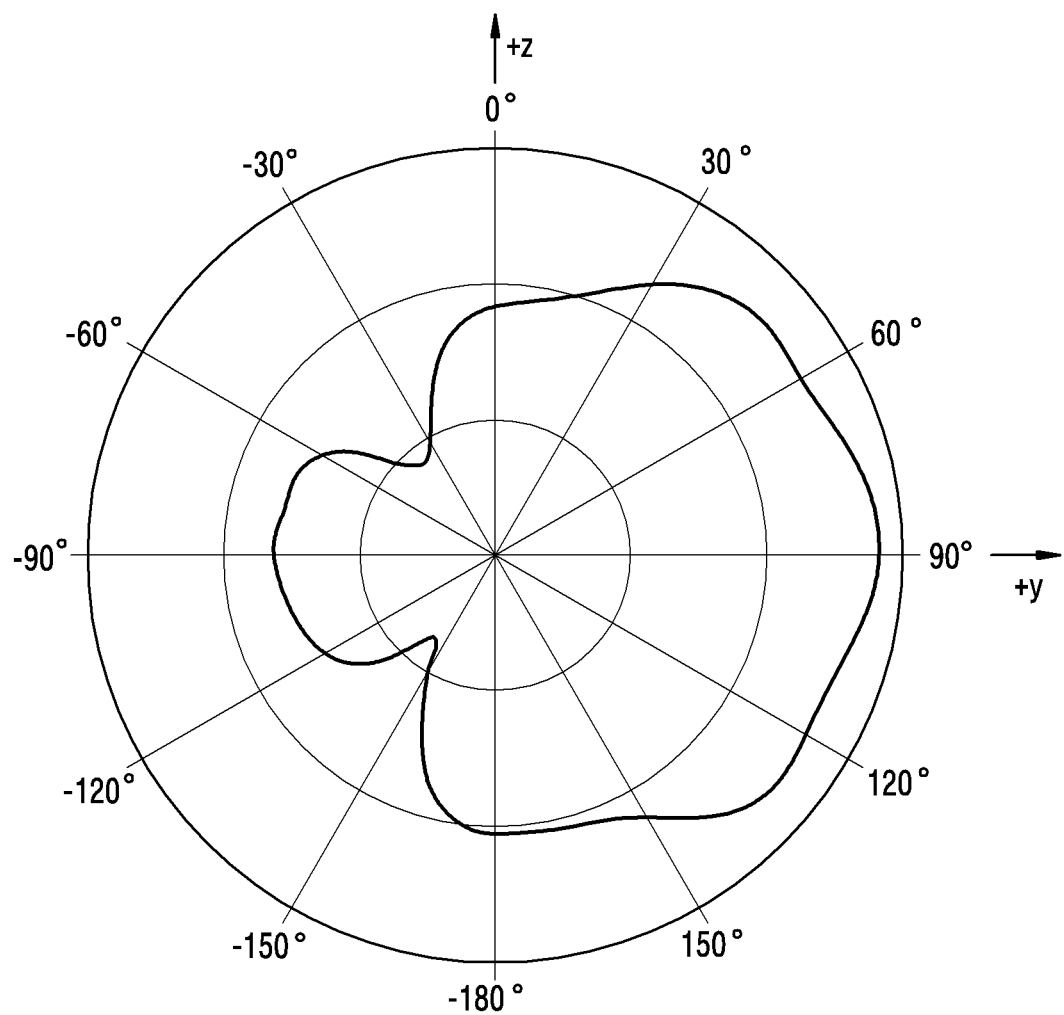
FIG. 17C is a diagram illustrating a radiation pattern of a beam formed through the antenna structure of FIG. 17A according to various embodiments.

FIG. 17A is a cutaway view of an antenna structure according to various embodiments. FIG. 17B is a diagram illustrating an example beam formed through the antenna structure of FIG. 17A according to various embodiments. FIG. 17C is a diagram illustrating a radiation pattern of a beam formed through the antenna structure of FIG. 17A according to various embodiments.

Referring to FIG. 17A, in an embodiment, the antenna structure 1700 can include a printed circuit board 1730 which includes a first antenna 1710 and a second antenna 1720. The printed circuit board 1730 can include a first surface 1730*a* extending in a first direction 17001 (e.g., a direction of +z axis), and a second surface 1730*b* extending in a second direction 17002 (e.g., a direction of −z axis) that is opposite to the first direction 17001.

According to an embodiment, when viewed from a cross section, the first antenna 1710 can include a first conductive plane 1711, and a first conductive side wall 1712, 1713, 1716*a* and 1716*b* and a second conductive side wall 1714, 1715, 1716*c* and 1716*d* substantially vertical with the first conductive plane 1711. The first conductive side wall 1712, 1713, 1716*a* and 1716*b* can be formed by a structure extended in the second direction 17002 from one sided area 1711*a* of the first conductive plane 1711, like the first conductive side wall 1512, 1513, 1514*a* and 1514*b* of FIG. 15A, and a detailed description may not be repeated here. The second conductive side wall 1714, 1715, 1716*c* and 1716*d* can be a structure extended in a direction (e.g., the second direction 17002) opposite to that of the first conductive side wall 1712, 1713, 1716*a* and 1716*b* from the other sided area 1711*b* of the first conductive plane 1711, and a detailed description may not be repeated here.

According to an embodiment, the second antenna 1720 can be formed by a structure of being substantially symmetric with the first antenna 1710 with a criterion of a center base (C3) of the printed circuit board 1730, and a detailed description of this is omitted.

According to various embodiments, the first antenna 1710 or the second antenna 1720 is not limited to FIG. 17A and can be formed by conductive layers of various different numbers and conductive vias electrically connecting them.

According to an embodiment, the first antenna 1710 and/or the second antenna 1720 can be electrically connected with a communication circuit (e.g., the first wireless communication circuit 450 of FIG. 4), and the communication circuit can transmit or receive a signal at various frequency bands through the first antenna 1710 and/or the second antenna 1720. According to an embodiment, the communication circuit can be electrically connected with the printed circuit board 1730 through a conductive bonding member such as, for example, and without limitation, a solder, or be electrically connected with the printed circuit board 1730 through a conductive member such as an FPCB or a cable.

According to various embodiments, the first antenna 1710 can include at least one first antenna included in the first antenna array 421 of FIG. 4. The second antenna 1720 can include at least one second antenna included in the second antenna array 422 of FIG. 4.

According to various embodiments, the first antenna 1710 can include at least one third antenna included in the third antenna array 431 of FIG. 4. The second antenna 1720 can include at least one fourth antenna included in the fourth antenna array 432 of FIG. 4.

According to various embodiments (not shown), the printed circuit board 1730 can include at least one ground plane (or ground layer) (e.g., the first ground plane 341 or second ground plane 342 of FIG. 3) disposed between the first surface 1730*a* and the second surface 1730*b*. The at least one ground plane can be physically isolated from the first antenna 1710 or the second antenna 1720.

According to an embodiment, the communication circuit (e.g., the first wireless communication circuit 450 of FIG. 4) electrically connected with the antenna structure 1700 can determine a phase of a current supplied to the first antenna 1710 and/or a phase of a current supplied to the second antenna 1720, in wireless communication. For example, referring to FIGS. 17A, 17B and 17C, based on a phase difference between the current supplied to the first antenna 1710 and the current supplied to the second antenna 1720, the antenna structure 1700 can form a beam substantially in a third direction 17003 (e.g., a direction of +y axis). According to an embodiment, the first side wall 1712, 1713, 1716*a* and 1716*b* or second side wall 1714, 1715, 1716*c* and 1716*d* of the first antenna 1710, and/or a first side wall 1721 or second side wall 1722 of the second antenna 1720 can contribute to forming a direction (e.g., a main lobe) of this beam.

According to various embodiments, one of the first side wall 1712, 1713, 1716a and 1716b and second side wall 1714, 1715, 1716c and 1716d of the first antenna 1710 can be omitted. According to various embodiments, one of the first side wall 1721 and second side wall 1722 of the second antenna 1720 can be omitted.

According to an example embodiment of the present disclosure, an electronic device (e.g., the electronic device 30 of FIG. 3) can include a housing (e.g., the housing 1310 of FIG. 13) including a first plate (e.g., the first plate 1311 of FIG. 13), a second plate (e.g., the second plate 1312 of FIG. 13) facing away from the first plate, and a side wall (e.g., the side member 1313 of FIG. 13) surrounding a space between the first plate and the second plate, The sidewall being coupled to the second plate or integrally formed with the second plate. The electronic device can include a display (e.g., the display 1320 of FIG. 13) visible through at least a portion of the first plate. The electronic device can include an antenna structure including at least one antenna disposed within the housing. The antenna structure can include: a printed circuit board (e.g., the printed circuit board 310 of FIG. 3) including a first surface (e.g., the first surface 310a of FIG. 3) extending in a first direction and a second surface (e.g., the second surface 310b of FIG. 3) extending in a second direction opposite to the first direction. The antenna structure can include a first area (e.g., the first area 311 of FIG. 3) including a first antenna array (e.g., the first antenna array 521 of FIG. 5A) including a plurality of first antenna elements (e.g., the plurality of first antennas 521a, 521b, 521c and 521d of FIG. 5A) formed within the printed circuit board or on the first surface. The antenna structure can include a second area (e.g., the second area 312 of FIG. 3) including a second antenna array (e.g., the second antenna array 522 of FIG. 5B) including a plurality of second antenna elements (e.g., the plurality of second antennas 522a, 522b, 522c and 522d of FIG. 5B) formed closer to the second surface than the plurality of first antenna elements within the printed circuit board, or on the second surface, wherein when viewed from above the first surface, the second area at least partially overlaps the first area. The antenna structure can include a third area (e.g., the third area 313 of FIG. 3) including a third antenna array (e.g., the third antenna array 531 of FIG. 5A) including a plurality of third antenna elements (e.g., the plurality of third antennas 531a, 531b, 531c and 531d of FIG. 5A) formed within the printed circuit board or on the first surface, wherein, when viewed from above the first surface, with the third area does not overlap the first area. The antenna structure can include a fourth area (e.g., the fourth area 314 of FIG. 3) including a fourth antenna array (e.g., the fourth antenna array 532 of FIG. 5B) including a plurality of fourth antenna elements (e.g., the plurality of fourth antennas 532a, 532b, 532c and 532d of FIG. 5B) formed closer to the second surface than the plurality of third antenna elements within the printed circuit board, or on the second surface, and wherein, when viewed from above the first surface, with the fourth area at least partially overlaps the third area. The antenna structure can include a ground layer (e.g., the first ground plane 341 and/or the second ground plane 342 of FIG. 3) disposed between the first antenna array and the second antenna array within the printed circuit board, wherein when viewed from above the first surface, with the ground layer at least partially overlaps the first area and the second area. The electronic device can include at least one wireless communication circuit (e.g., the first wireless communication circuit 350 of FIG. 3) electrically connected with the first antenna array, the second antenna array, the third antenna array and the fourth antenna array, the wireless communication circuit configured to transmit and/or receive a signal having a frequency in a range of about 3 GHz to about 100 GHz.

According to an example embodiment of the present disclosure, the first antenna element (e.g., the first antenna element 321a of FIG. 3) and the second antenna element (e.g., the second antenna element 322a of FIG. 3) can include a patch antenna.

According to an example embodiment of the present disclosure, the antenna structure can include at least one first conductive patch (e.g., the first antenna element 321b of FIG. 3) which, when viewed from above the first surface, at least partially overlaps the first antenna element and is disposed between the first surface (e.g., the first surface 310a of FIG. 3) and the first antenna element (e.g., the first antenna element 321a of FIG. 3).

According to an example embodiment of the present disclosure, the antenna structure can include at least one second conductive patch (e.g., the second antenna element 322b of FIG. 3) which, when viewed from above the second surface, at least partially overlaps the second antenna element and is disposed between the second surface (e.g., the first surface 310b of FIG. 3) and the second antenna element (e.g., the first antenna element 322a of FIG. 3).

According to an example embodiment of the present disclosure, the first antenna element (e.g., the first antenna 1510 of FIG. 15A) can include a first conductive plane (e.g., the first conductive plane 1511 of FIG. 15A), a second conductive plane (e.g., the second conductive planes 1512 and 1513 of FIG. 15A) disposed in a layer different from that of the first conductive plane, and when viewed from above the first surface (e.g., the first surface 1530a of FIG. 15A), the first antenna element overlaps at least a partial area (e.g., one sided area 1511a of FIG. 15A) of the first conductive plane, and at least one conductive via (e.g., the conductive vias 1514a and 1514b of FIG. 15A) electrically connecting the first conductive plane and the second conductive plane.

According to an example embodiment of the present disclosure, the second antenna element (e.g., the second antenna 1520 of FIG. 15A) can include a second conductive plane (e.g., the second conductive plane 1521 of FIG. 15A), a third conductive plane (e.g., the conductive planes 1522 and 1523 of FIG. 15A) disposed in a layer different from that of the second conductive plane, and when viewed from above the second surface (e.g., the second surface 1530b of FIG. 15A), with the second antenna element overlaps at least a partial area (e.g., one sided area 1521a of FIG. 15A) of the second conductive plane, and at least one conductive via (e.g., the conductive vias 1524a and 1524b of FIG. 15A) electrically connecting the second conductive plane and the third conductive plane.

According to an example embodiment of the present disclosure, the third antenna element (e.g., the third antenna 331 of FIG. 3) and the fourth antenna element (e.g., the fourth antenna 332 of FIG. 3) can include a dipole antenna.

According to an example embodiment of the present disclosure, the third antenna element (e.g., the third antenna 331 of FIG. 3) or the fourth antenna element (e.g., the fourth antenna 332 of FIG. 3) can include a first conductive pattern (e.g., the third antenna element 331a and fifth antenna element 332a of FIG. 3) and a second conductive pattern (e.g., the fourth antenna element 331b and sixth antenna element 323b of FIG. 3) which are physically isolated.

According to an example embodiment of the present disclosure, the first conductive pattern (e.g., the third antenna element 331a and fifth antenna element 332a of FIG. 3) and the second conductive pattern (e.g., the fourth antenna element 331b and sixth antenna element 323b of FIG. 3) are electrically connected with the wireless communication circuit (e.g., the first wireless communication circuit 350 of FIG. 3).

According to an example embodiment of the present disclosure, the first conductive pattern (e.g., the third antenna element 331a and fifth antenna element 332a of FIG. 3) can be electrically connected with the wireless communication circuit (e.g., the first wireless communication circuit 350 of FIG. 3). The second conductive pattern (e.g., the fourth antenna element 331b and sixth antenna element 332b of FIG. 3) can be electrically connected with the ground layer (e.g., the first ground plane 341 and/or second ground plane 342 of FIG. 3).

According to an example embodiment of the present disclosure, the first conductive pattern (e.g., the third antenna element 331a and fifth antenna element 332a of FIG. 3) can be electrically connected with the wireless communication circuit (e.g., the first wireless communication circuit 350 of FIG. 3). The second conductive pattern (e.g., the fourth antenna element 331b and sixth antenna element 332b of FIG. 3, or the sixth antenna element 1192 of FIG. 11) can be disposed to be physically isolated from other conductive elements.

According to an example embodiment of the present disclosure, the antenna structure can be disposed wherein the first surface (e.g., the first surface 310a of FIG. 3) of the printed circuit board faces the first plate (e.g., the first plate 1311 of FIG. 13), and the second surface (e.g., the second surface of FIG. 3) of the printed circuit board faces the second plate (e.g., the second plate 1312 of FIG. 13). The third area (e.g., the third area 313 of FIG. 3) and the fourth area (e.g., the fourth area 314 of FIG. 3) can be disposed closer to the side wall (e.g., the side member 1313 of FIG. 13) than the first area (e.g., the first area 311 of FIG. 3) and the second area (e.g., the second area 312 of FIG. 3).

According to an example embodiment of the present disclosure, the wireless communication circuit (e.g., the first wireless communication circuit 350 of FIG. 3) can be disposed in the first surface (e.g., the first surface 310a of FIG. 3), or the second surface (e.g., the second surface 310b of FIG. 3), of the printed circuit board.

According to an example embodiment of the present disclosure, the wireless communication circuit (e.g., the first wireless communication circuit 650 of FIG. 6) can set a current supplied to the first antenna array (e.g., the first antenna element 621 of FIG. 6) and a current supplied to the second antenna array (e.g., the second antenna element 622 of FIG. 6), to be out-of-phase. The wireless communication circuit can set a current supplied to the third antenna array (e.g., the third antenna element 631 of FIG. 6) and a current supplied to the fourth antenna array (e.g., the fourth antenna element 632 of FIG. 6), to be in-phase.

According to an example embodiment of the present disclosure, the wireless communication circuit (e.g., the first wireless communication circuit 650 of FIG. 6) can set a current supplied to the first antenna array (e.g., the first antenna element 621 of FIG. 6) and a current supplied to the second antenna array (e.g., the second antenna element 622 of FIG. 6), to be in-phase. The wireless communication circuit can set a current supplied to the third antenna array (e.g., the third antenna element 631 of FIG. 6) and a current supplied to the fourth antenna array (e.g., the fourth antenna element 632 of FIG. 6), to be out-of-phase.

According to an example embodiment of the present disclosure, the ground layer (e.g., the first ground plane 341 and/or second ground plane 342 of FIG. 3) can be electrically connected with the wireless communication circuit (e.g., the first wireless communication circuit 350 of FIG. 3).

According to an example embodiment of the present disclosure, the wireless communication circuit (e.g., the first wireless communication circuit 350 of FIG. 3) can include a radio frequency integrated circuit (RFIC).

According to an example embodiment of the present disclosure, the antenna module (e.g., the antenna module 300 of FIG. 3) can include a printed circuit board (e.g., the printed circuit board 310 of FIG. 3) including a first surface (e.g., the first surface 310a of FIG. 3) extending in a first direction and a second surface (e.g., the second surface 310b of FIG. 3) extending in a second direction opposite to the first direction. The antenna module can include a first area (e.g., the first area 311 of FIG. 3) including a first antenna array (e.g., the first antenna array 521 of FIG. 5A) including a plurality of first antenna elements (e.g., the plurality of first antenna elements 521a, 521b, 521c and 521d of FIG. 5A) formed within the printed circuit board or on the first surface. The antenna module can include a second area (e.g., the second area 312 of FIG. 3) including a second antenna array (e.g., the second antenna array 522 of FIG. 5B) including a plurality of second antenna elements (e.g., the plurality of second antenna 522a, 522b, 522c and 522d of FIG. 5B) formed, closer to the second surface than the plurality of first antenna elements within the printed circuit board, or on the second surface, wherein when viewed from above the first surface, the second area at least partially overlaps the first area. The antenna module can include a third area (e.g., the third area 313 of FIG. 3) including a third antenna array (e.g., the third antenna array 531 of FIG. 5A) including a plurality of third antenna elements (e.g., the plurality of third antenna elements 531a, 531b, 531c and 531d of FIG. 5A) formed within the printed circuit board or on the first surface, wherein when viewed from above the first surface, with the third area does not overlap the first area. The antenna module can include a fourth area (e.g., the fourth area 314 of FIG. 3) including a fourth antenna array (e.g., the fourth antenna array 532 of FIG. 5B) including a plurality of fourth antenna elements (e.g., the plurality of fourth antenna 532a, 532b, 532c and 532d of FIG. 5B) formed closer to the second surface than the plurality of third antenna elements within the printed circuit board, or on the second surface, wherein when viewed from above the first surface, the fourth area at least partially overlaps the third area. The antenna module can include a ground layer (e.g., the first ground plane 341 and/or the second ground plane 342 of FIG. 3) disposed between the first antenna array and the second antenna array within the printed circuit board, wherein when viewed from above the first surface, the ground layer at least partially overlaps the first area and the second area. The antenna module can include at least one wireless communication circuit (e.g., the first wireless communication circuit 350 of FIG. 3) electrically connected with the first antenna array, the second antenna array, the third antenna array and the fourth antenna array, and configured to transmit and/or receive a signal having a frequency in a range of about 3 GHz to about 100 GHz.

According to an example embodiment of the present disclosure, the first antenna element (e.g., the first antenna 321 of FIG. 3) and the second antenna element (e.g., the second antenna 322 of FIG. 3) can include a patch antenna.

According to an example embodiment of the present disclosure, the third antenna element (e.g., the third antenna 331 of FIG. 3) and the fourth antenna element (e.g., the fourth antenna 332 of FIG. 3) can include a dipole antenna.

According to an example embodiment of the present disclosure, the wireless communication circuit (e.g., the first wireless communication circuit 650 of FIG. 6) can set a current supplied to the first antenna array (e.g., the first antenna element 621 of FIG. 6) and a current supplied to the second antenna array (e.g., the second antenna element 622 of FIG. 6), to be out-of-phase. The wireless communication circuit can set a current supplied to the third antenna array (e.g., the third antenna element 631 of FIG. 6) and a current supplied to the fourth antenna array (e.g., the fourth antenna element 632 of FIG. 6), to be in-phase.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. An electronic device comprising:
 a housing comprising a first plate, a second plate facing away from the first plate, and a side wall surrounding a space between the first plate and the second plate, and coupled to the second plate or integrally formed with the second plate;
 a display visible through at least a portion of the first plate;
 an antenna structure disposed within the housing, the antenna structure comprising:
  a printed circuit board comprising a first surface extending in a first direction and a second surface extending in a second direction opposite to the first direction;
  a first area comprising a first antenna array comprising a plurality of first antenna elements formed within the printed circuit board or on the first surface;
  a second area comprising a second antenna array comprising a plurality of second antenna elements formed closer to the second surface than the plurality of first antenna elements within the printed circuit board, or on the second surface, wherein when viewed from above the first surface, the second area at least partially overlaps the first area;
  a third area comprising a third antenna array comprising a plurality of third antenna elements formed within the printed circuit board or on the first surface, wherein when viewed from above the first surface, the third area does not overlap the first area;
  a fourth area comprising a fourth antenna array comprising a plurality of fourth antenna elements formed closer to the second surface than the plurality of third antenna elements within the printed circuit board, or on the second surface, wherein when viewed from above the first surface, the fourth area at least partially overlaps the third area; and
  a ground layer disposed between the first antenna array and the second antenna array within the printed circuit board, wherein when viewed from above the first surface, the ground layer at least partially overlaps the first area and the second area; and
 at least one wireless communication circuit electrically connected to the first antenna array, the second antenna array, the third antenna array and the fourth antenna array, and configured transmit and/or receive a signal having a frequency in a range of about 3 GHz to 100 GHz.

2. The electronic device of claim 1, wherein the first antenna element and the second antenna element comprise a patch antenna.

3. The electronic device of claim 1, wherein the antenna structure comprises at least one first conductive patch which, when viewed from above the first surface, at least partially overlaps the first antenna element between the first surface and the first antenna element.

4. The electronic device of claim 1, wherein the antenna structure comprises at least one second conductive patch which, when viewed from above the second surface, at least partially overlaps the second antenna element between the second surface and the second antenna element.

5. The electronic device of claim 1, wherein the first antenna element comprises:
 a first conductive plane;
 a second conductive plane disposed in a layer different from the first conductive plane, wherein when viewed from above the first surface, the second conductive plane overlaps at least a partial area of the first conductive plane; and
 at least one conductive via electrically connecting the first conductive plane and the second conductive plane.

6. The electronic device of claim 1, wherein the second antenna element comprises:
 a second conductive plane;
 a third conductive plane disposed in a layer different from the second conductive plane, wherein when viewed from above the second surface, the third conductive plane overlaps at least a partial area of the second conductive plane; and
 at least one conductive via electrically connecting the second conductive plane and the third conductive plane.

7. The electronic device of claim 1, wherein the third antenna element and the fourth antenna element comprise a dipole antenna.

8. The electronic device of claim 7, wherein the third antenna element or the fourth antenna element comprises a first conductive pattern and a second conductive pattern which are physically isolated.

9. The electronic device of claim 8, wherein the first conductive pattern and the second conductive pattern are electrically connected to the wireless communication circuit.

10. The electronic device of claim 8, wherein the first conductive pattern is electrically connected to the wireless communication circuit, and the second conductive pattern is electrically connected to the ground layer.

11. The electronic device of claim 8, wherein the first conductive pattern is electrically connected to the wireless communication circuit, and the second conductive pattern is disposed to be physically isolated from other conductive elements.

12. The electronic device of claim 1, wherein the first surface of the printed circuit board faces the first plate, and the second surface of the printed circuit board faces the second plate, and
 the third area and the fourth area are disposed closer to the side wall than the first area and the second area.

13. The electronic device of claim 1, wherein the wireless communication circuit is configured to:

set a current supplied to the first antenna array and a current supplied to the second antenna array, to be out-of-phase, and set a current supplied to the third antenna array and a current supplied to the fourth antenna array, to be in-phase.

14. The electronic device of claim 1, wherein the wireless communication circuit is configured to:

set a current supplied to the first antenna array and a current supplied to the second antenna array, to be in-phase, and set a current supplied to the third antenna array and a current supplied to the fourth antenna array, to be out-of-phase.

15. The electronic device of claim 1, wherein the ground layer is electrically connected to the wireless communication circuit.

* * * * *

UNITED STATES PATENT AND TRADEMARK OFFICE
CERTIFICATE OF CORRECTION

| | | |
|---|---|---|
| PATENT NO. | : 11,936,115 B2 | Page 1 of 1 |
| APPLICATION NO. | : 17/419128 | |
| DATED | : March 19, 2024 | |
| INVENTOR(S) | : Yeonwoo Kim | |

It is certified that error appears in the above-identified patent and that said Letters Patent is hereby corrected as shown below:

On the Title Page

(73) Assignee:
Please add 2nd Assignee as shown below:
-- POSTECH RESEARCH AND BUSINESS DEVELOPMENT FOUNDATION, GYEONGSANGBUK-DO, (KR) --

Signed and Sealed this
Twelfth Day of November, 2024

Katherine Kelly Vidal
*Director of the United States Patent and Trademark Office*